United States Patent
Resch

(10) Patent No.: US 10,445,179 B2
(45) Date of Patent: Oct. 15, 2019

(54) SECURELY STORING DATA IN A DISPERSED STORAGE NETWORK

(71) Applicant: International Business Machines Corporation, Armonk, NY (US)

(72) Inventor: Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 201 days.

(21) Appl. No.: 15/612,082

(22) Filed: Jun. 2, 2017

(65) Prior Publication Data
US 2017/0269999 A1 Sep. 21, 2017

Related U.S. Application Data

(63) Continuation of application No. 14/844,328, filed on Sep. 3, 2015, now Pat. No. 9,747,160, which is a
(Continued)

(51) Int. Cl.
*G06F 11/00* (2006.01)
*G06F 11/10* (2006.01)
(Continued)

(52) U.S. Cl.
CPC ...... *G06F 11/1076* (2013.01); *G06F 11/1044* (2013.01); *G06F 11/142* (2013.01);
(Continued)

(58) Field of Classification Search
CPC ............ G06F 11/1076; G06F 11/1044; G06F 11/142; G06F 11/2094; G06F 21/10;
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Albert Decady
*Assistant Examiner* — Osman M Alshack
(74) *Attorney, Agent, or Firm* — Garlick & Markison; Timothy W. Markison; Kelly H. Hale

(57) ABSTRACT

Methods and systems for changing dispersed storage error encoding parameters of sets of encoded data slices relating to portions of a data file involve determining one or more dispersed storage error encoding parameters are to be changed, selecting one or more changes to the dispersed storage error encoding parameters, and applying the changes to the parameters. The parameters include an error coding number and a decode threshold. Changes can include normalizing the parameters of the portions of a data file. Determining changes are to be made may be based on read processing performance, expiration of a time frame or based on a request. Changes can be selected based a lookup, a request, received parameters, a history of read performance, read processing performance, data type, an owner of the data file and a data size. Changes can include adding slices, deleting slices and re-encoding of data.

18 Claims, 76 Drawing Sheets

Related U.S. Application Data continuation of application No. 13/944,277, filed on Jul. 17, 2013, now Pat. No. 9,154,298.

(60) Provisional application No. 61/696,018, filed on Aug. 31, 2012.

(51) Int. Cl.

| | | |
|---|---|---|
| *H04L 9/08* | (2006.01) | |
| *G06F 11/14* | (2006.01) | |
| *H03M 13/00* | (2006.01) | |
| *G06F 21/62* | (2013.01) | |
| *G06F 21/10* | (2013.01) | |
| *G06F 21/60* | (2013.01) | |
| *H04L 29/08* | (2006.01) | |
| *G06F 11/20* | (2006.01) | |
| *G06F 11/07* | (2006.01) | |

(52) U.S. Cl.
CPC .......... *G06F 11/2094* (2013.01); *G06F 21/10* (2013.01); *G06F 21/60* (2013.01); *G06F 21/6272* (2013.01); *H03M 13/611* (2013.01); *H04L 9/0861* (2013.01); *H04L 9/0894* (2013.01); *H04L 67/1097* (2013.01); *G06F 11/0712* (2013.01); *G06F 11/0784* (2013.01); *G06F 11/0787* (2013.01); *G06F 11/1004* (2013.01); *G06F 11/1092* (2013.01); *H03M 13/616* (2013.01); *H04L 2209/34* (2013.01)

(58) Field of Classification Search
CPC .. G06F 21/60; G06F 21/6272; G06F 11/0712; G06F 11/0784; G06F 11/0787; G06F 11/1004; G06F 11/1092; H03M 13/611; H03M 13/616; H04L 9/0861; H04L 9/0894; H04L 67/1097; H04L 2209/34
USPC .......................................... 714/752, 759, 766
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 9,154,298 B2 | 10/2015 | Resch |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0268938 A1* | 10/2010 | Resch .................. H04L 9/0897 713/153 |
| 2011/0225362 A1* | 9/2011 | Leggette ............. G06F 12/1425 711/114 |
| 2011/0264717 A1* | 10/2011 | Grube .................. G06F 11/0727 707/827 |
| 2011/0286595 A1* | 11/2011 | Resch .................... H04L 9/085 380/46 |
| 2011/0289383 A1* | 11/2011 | Dhuse .................... H04L 9/085 714/763 |
| 2011/0289565 A1* | 11/2011 | Resch .................... H04L 9/085 726/5 |
| 2011/0314346 A1* | 12/2011 | Vas ........................ H04L 63/06 714/49 |
| 2012/0030371 A1* | 2/2012 | Baptist .................. H04L 63/08 709/236 |
| 2012/0030740 A1* | 2/2012 | Baptist .................. H04L 63/08 726/6 |
| 2012/0089885 A1* | 4/2012 | Grube .................... H03M 13/05 714/752 |
| 2012/0166907 A1* | 6/2012 | Grube .................... G06F 21/62 714/755 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; an Automatic Data Segmentation Method for 3D Measured Data Points; National Taiwan University; pp. 1-8; 1998.

(56) References Cited

OTHER PUBLICATIONS

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Norking Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

| DST allocation info 242 | data partition info 320: [X]data ID; No. of partitions; Addr. info for each partition; format conversion indication | | | | | | |
|---|---|---|---|---|---|---|---|
| | task execution info 322 | | | | intermediate result info 324 | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-3_4 R1-3_5 - R1-3_z | 1_1, 2_1, 3_1, 4_1, & 5_1 1_2, 2_2, 6_1, 7_1, & 7_2 | R1_4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

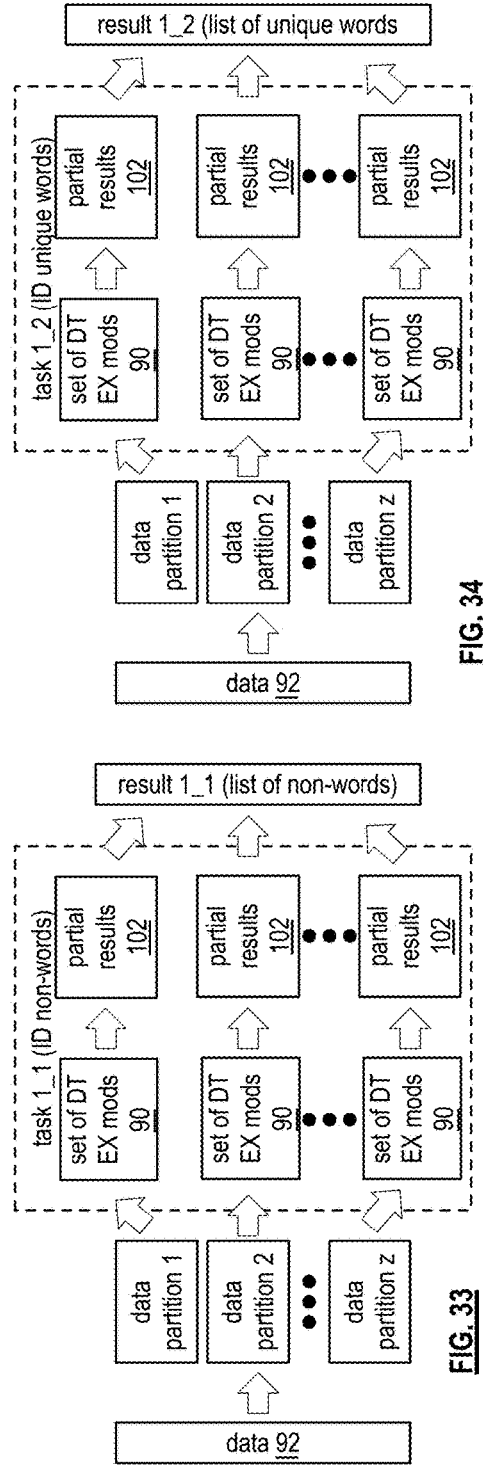
FIG. 33
FIG. 34
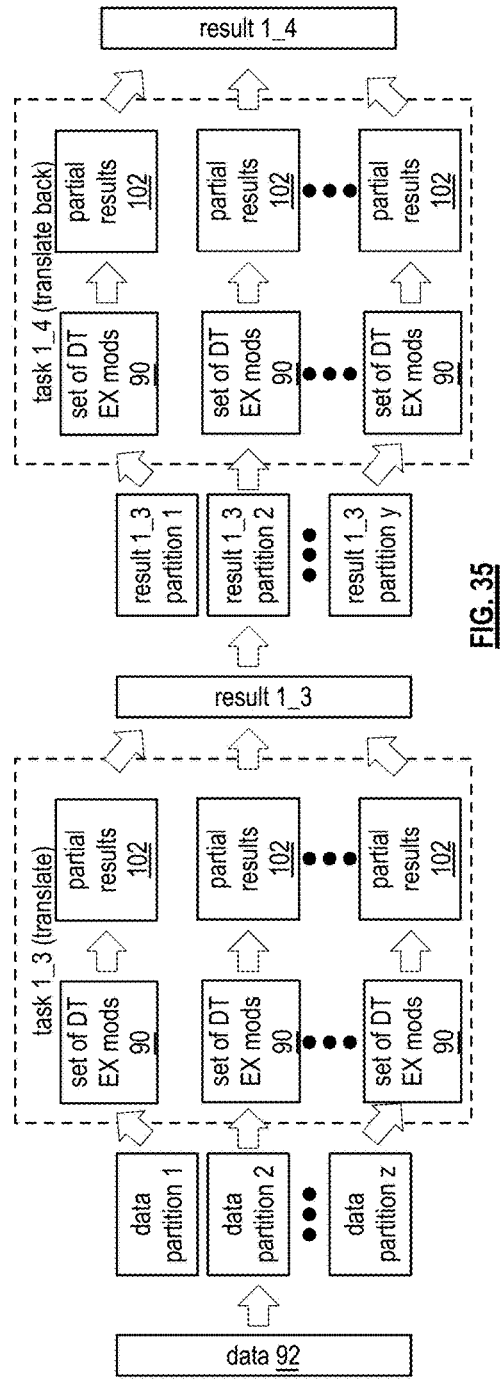
FIG. 35

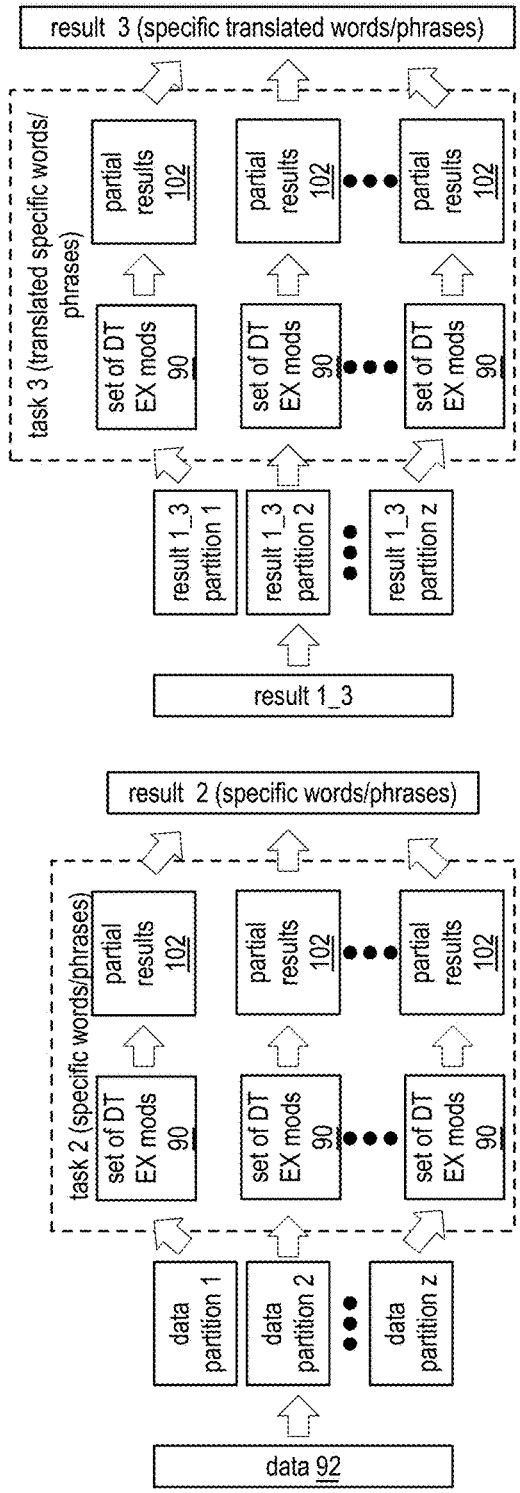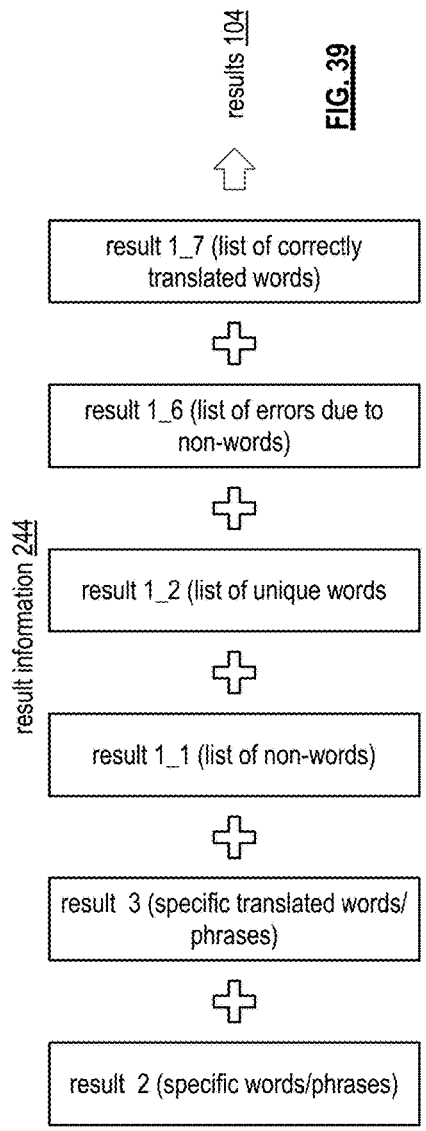

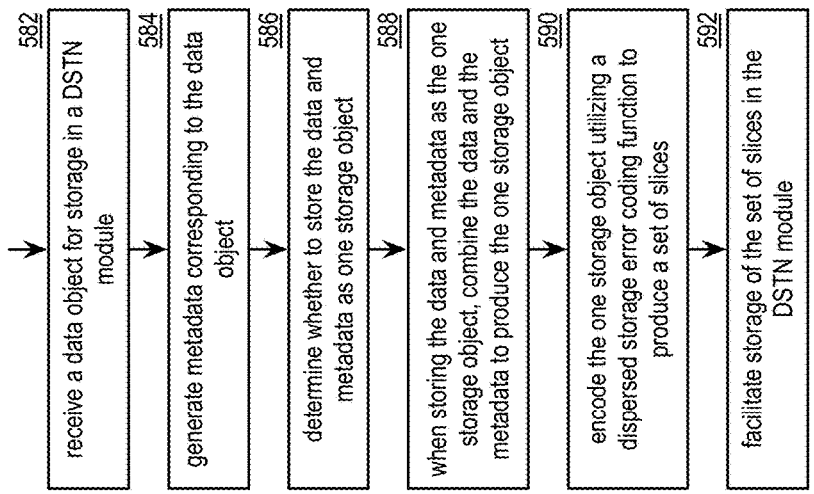

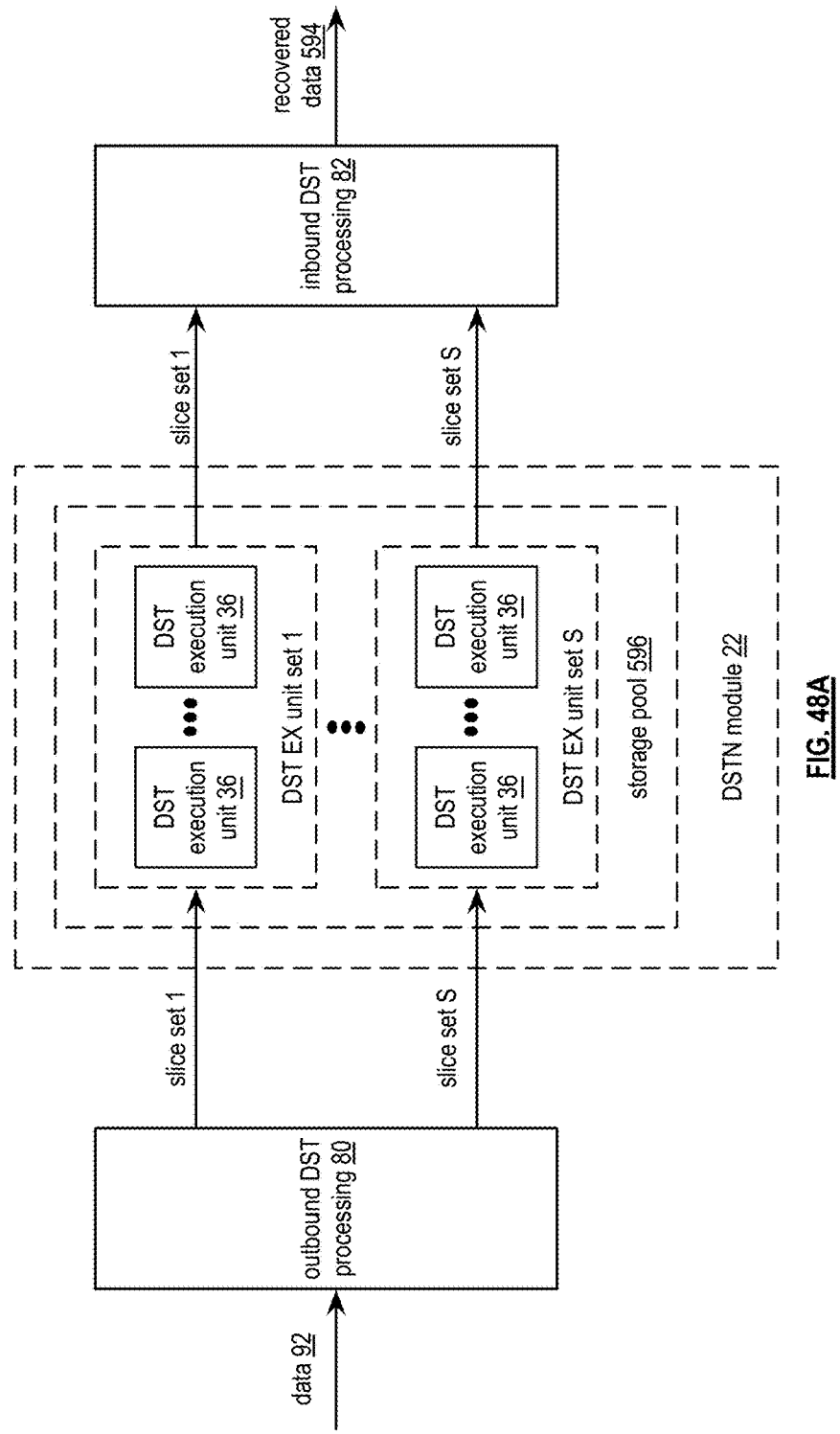

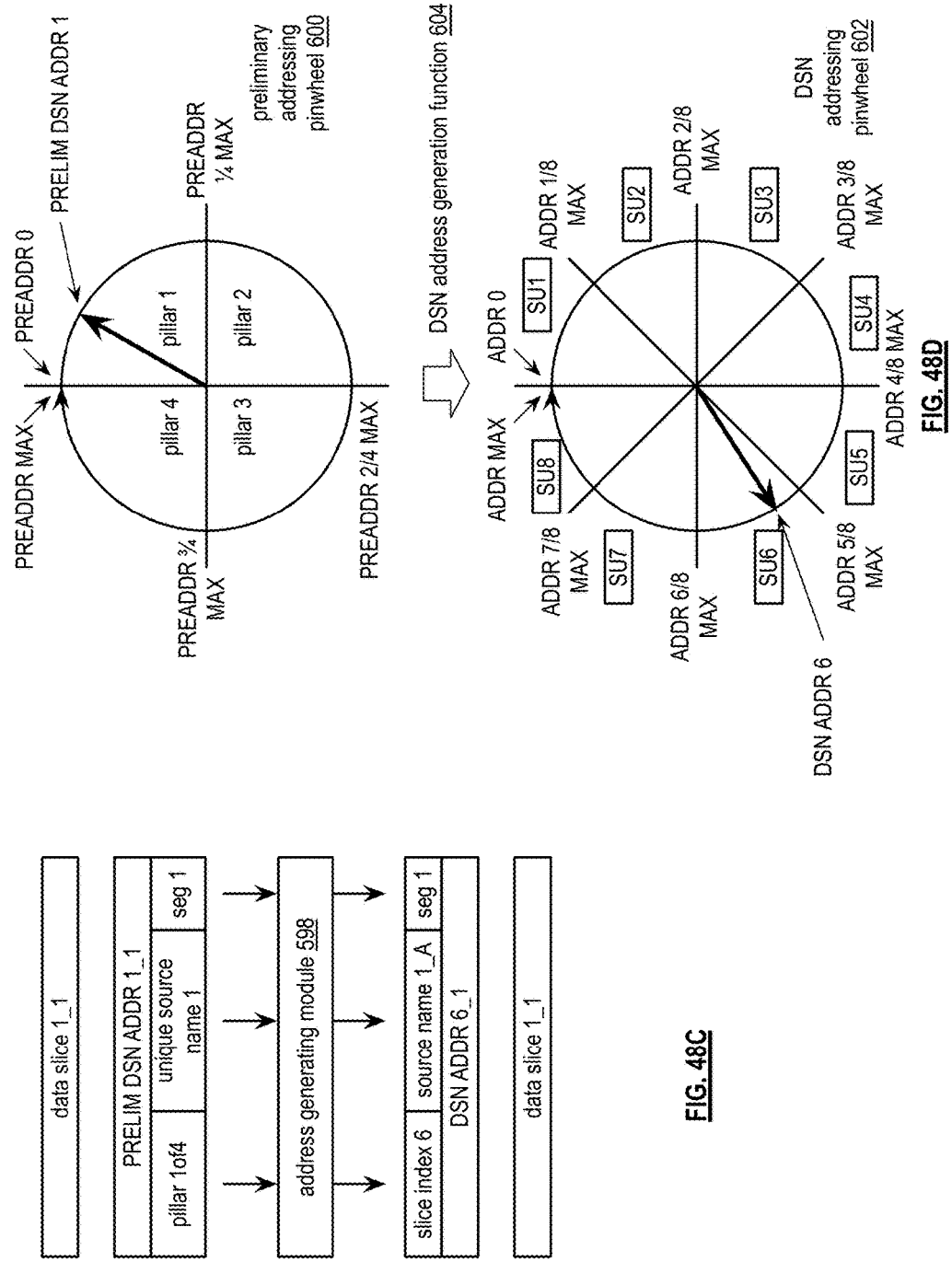

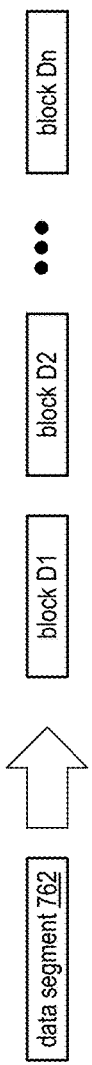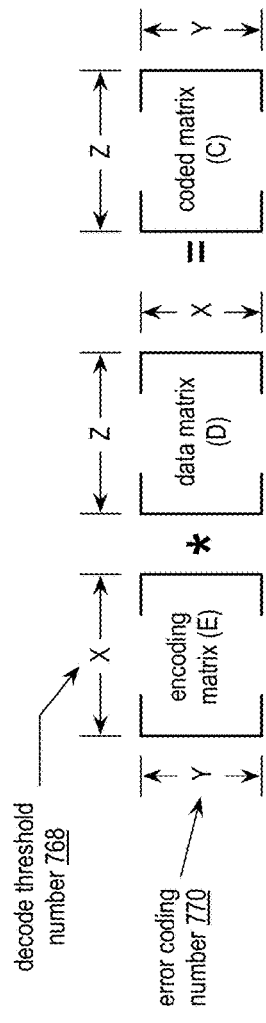

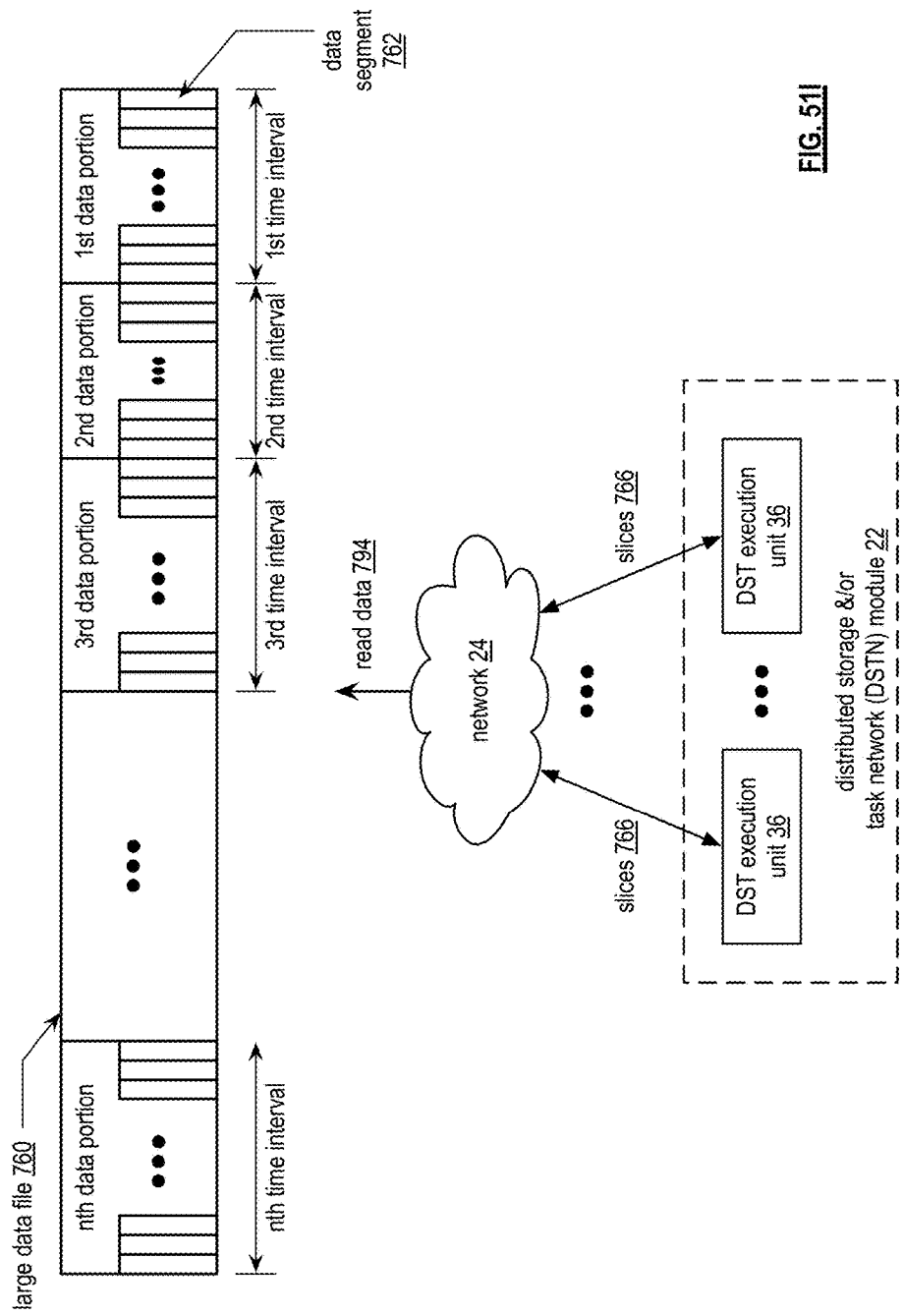

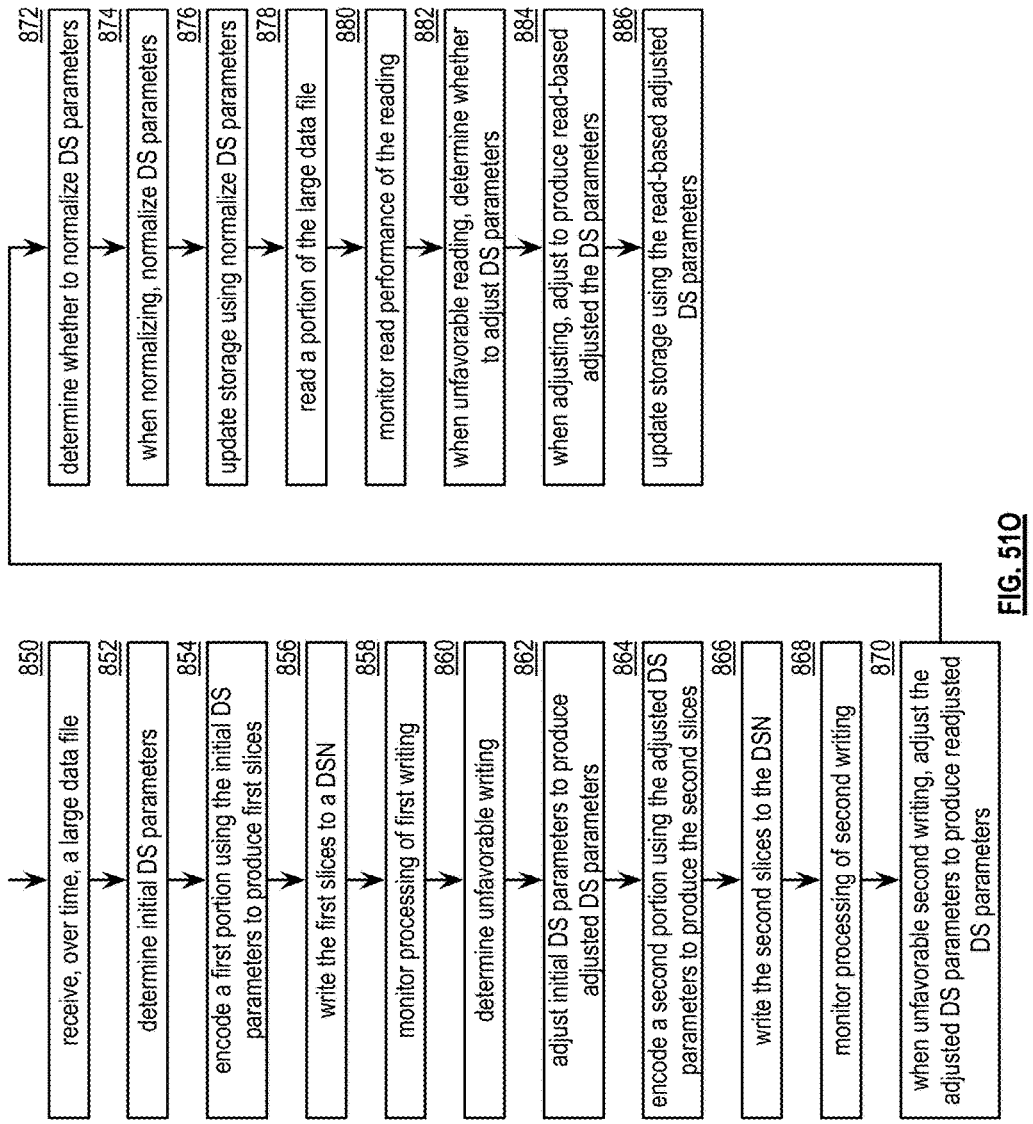

FIG. 52A

| site address range 892 | DST EX unit 1 address range 894 | DST EX unit 2 address range 896 | DST EX unit 3 address range 898 |
|---|---|---|---|
| 1000-1999 | 1000-1299 | 1300-1599 | 1600-1999 | initial storage map 890

FIG. 52B storage map modification package 900 previous storage map 902

| site address range 892 | DST EX unit 1 address range 894 | DST EX unit 2 address range 896 | DST EX unit 3 address range 898 |
|---|---|---|---|
| 1000-1999 | 1000-1299 | 1300-1599 | 1600-1999 | updated storage map 904

| site address range 892 | DST EX unit 1 address range 894 | DST EX unit 2 address range 896 | DST EX unit 3 address range 898 |
|---|---|---|---|
| 1000-1999 | 1000-1399 | 1400-1599 | 1600-1999 | first neighbor signature 906 second neighbor signature 908

SECURELY STORING DATA IN A DISPERSED STORAGE NETWORK

CROSS REFERENCE TO RELATED PATENTS

The present U.S. Utility patent application claims priority pursuant to 35 U.S.C. § 120 as a continuation of U.S. Utility application Ser. No. 14/844,328, entitled "SECURELY STORING DATA IN A DISPERSED STORAGE NETWORK", filed Sep. 3, 2015, which is a continuation of U.S. Utility application Ser. No. 13/944,277, entitled "SECURELY STORING DATA IN A DISPERSED STORAGE NETWORK", Jul. 17, 2013, now U.S. Pat. No. 9,154,298, which claims priority pursuant to 35 U.S.C. § 119(e) to U.S. Provisional Application No. 61/696,018, entitled "AUTHORIZING ACCESS TO A DISTRIBUTED STORAGE AND TASK NETWORK", filed Aug. 31, 2012, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 47 is a flowchart illustrating an example of storing data and metadata in accordance with the present invention;

Figure 48B:
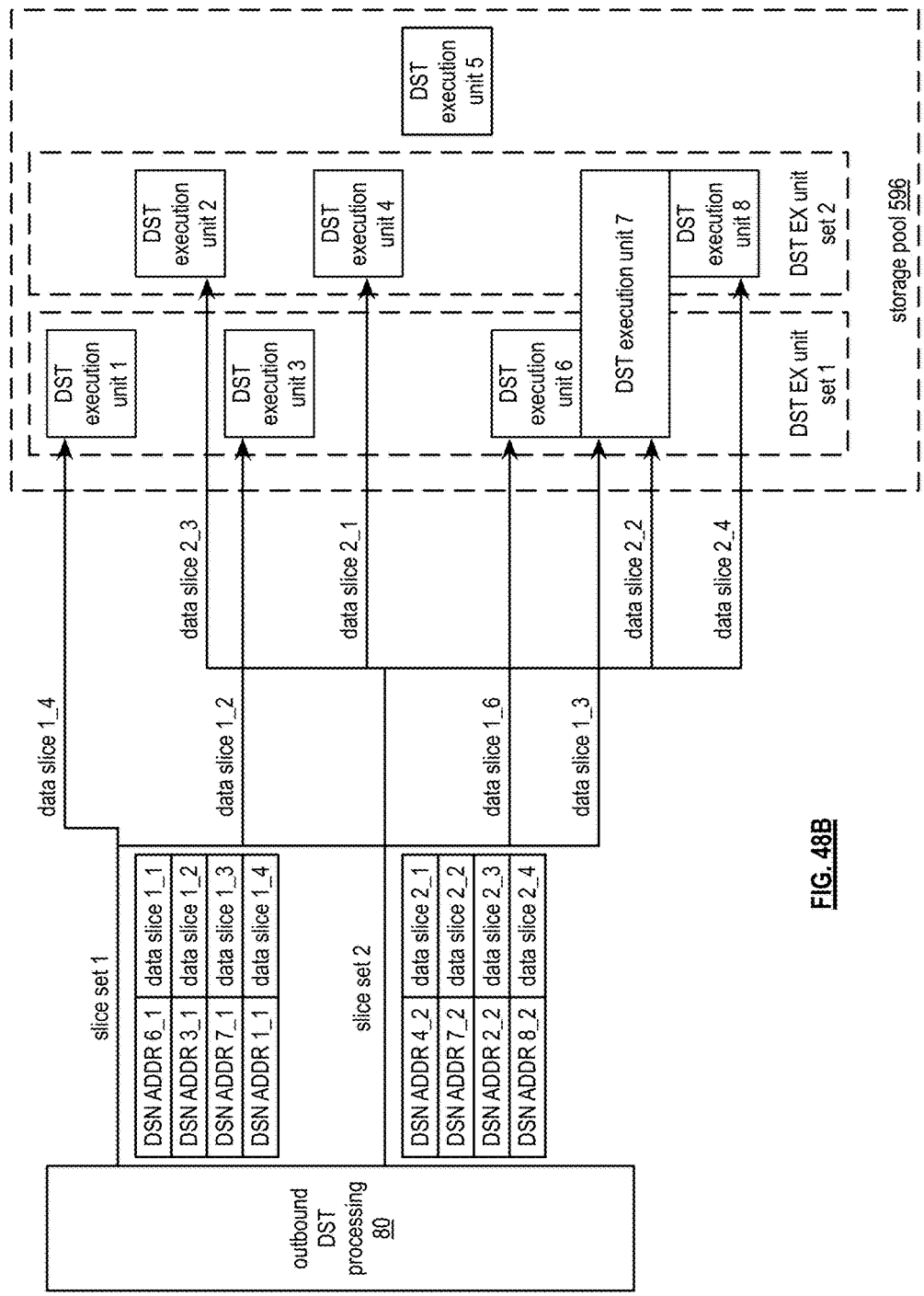
FIG. 48B is a schematic block diagram of another embodiment of a dispersed storage network system in accordance with the present invention.
Figure 48E:
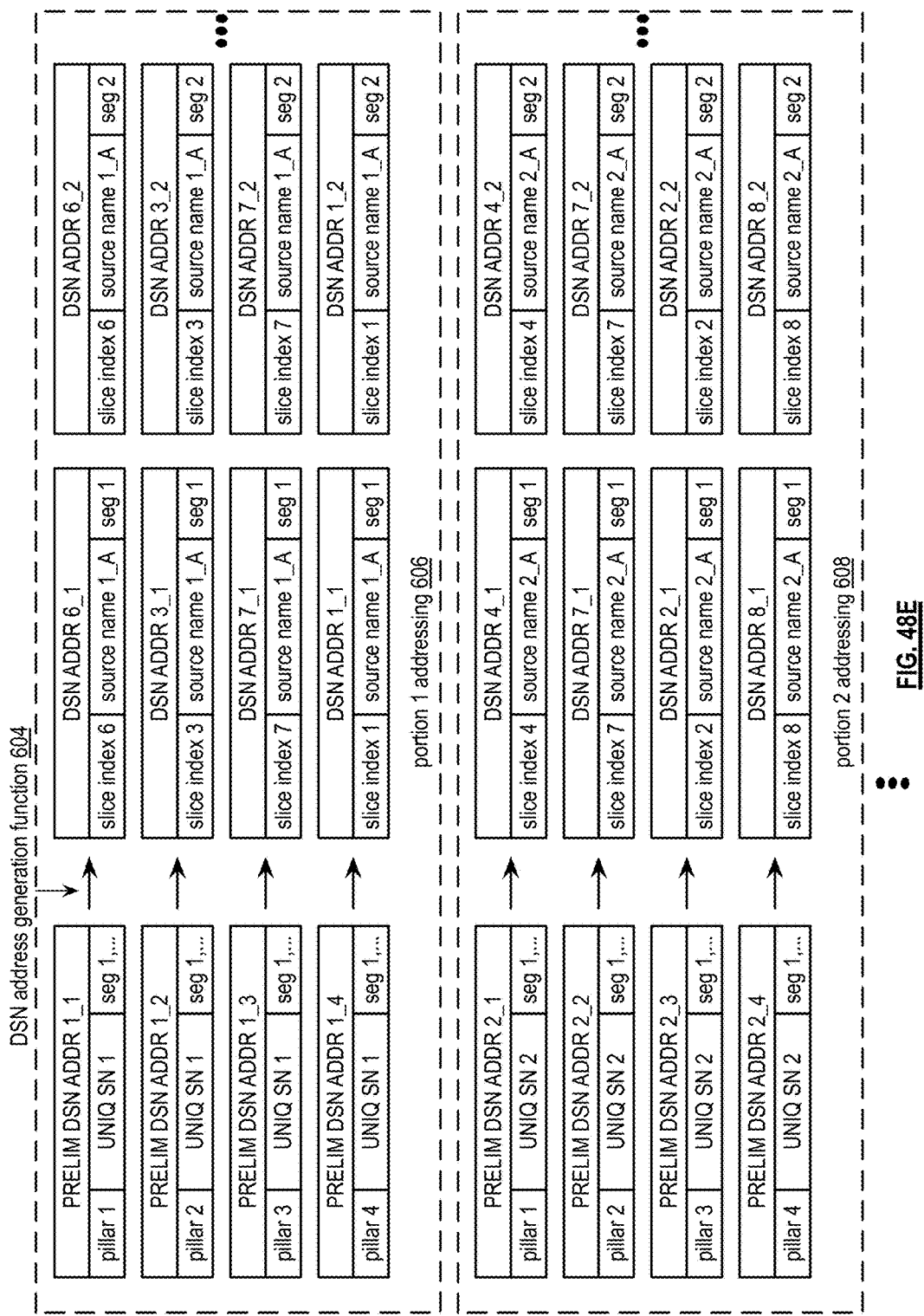
FIG. 48E is a diagram illustrating examples of portion addressing in accordance with the present invention.
Figure 48F:
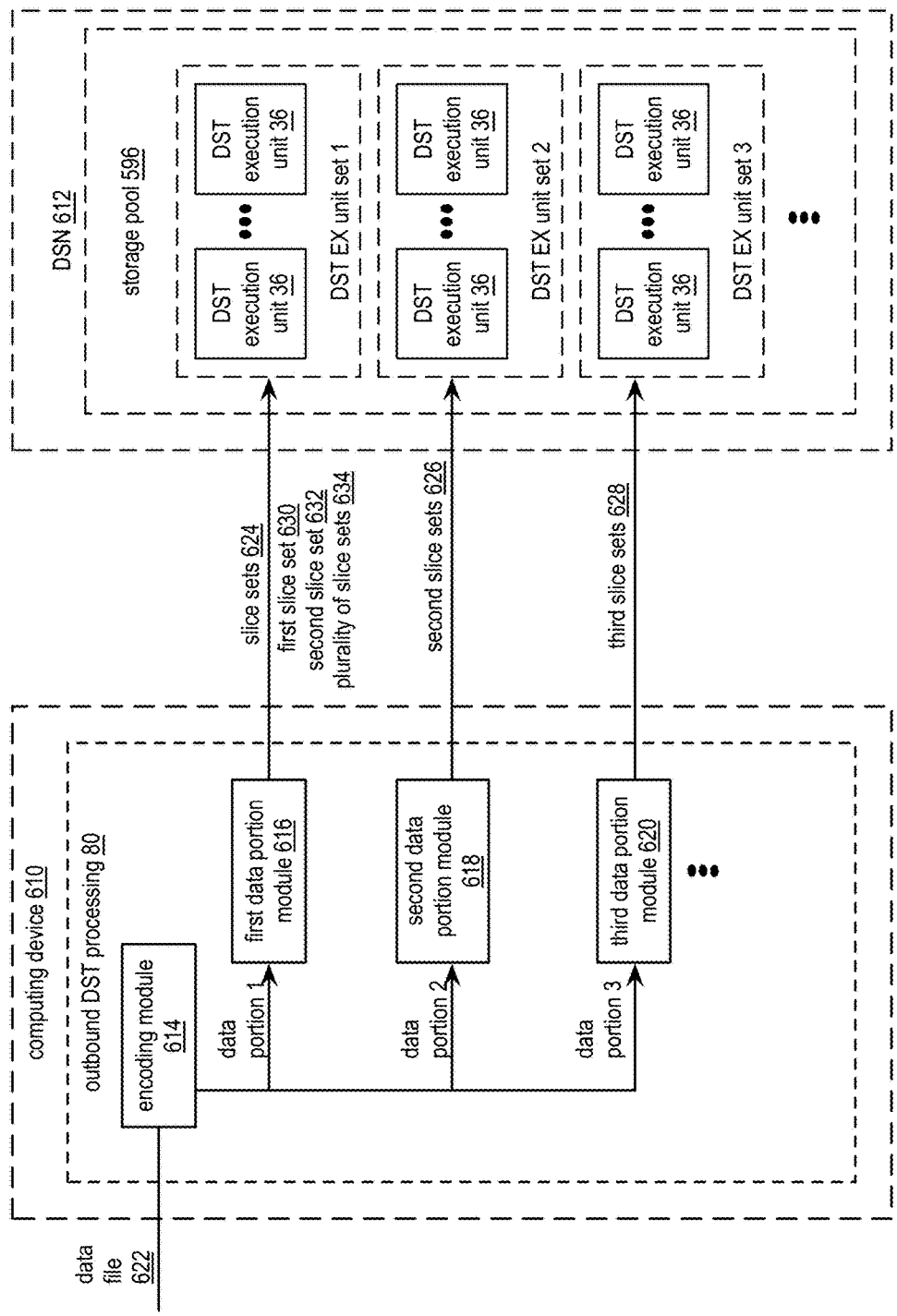
FIG. 48F is a schematic block diagram of another embodiment of a dispersed storage network system in accordance with the present invention.
Figure 48G:
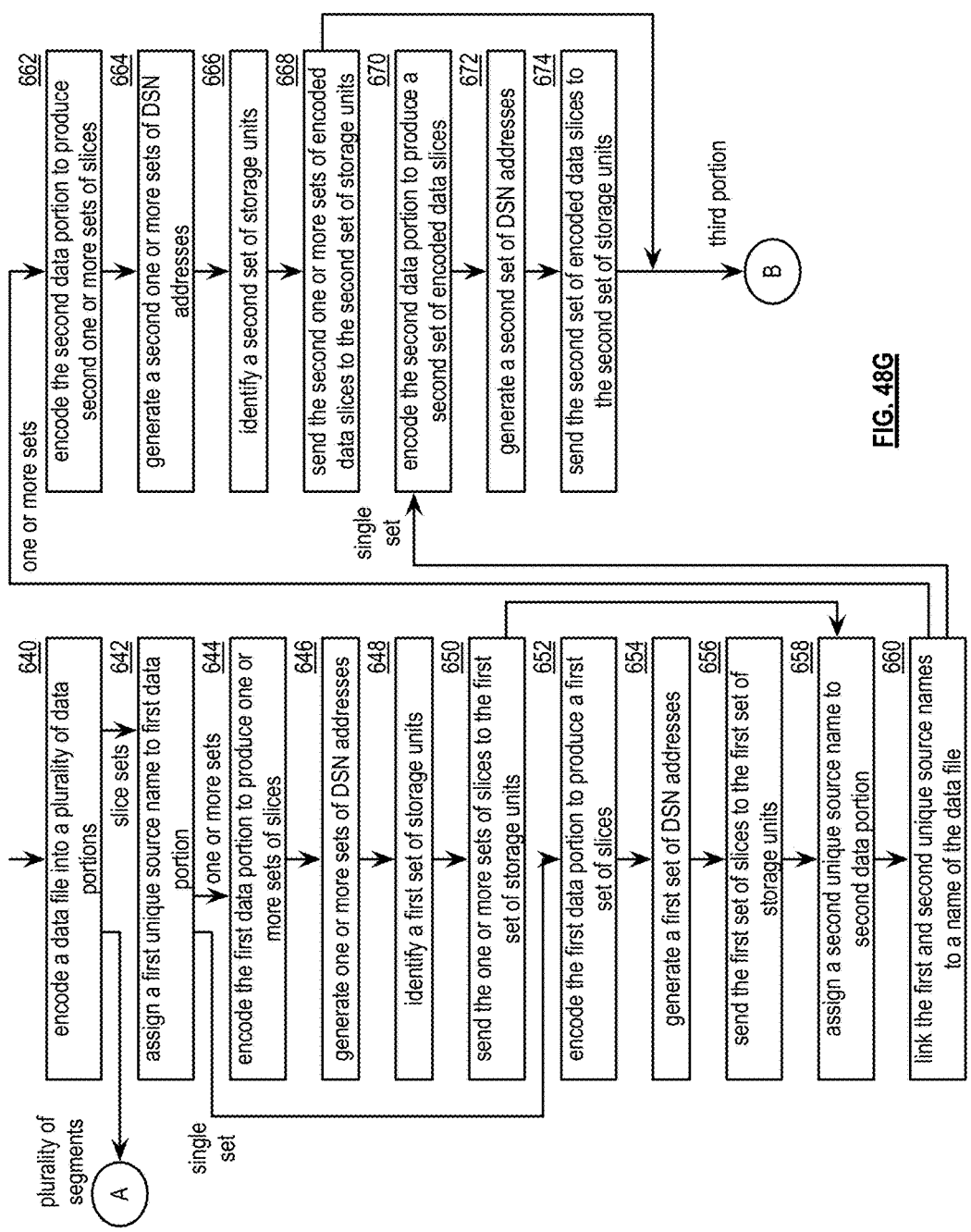
FIG. 48A is a schematic block diagram of an embodiment of a dispersed storage network system in accordance with the present invention.
FIG. 48C is a diagram illustrating an example of generating a dispersed storage network address (DSN) from a preliminary DSN address in accordance with the present invention.
FIG. 48D is a diagram illustrating a dispersed storage network (DSN) address generation function in accordance with the present invention.
Figure 49A:
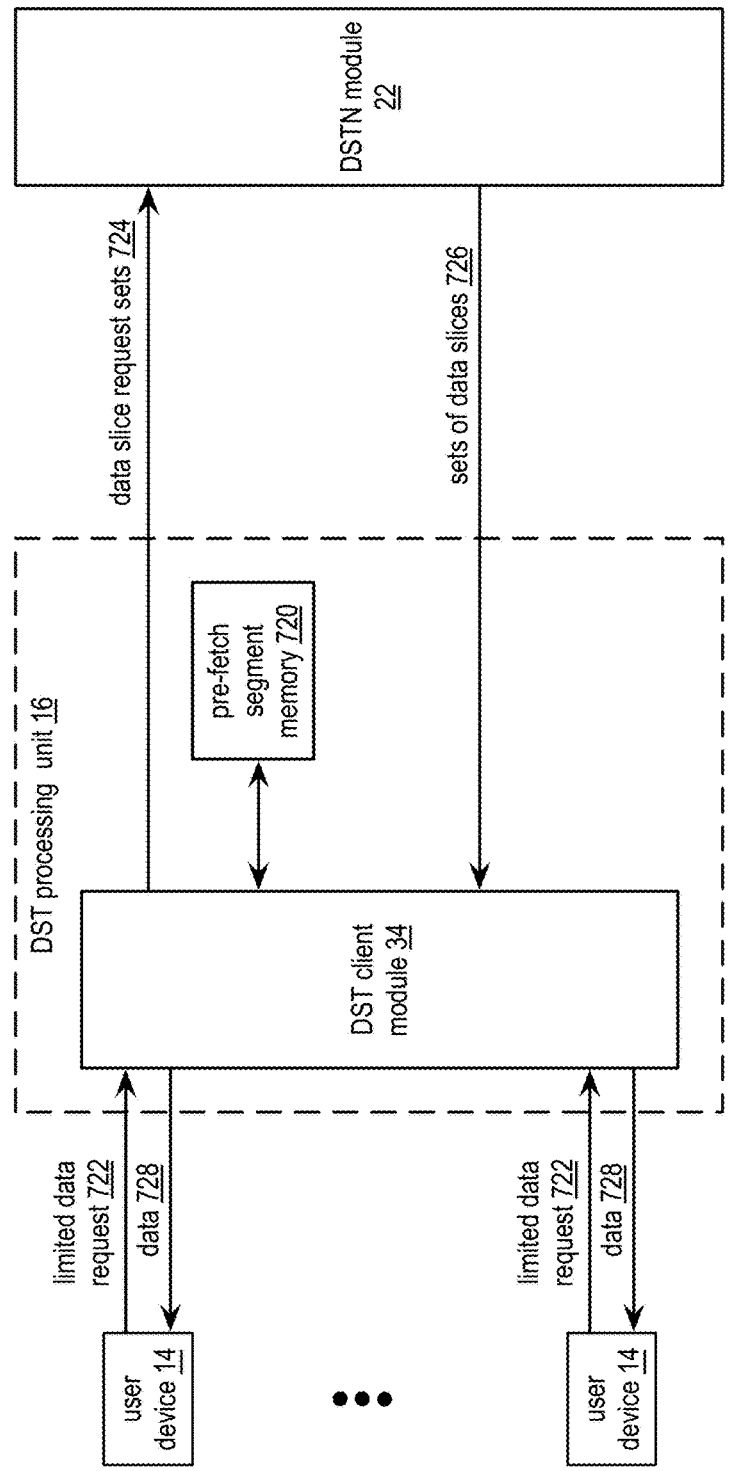
Figure 49B:
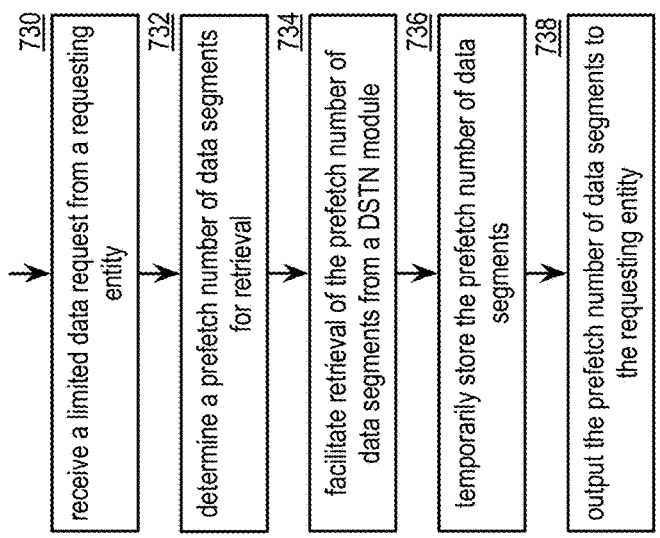
Figure 50A:
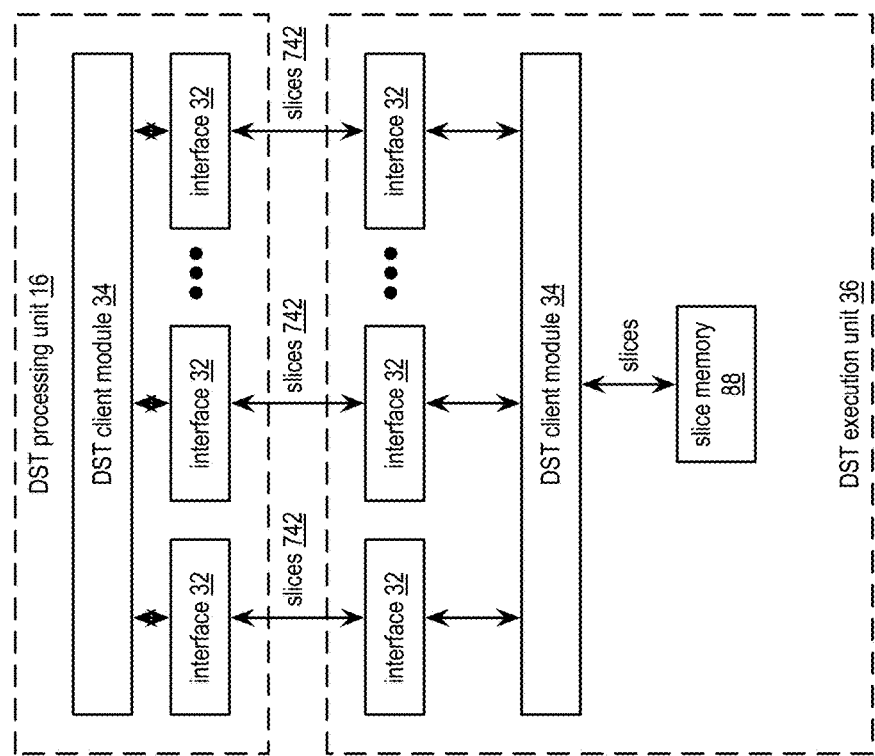
Figure 50B:
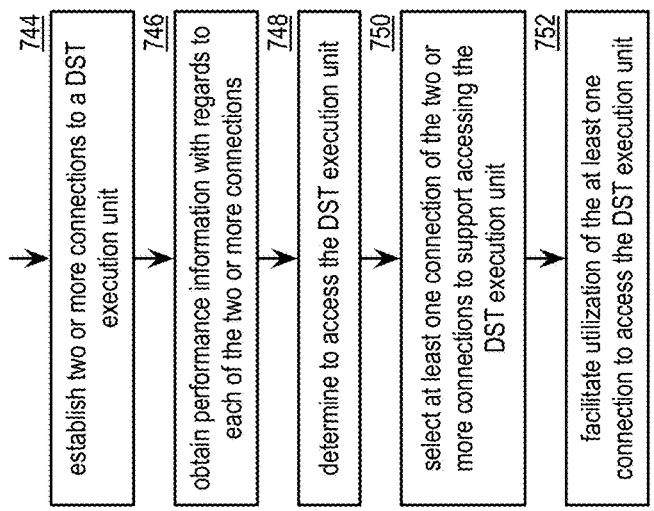
Figure 51A:
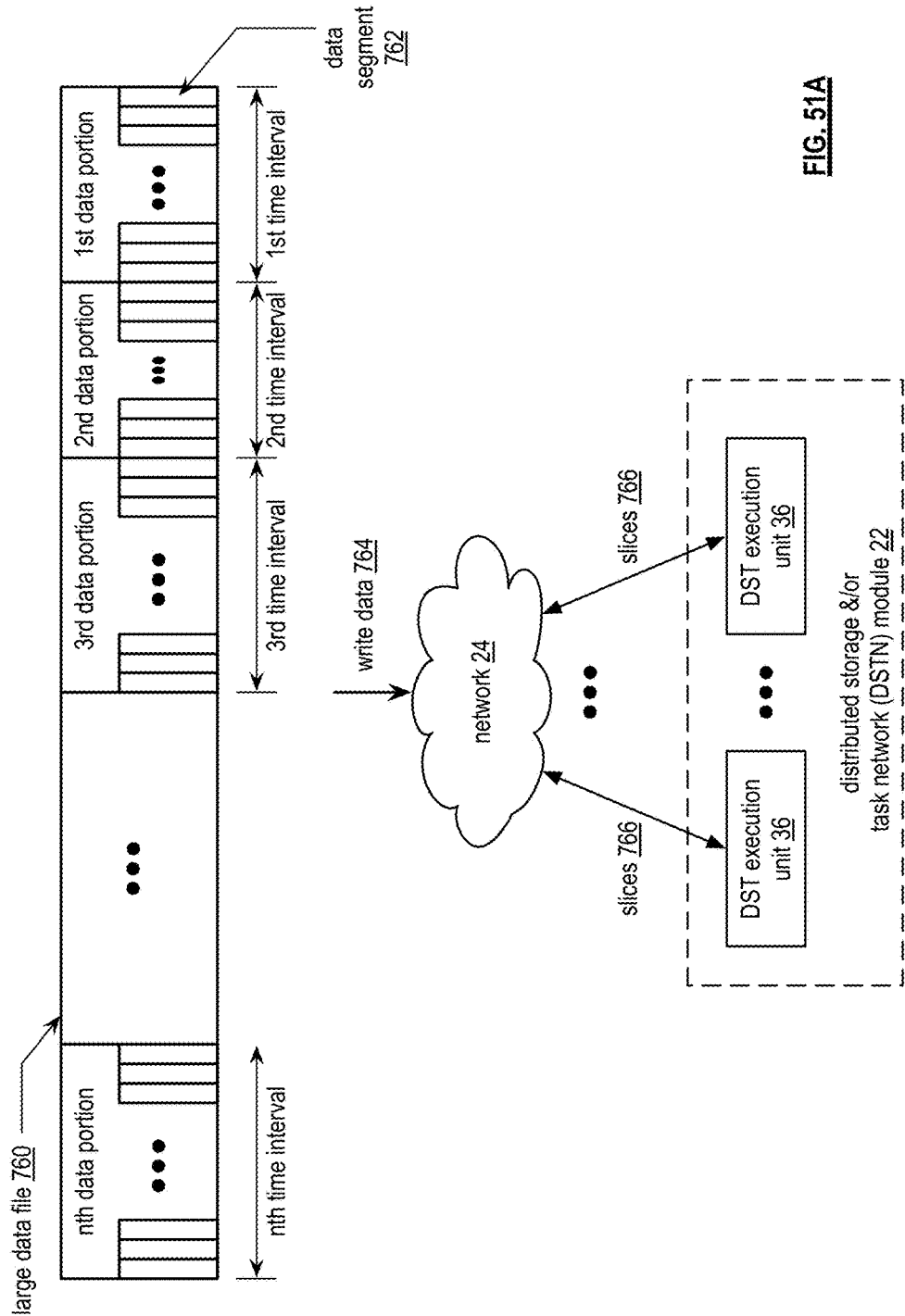
Figures 51E, 51F:
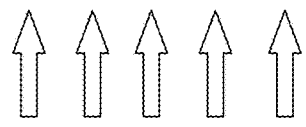
Figure 51G:
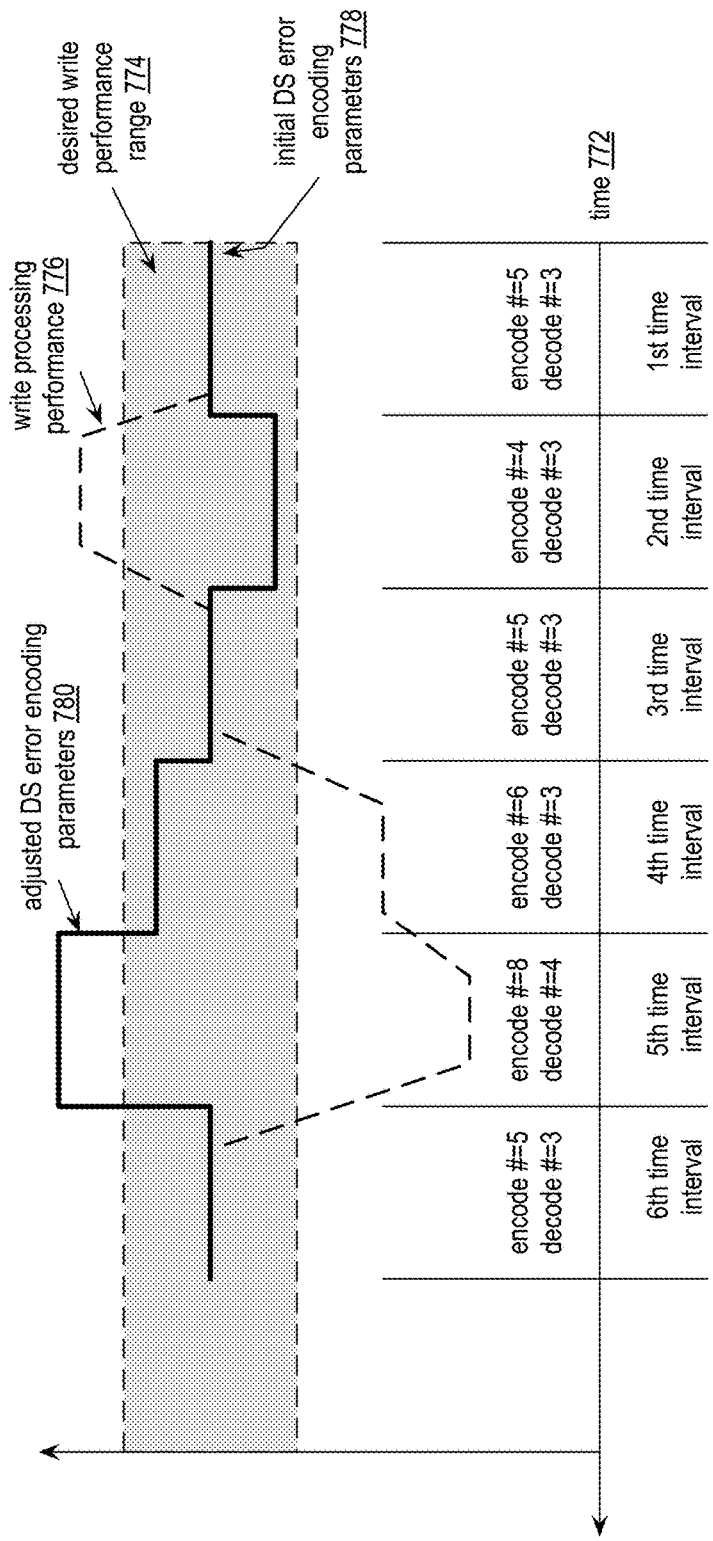
Figure 51H:
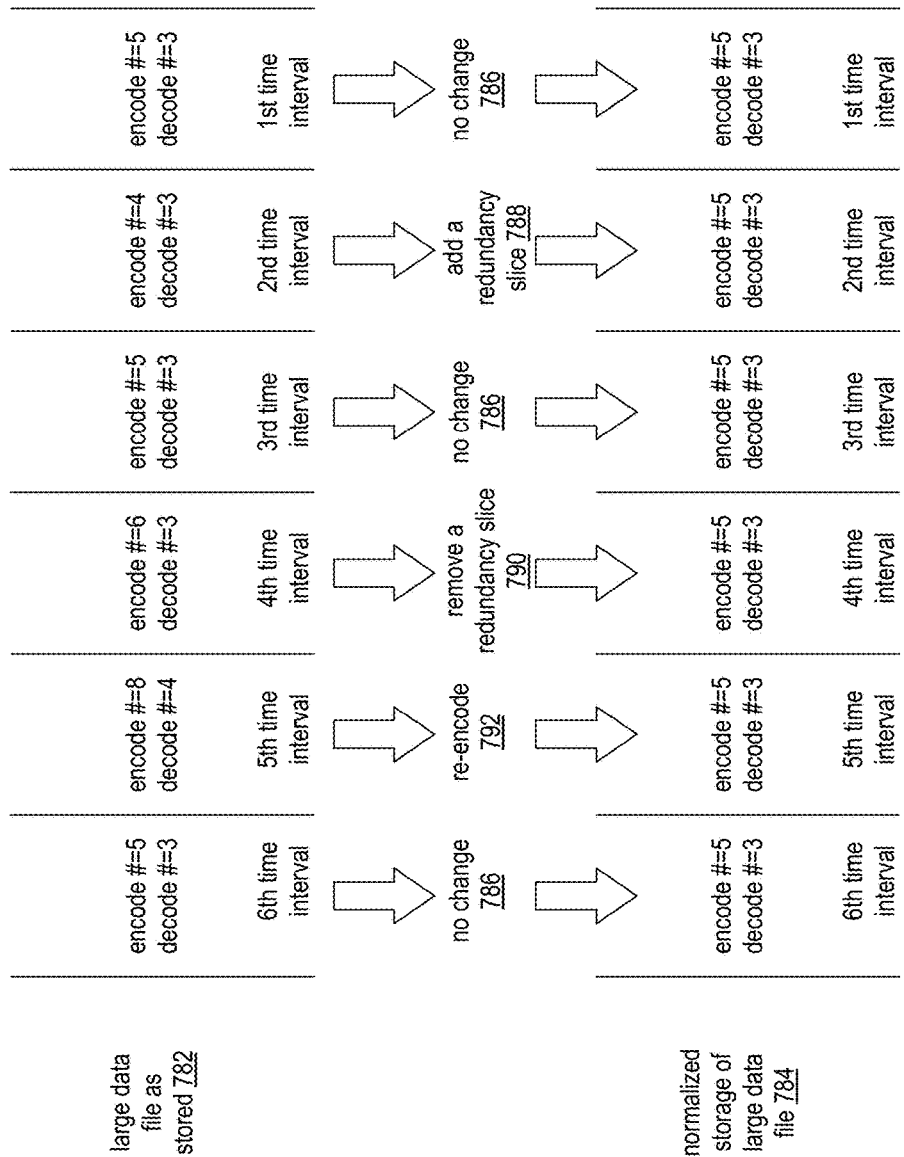
Figure 51J:
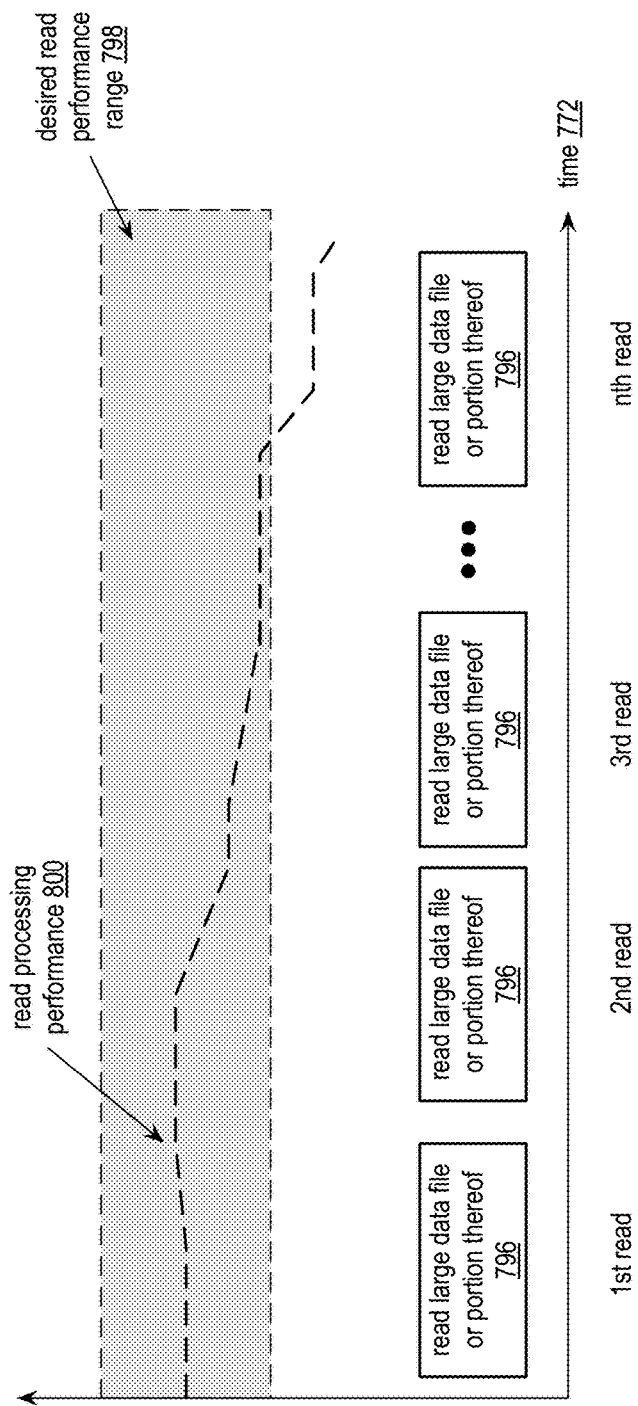
Figure 51K:
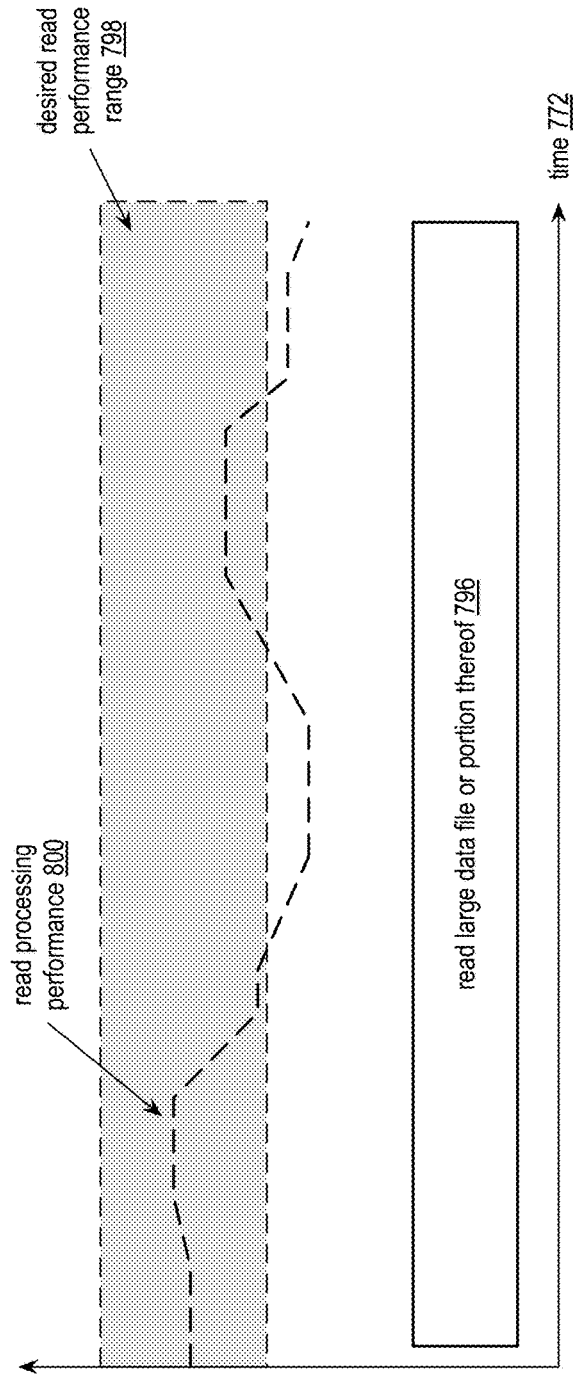
Figure 51L:
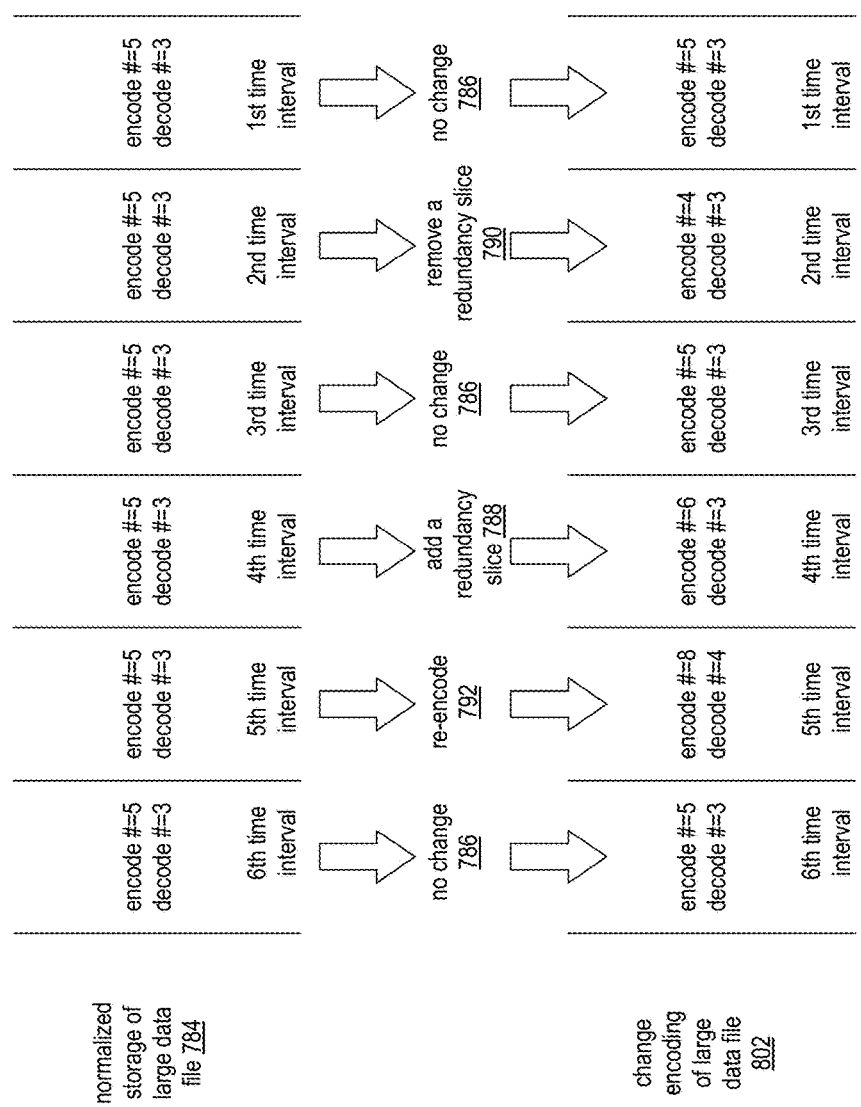
Figure 51M:
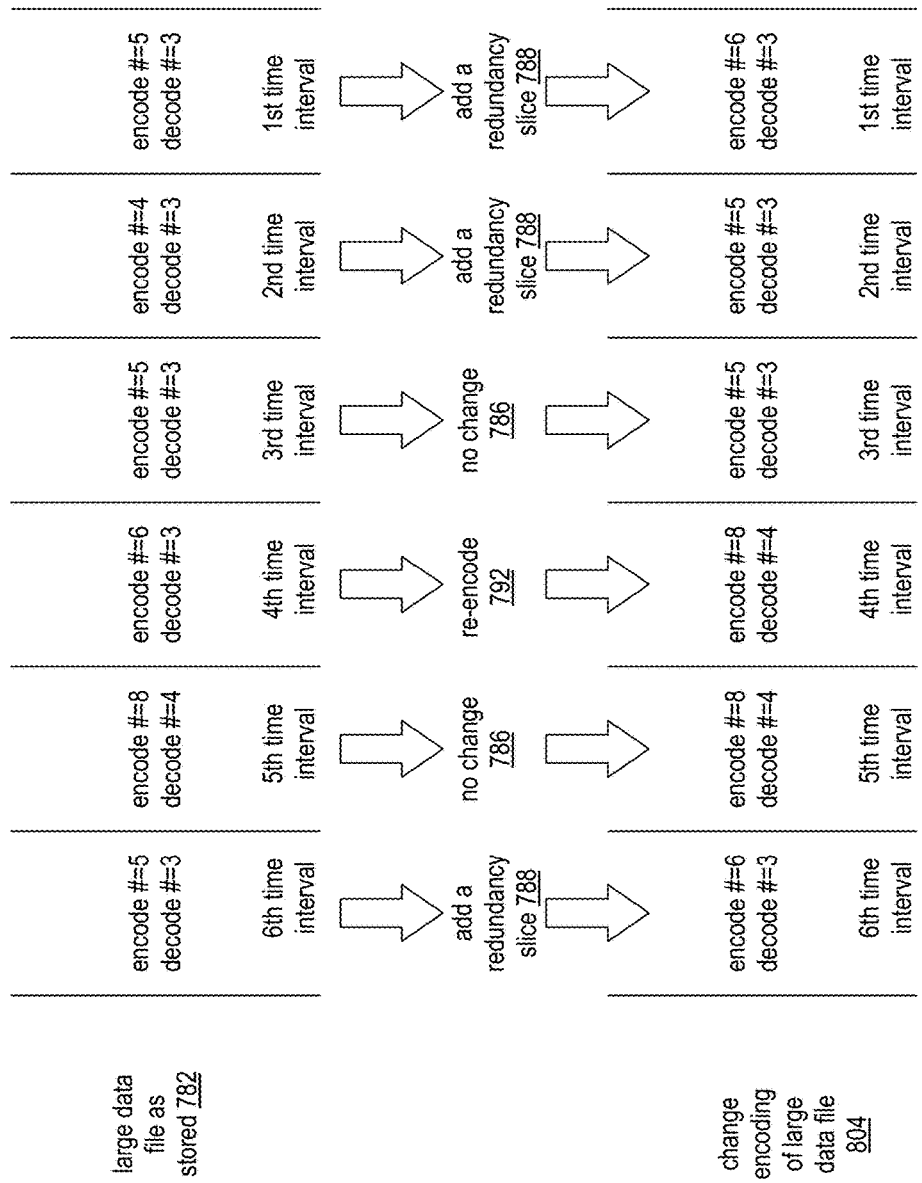
Figure 51N:
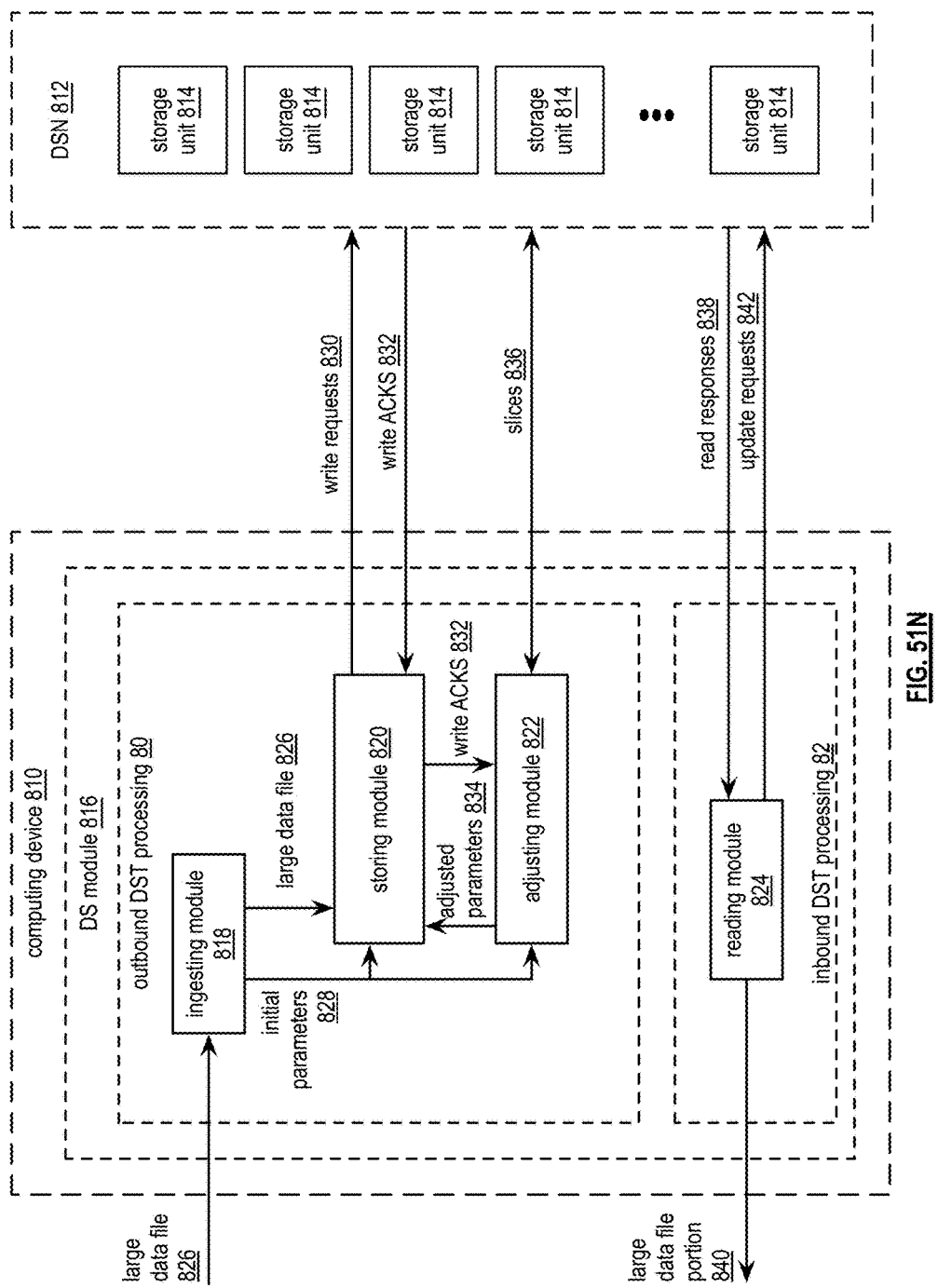
Figure 52C:
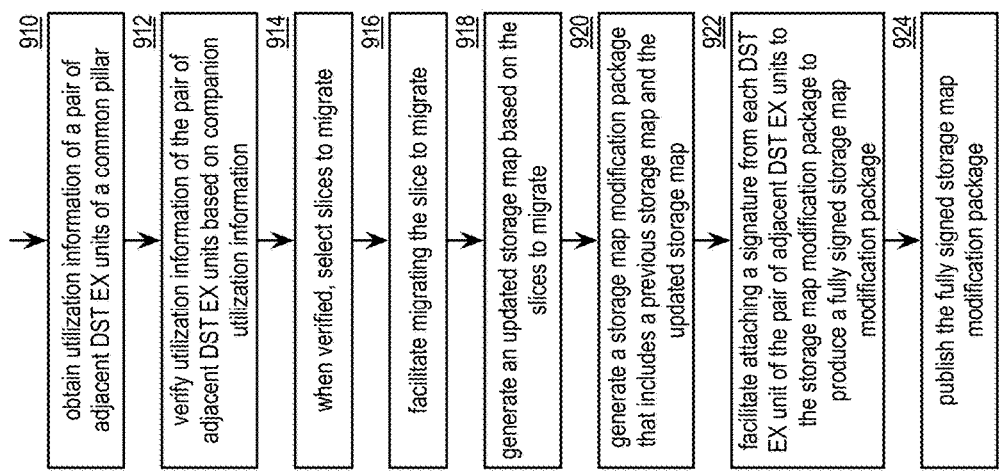

FIGS. 48G, H, and I are flowcharts illustrating another example of storing data in accordance with the present invention;

FIG. 49A is a schematic block diagram of another embodiment of a distributed computing system in accordance with the present invention;

FIG. 49B is a flowchart illustrating another example of retrieving data in accordance with the present invention;

FIG. 50A is a schematic block diagram of another embodiment of a distributed computing system in accordance with the present invention;

FIG. 50B is a flowchart illustrating an example of establishing communications in accordance with the present invention;

FIG. 51A is a diagram illustrating an example of ingesting a large data file into a dispersed storage network (DSN) in accordance with the present invention;

FIG. 51B is a diagram illustrating an example of encoding a data segment into a plurality of data blocks in accordance with the present invention;

FIG. 51C is a diagram illustrating an example of matrix multiplication of an encoding matrix and a data matrix to produce a coded matrix in accordance with the present invention;

FIG. 51D is a diagram illustrating an example of matrix multiplication of an encoding matrix and a data matrix to produce a coded matrix using initial dispersed storage error encoding parameters in accordance with the present invention;

FIG. 51E is a diagram illustrating an example of generating a set of encoded data slices from a coded matrix in accordance with the present invention;

FIG. 51F is a diagram illustrating an example of matrix multiplication of an encoding matrix and a data matrix to produce a coded matrix using adjusted dispersed storage error encoding parameters in accordance with the present invention;

FIG. 51G is a timing diagram illustrating an example of adjusting dispersed storage error encoding parameters based on write processing performance information in accordance with the present invention;

FIG. 51H is a diagram illustrating an example of normalizing dispersed storage error encoding parameters in accordance with the present invention;

FIG. 51I is a diagram illustrating an example of reading a large data file from a dispersed storage network (DSN) in accordance with the present invention;

FIGS. 51J-K are timing diagrams illustrating examples of adjusting dispersed storage error encoding parameters based on read processing performance information in accordance with the present invention;

FIGS. 51L-M are diagrams illustrating examples of changing dispersed storage error encoding parameters in accordance with the present invention;

FIG. 51N is a schematic block diagram of another embodiment of a dispersed storage network system in accordance with the present invention;

FIG. 51O is a flowchart illustrating an example of adjusting dispersed storage error encoding parameters in accordance with the present invention;

FIG. 52A is a diagram illustrating an example of an initial storage map structure in accordance with the present invention;

FIG. 52B is a diagram illustrating an example of a storage map modification package structure in accordance with the present invention; and FIG. 52C is a flowchart illustrating an example of migrating slices in accordance with the present invention.

DETAILED DESCRIPTION OF THE INVENTION

Figure 1:
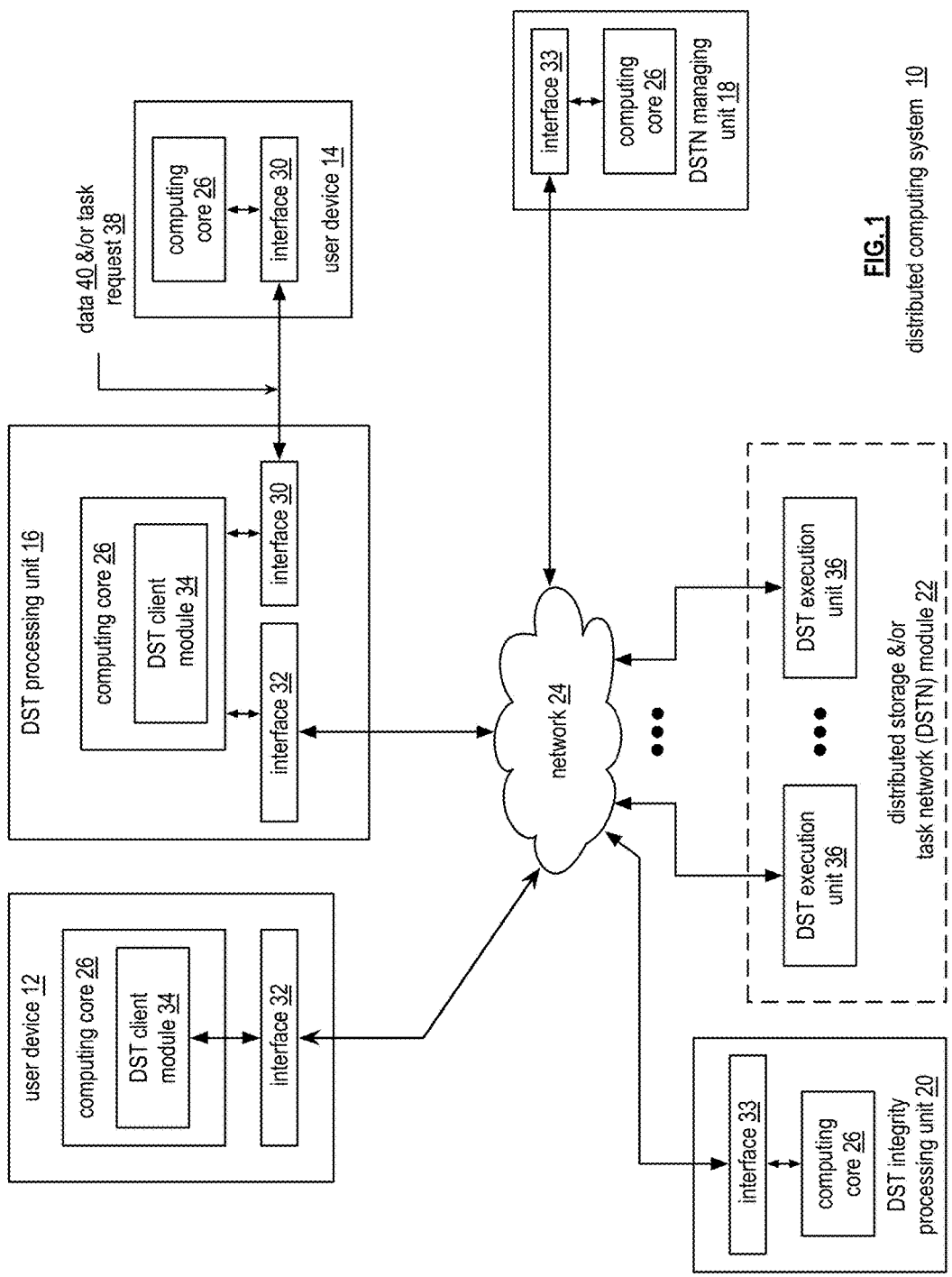
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
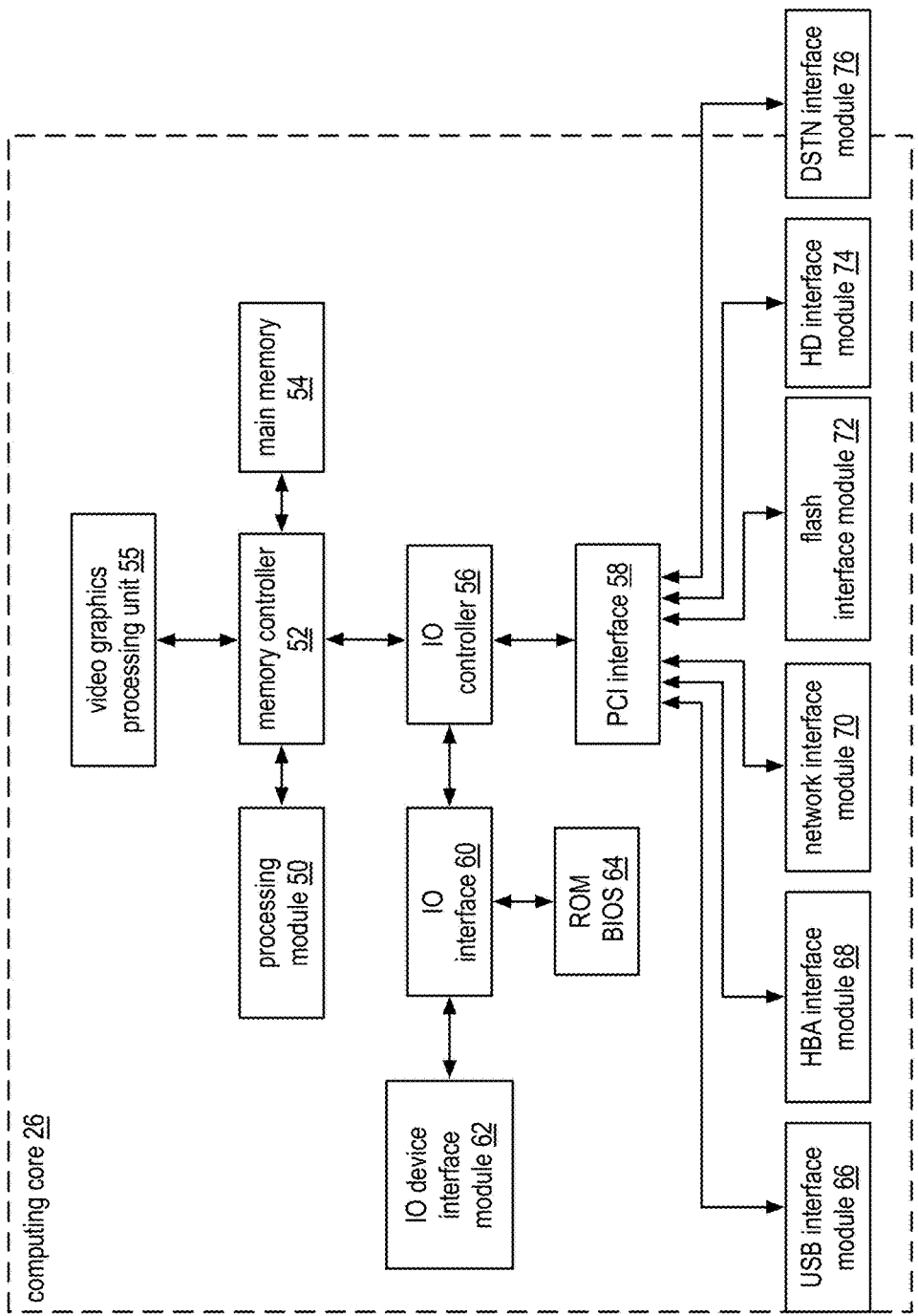
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
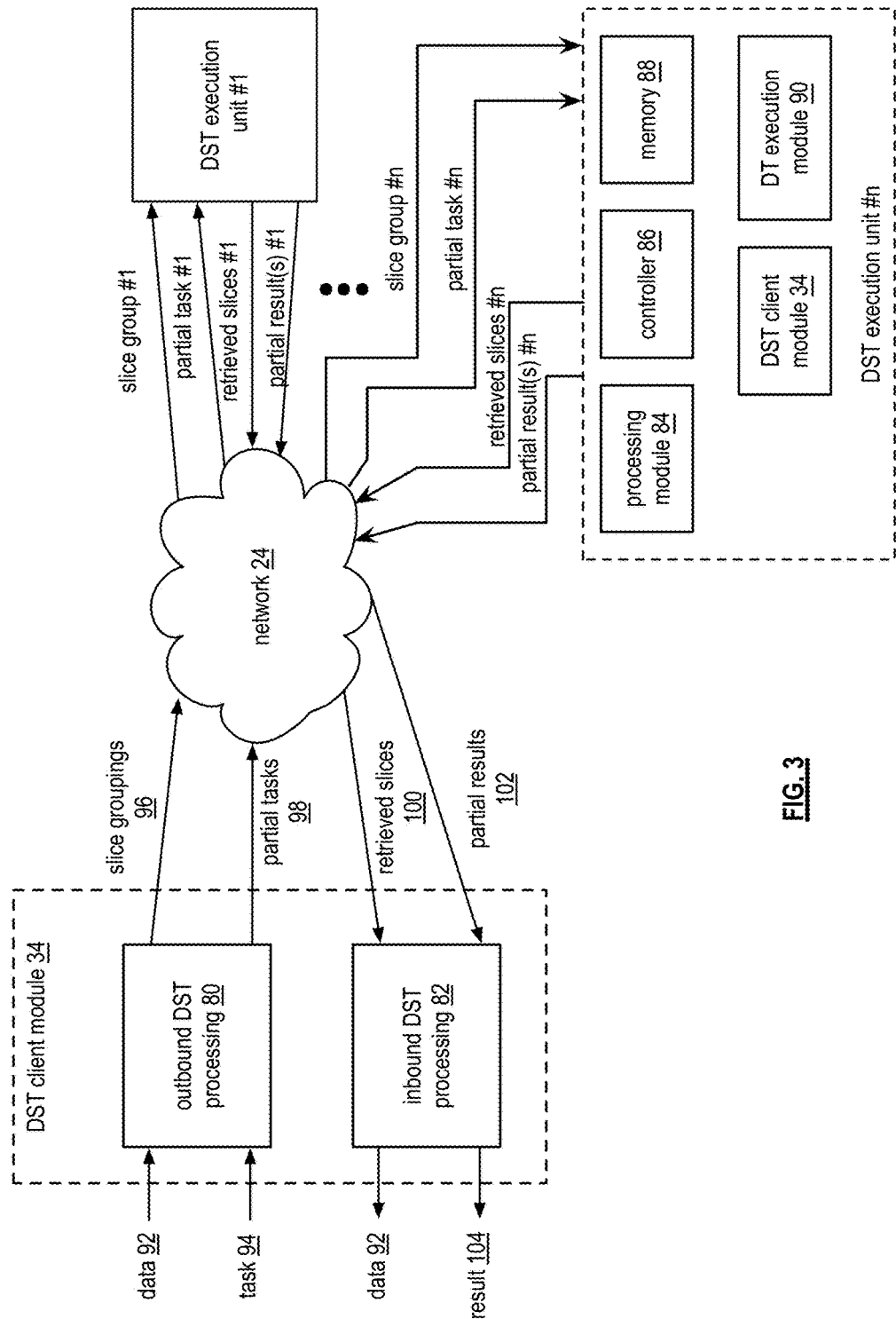
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
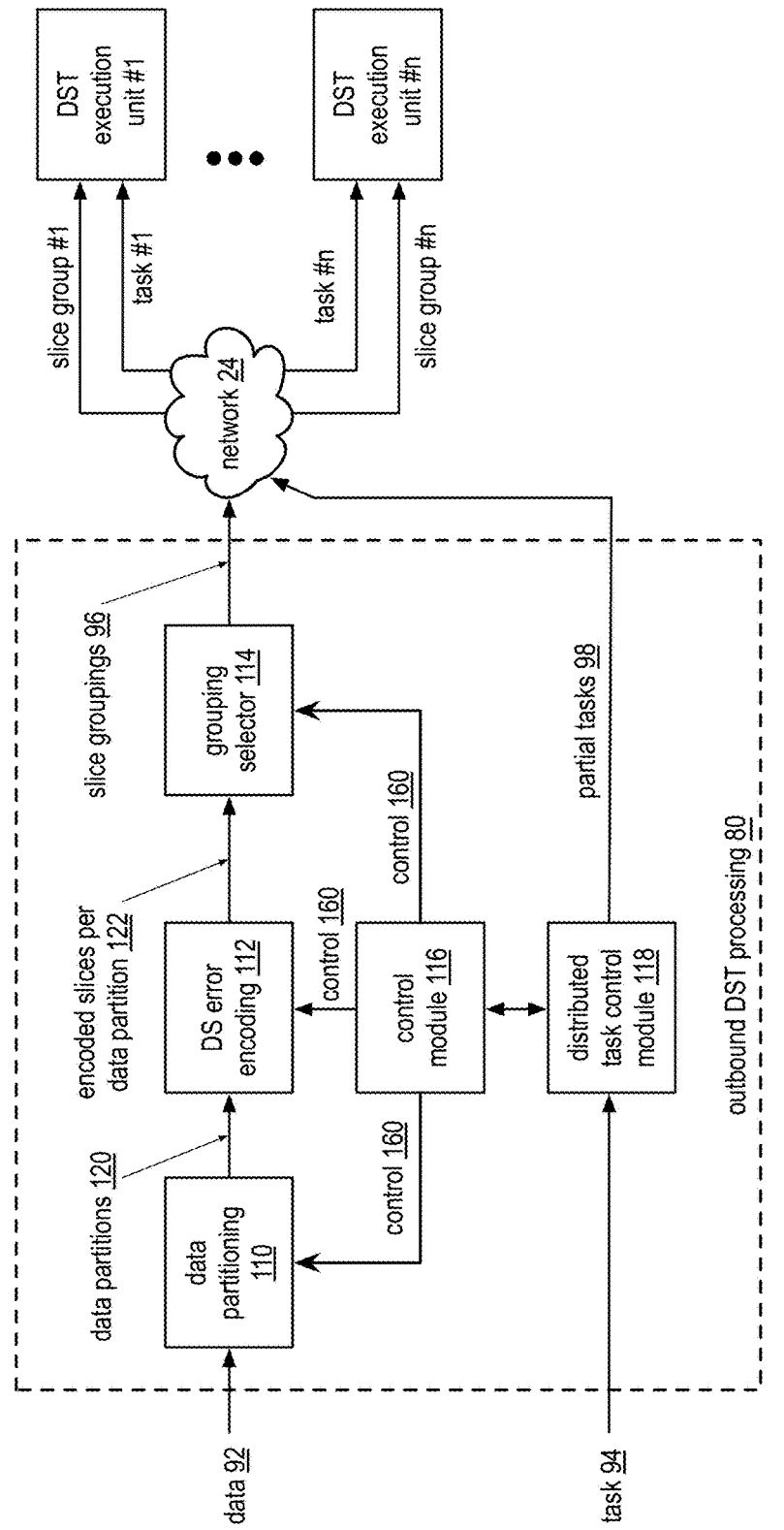
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120.

The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recources, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
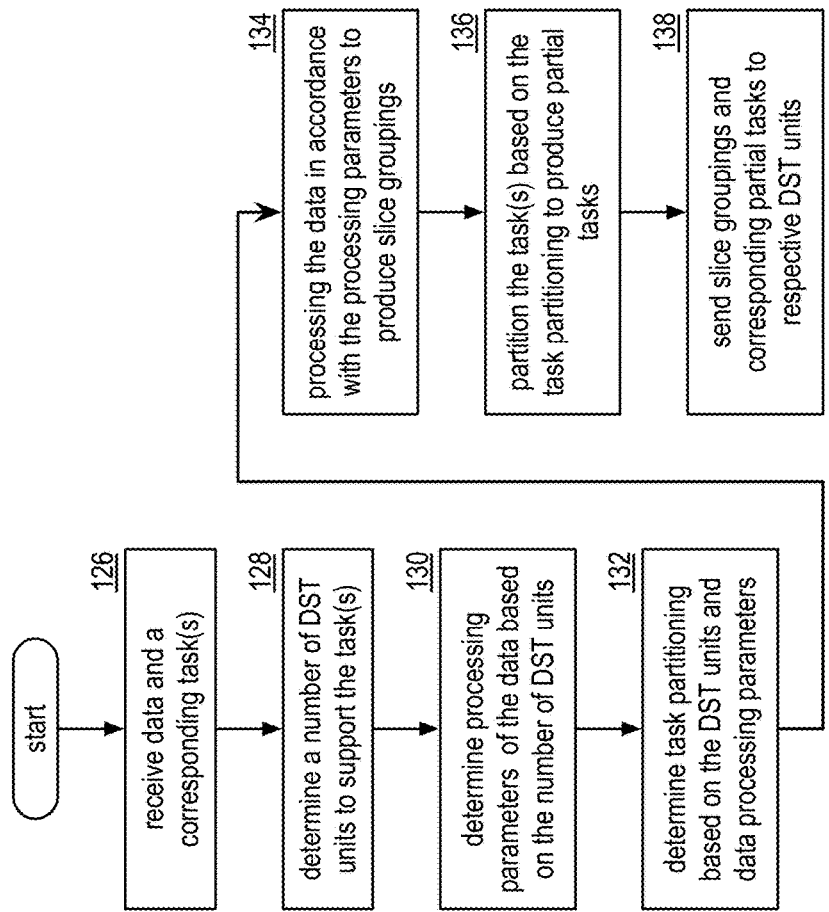
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
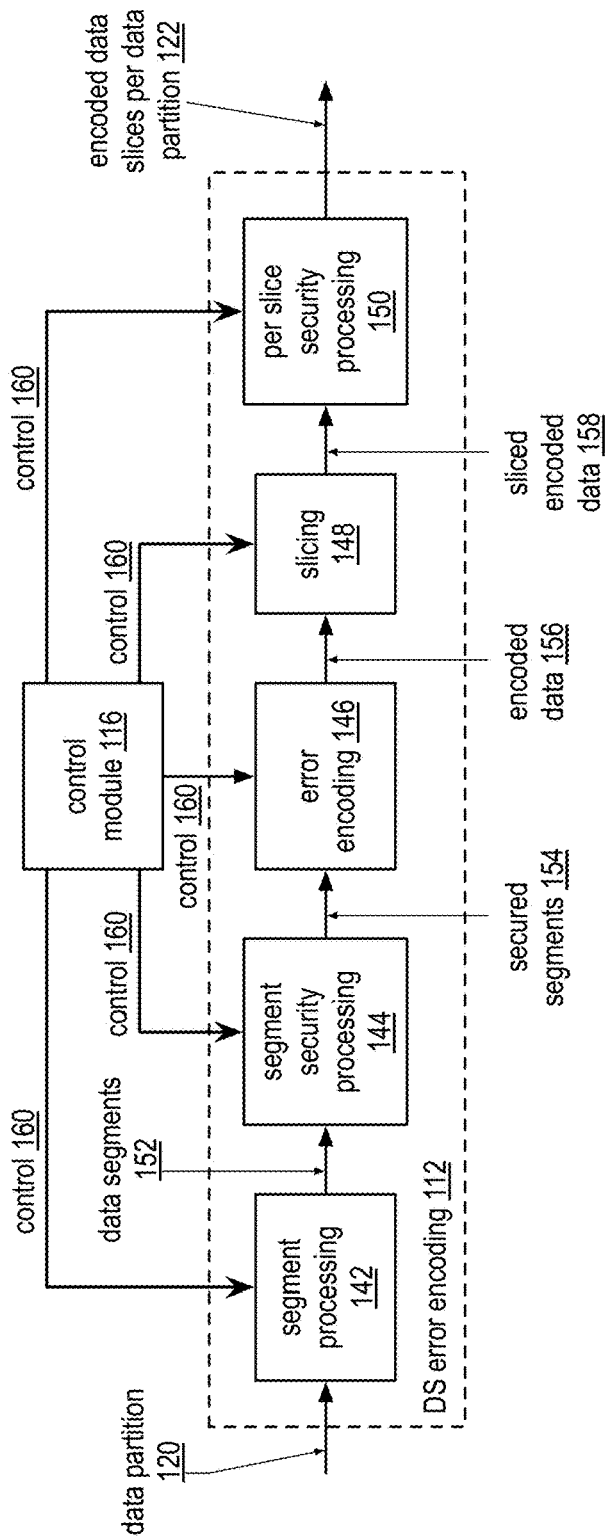
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
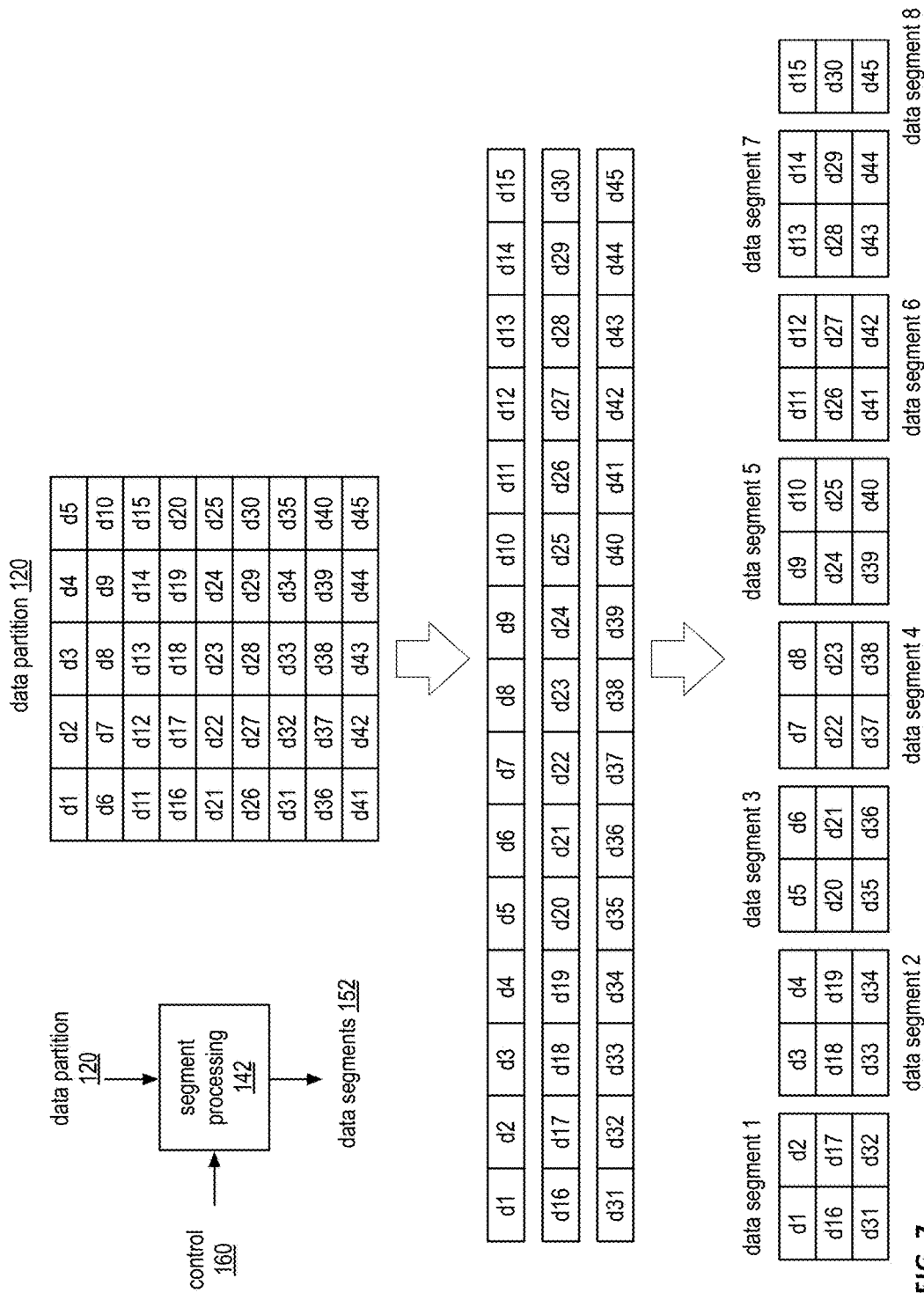
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
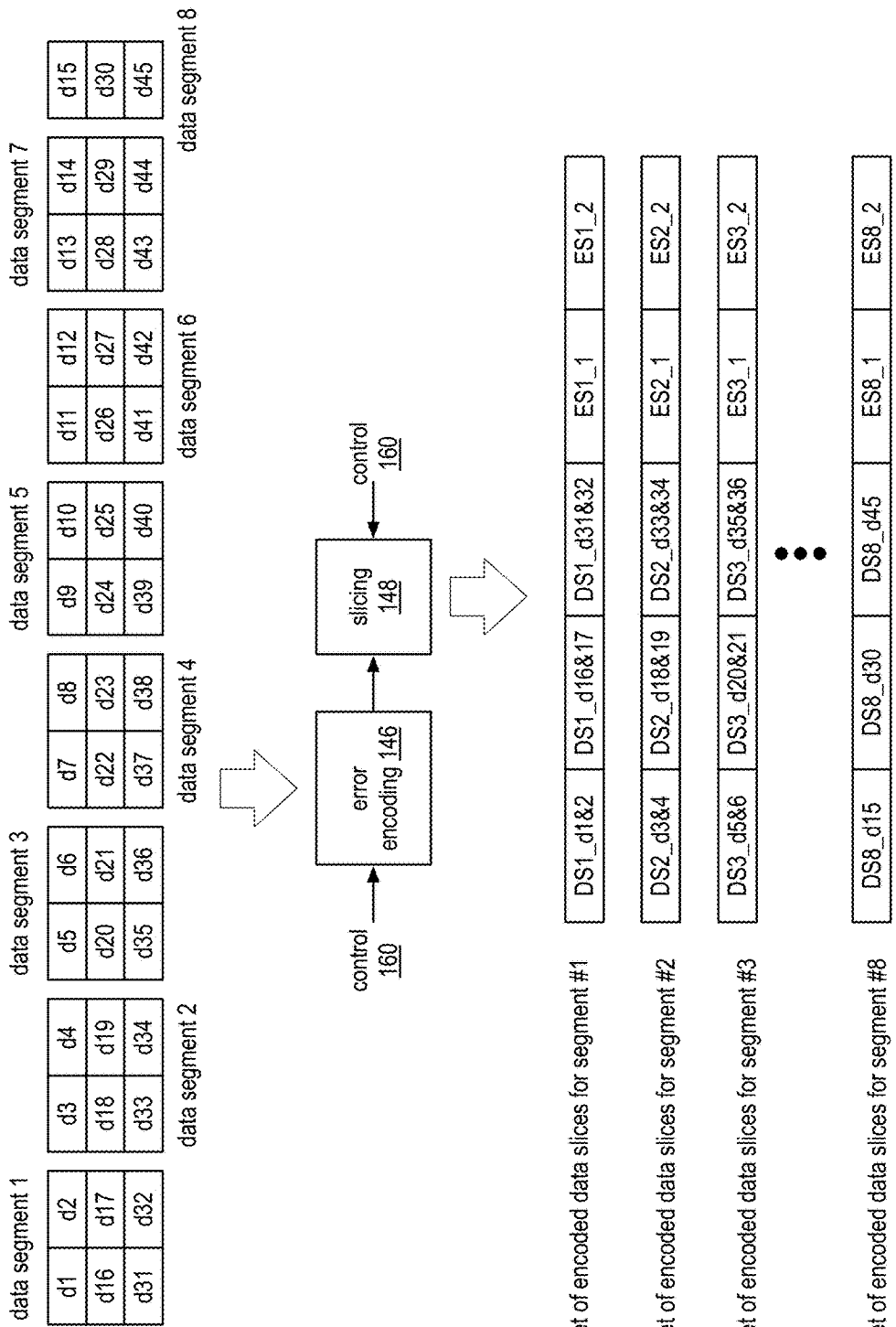
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
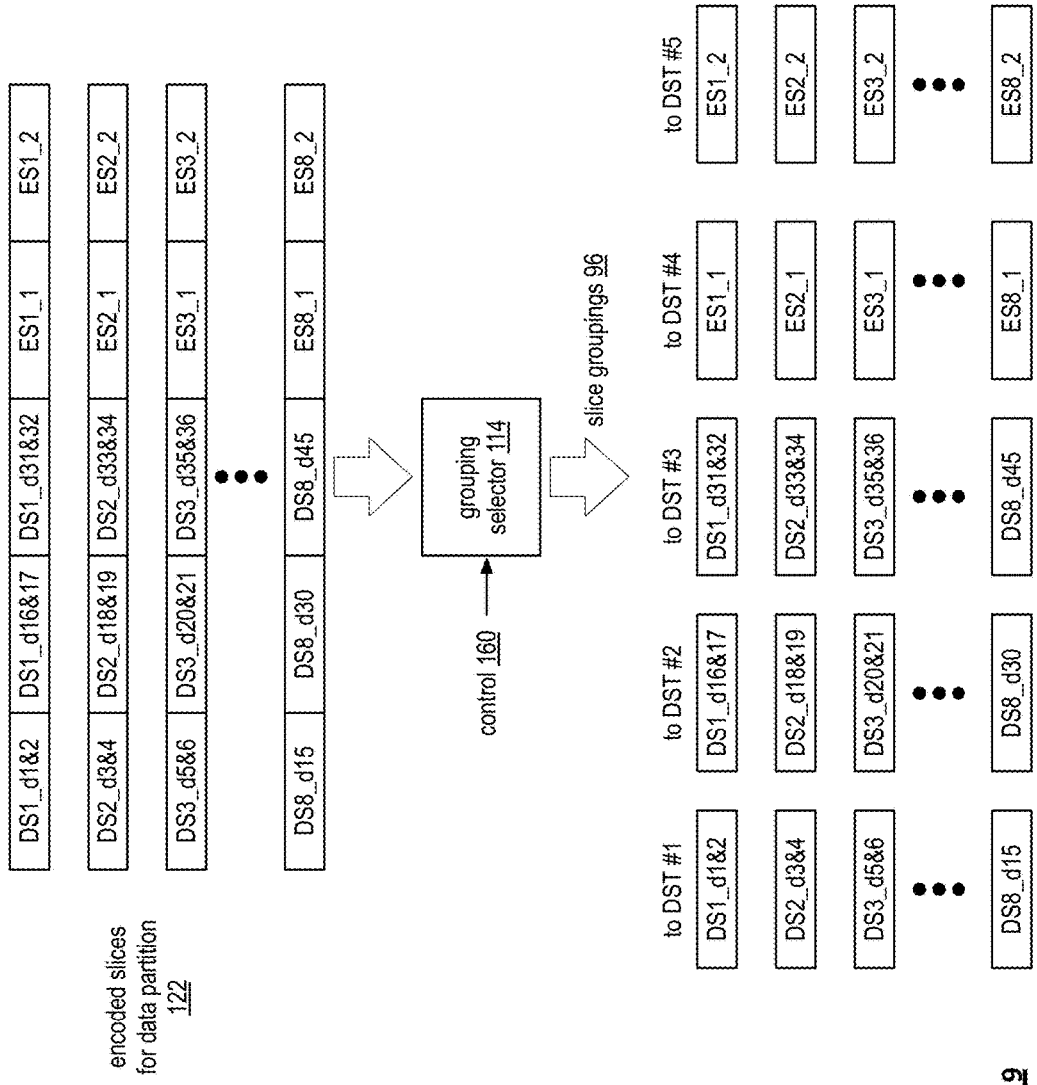
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
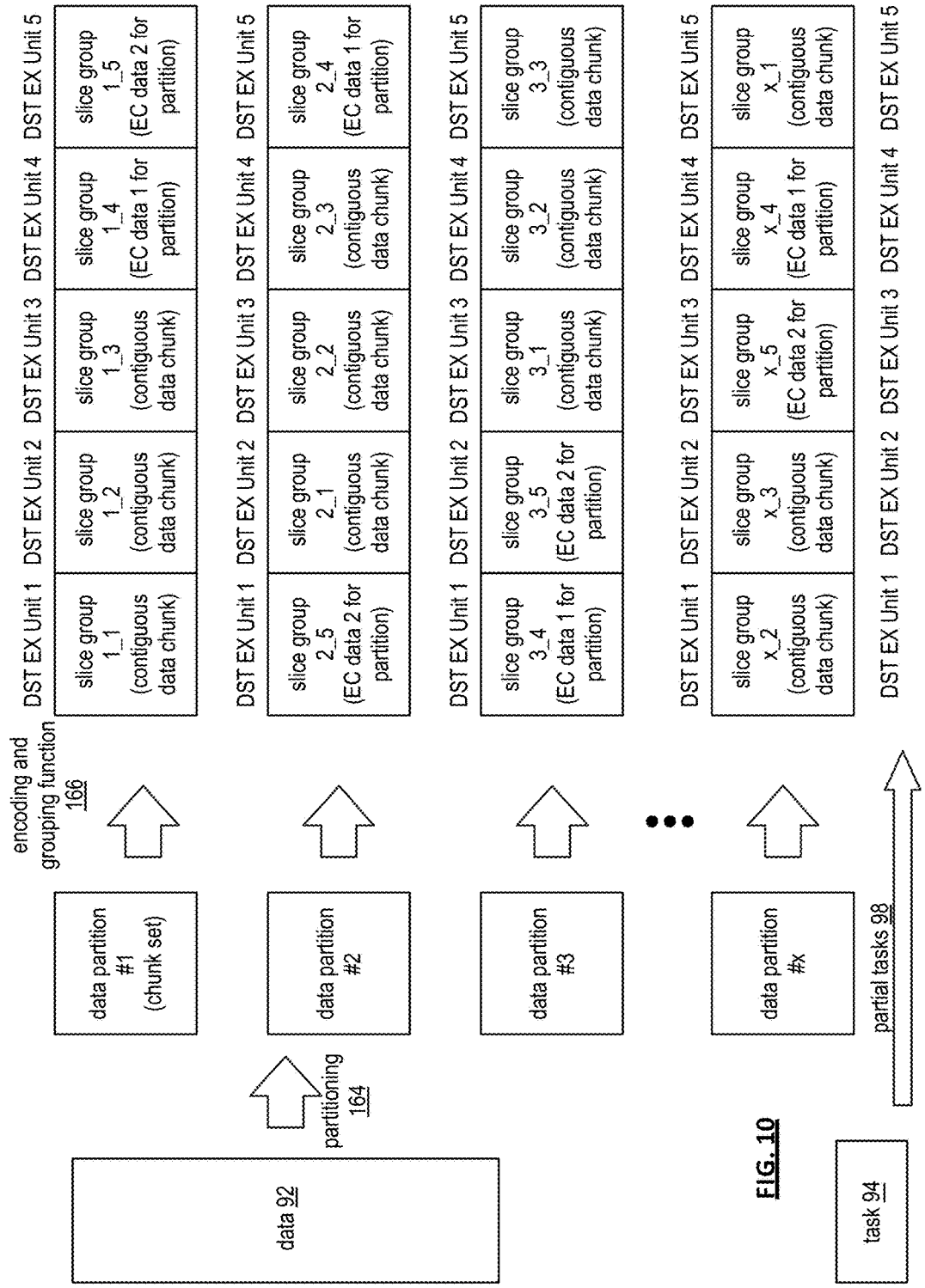
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
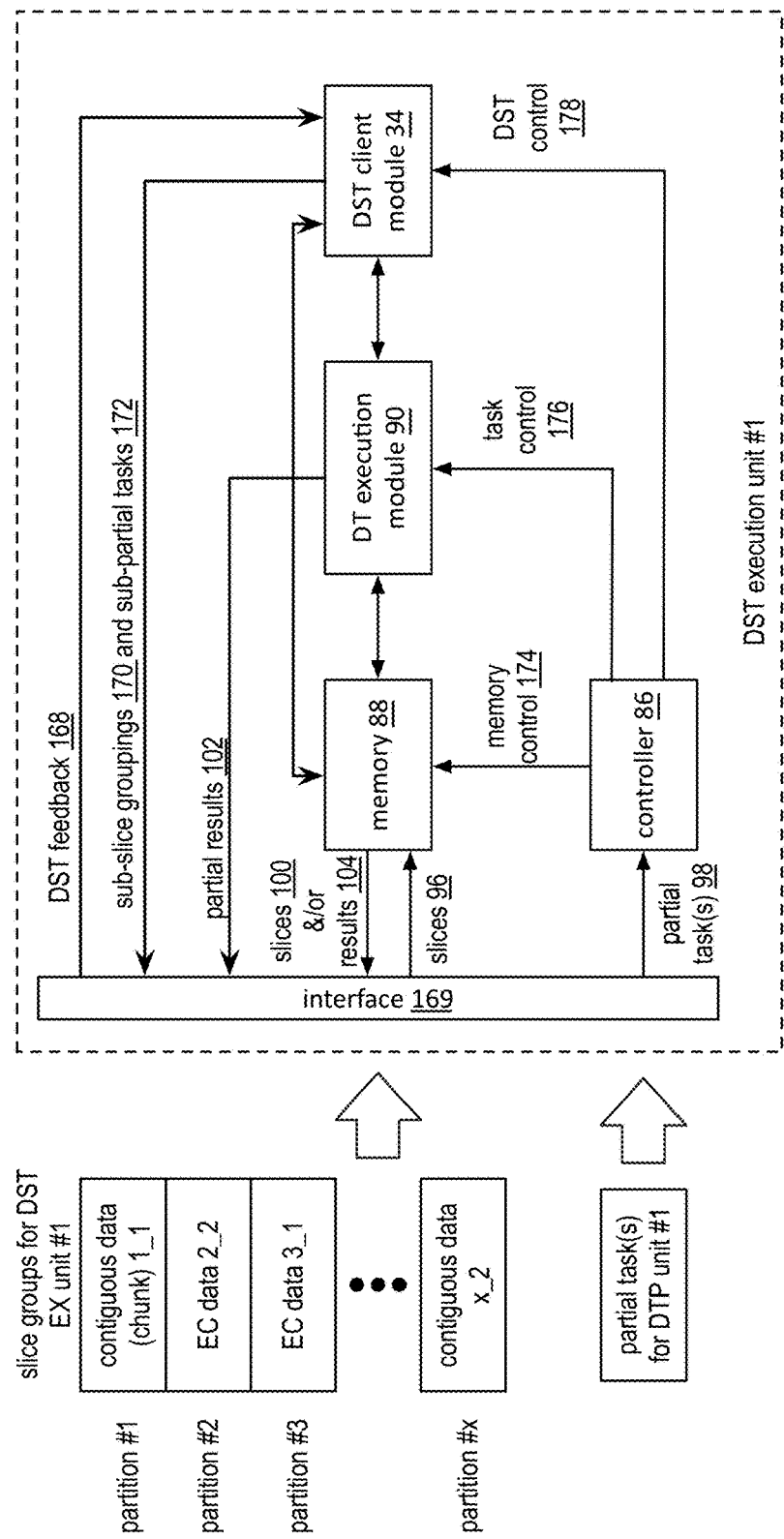
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
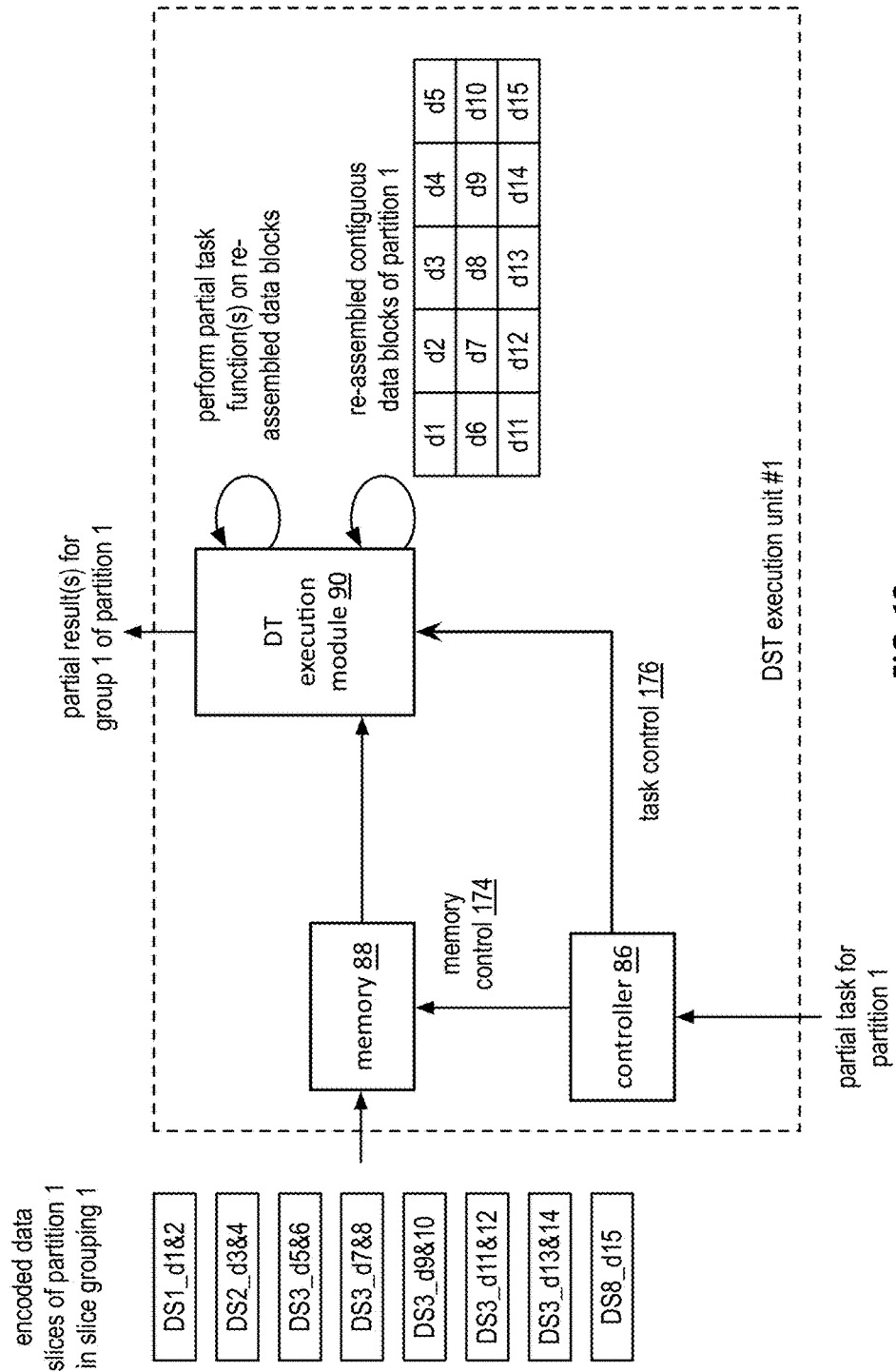
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks.

The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
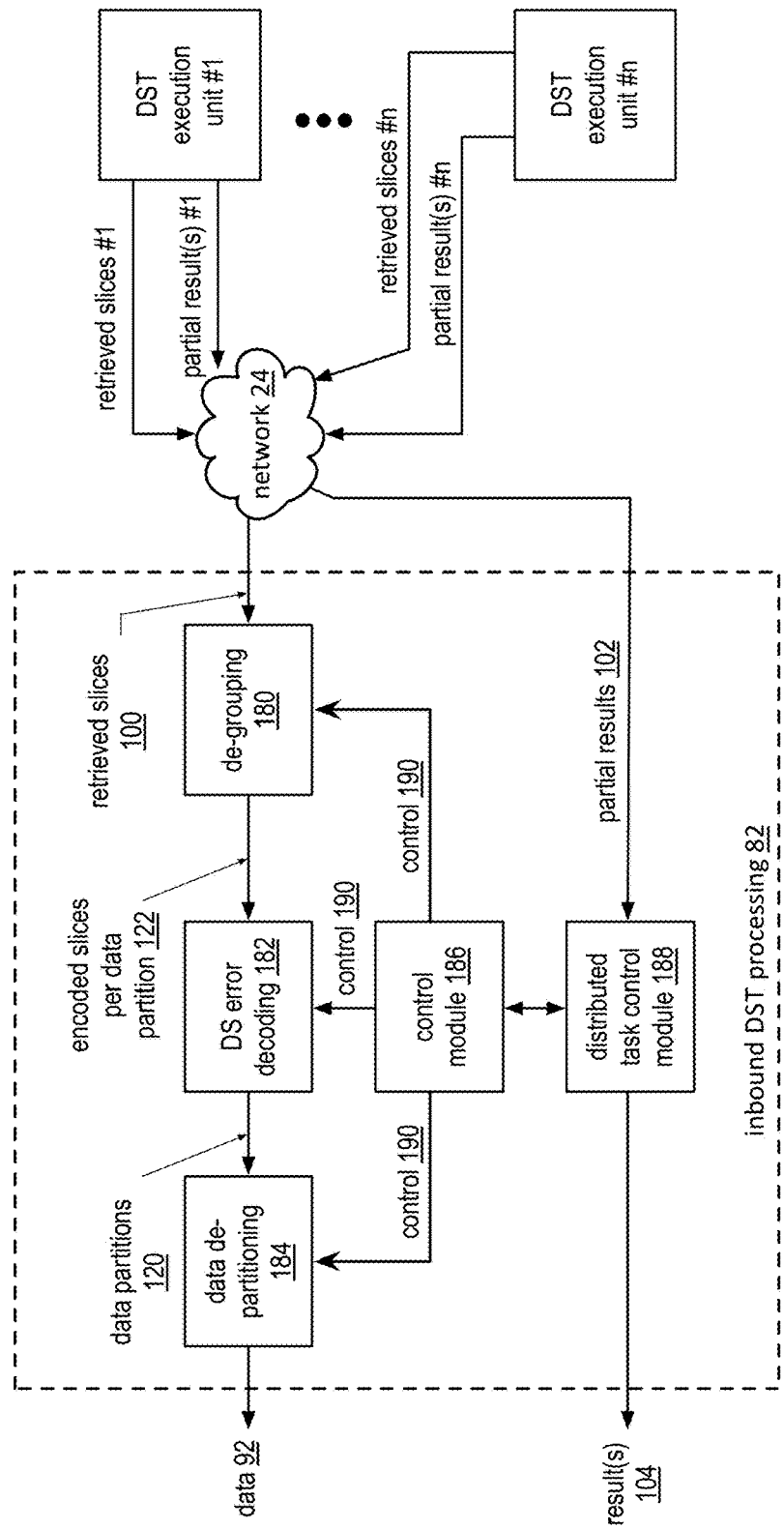
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
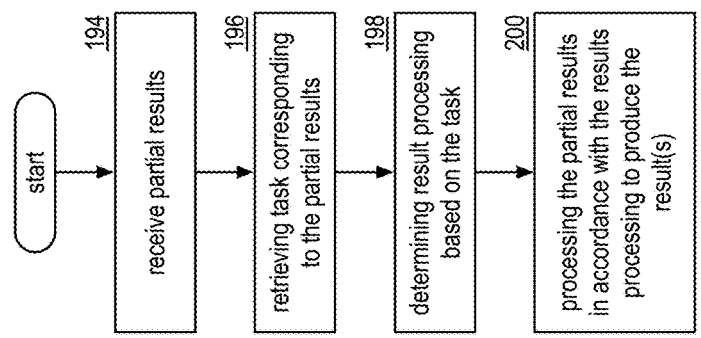
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
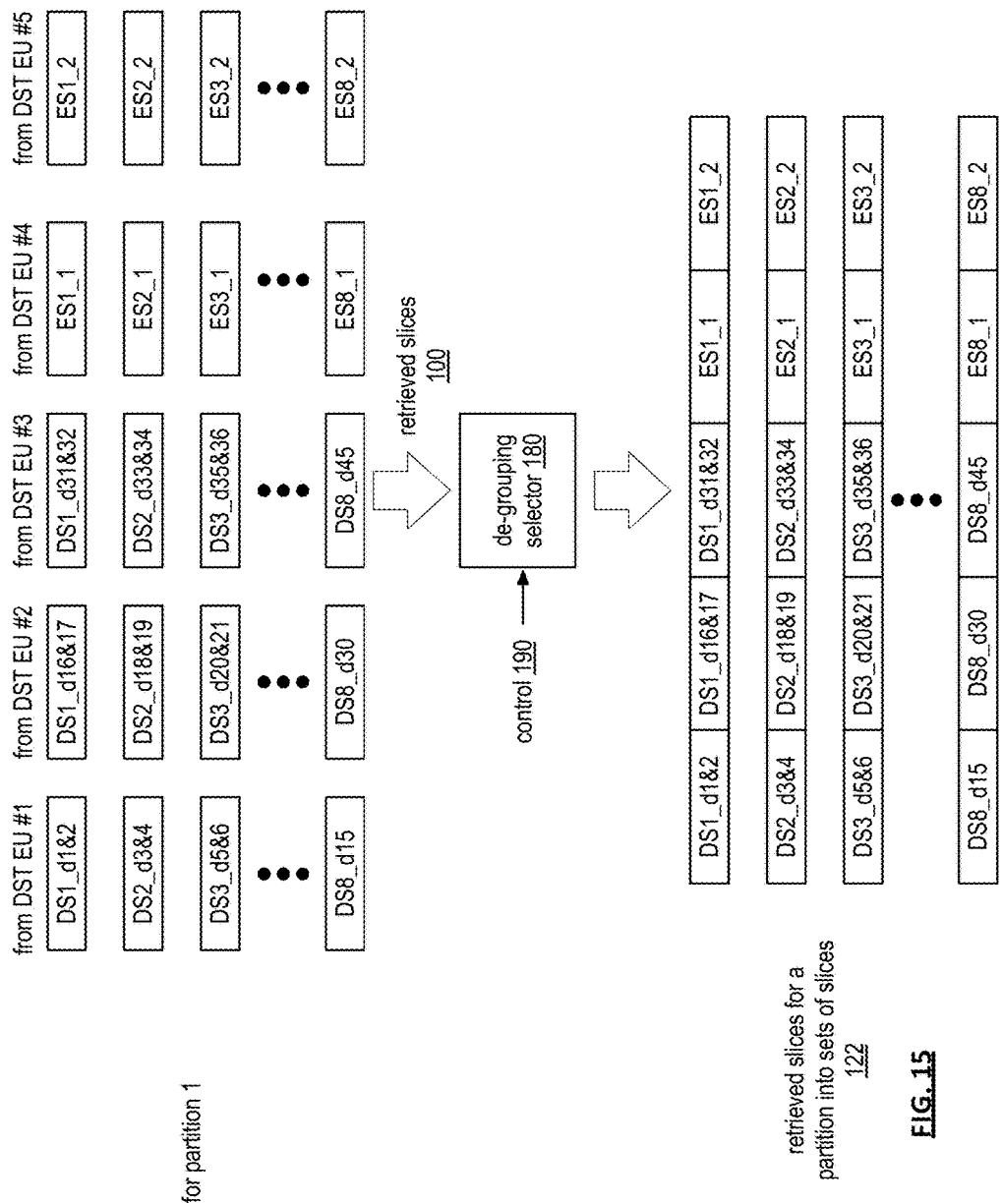
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
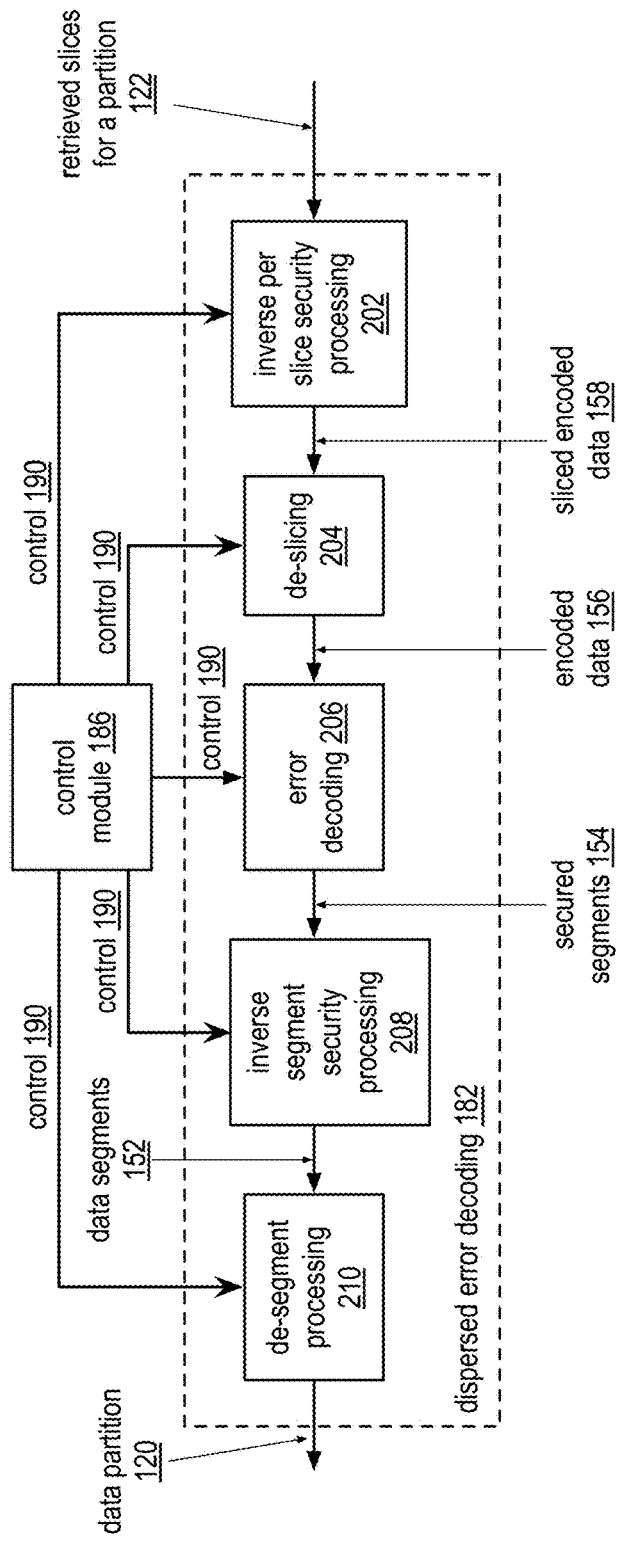
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
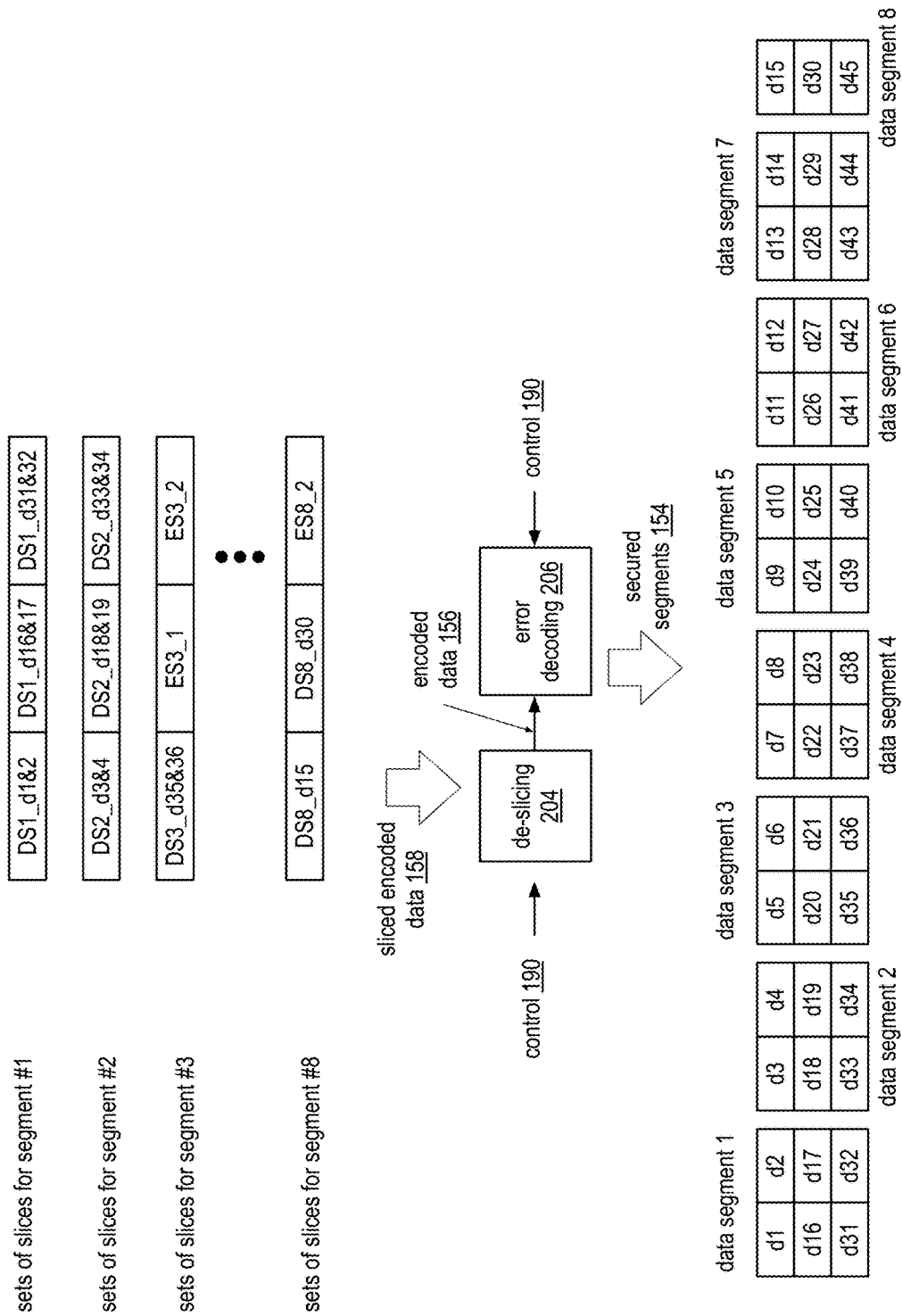
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
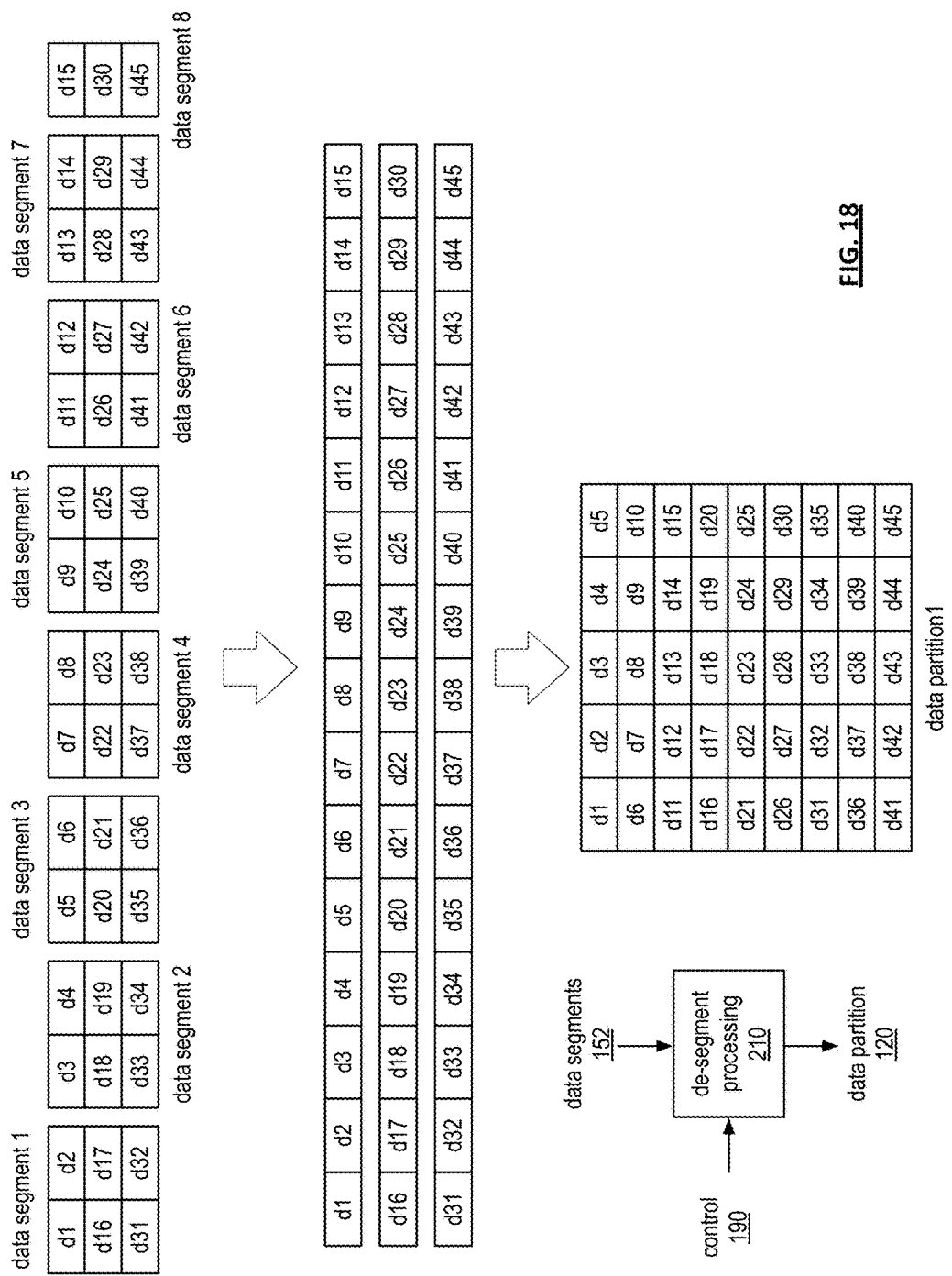
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
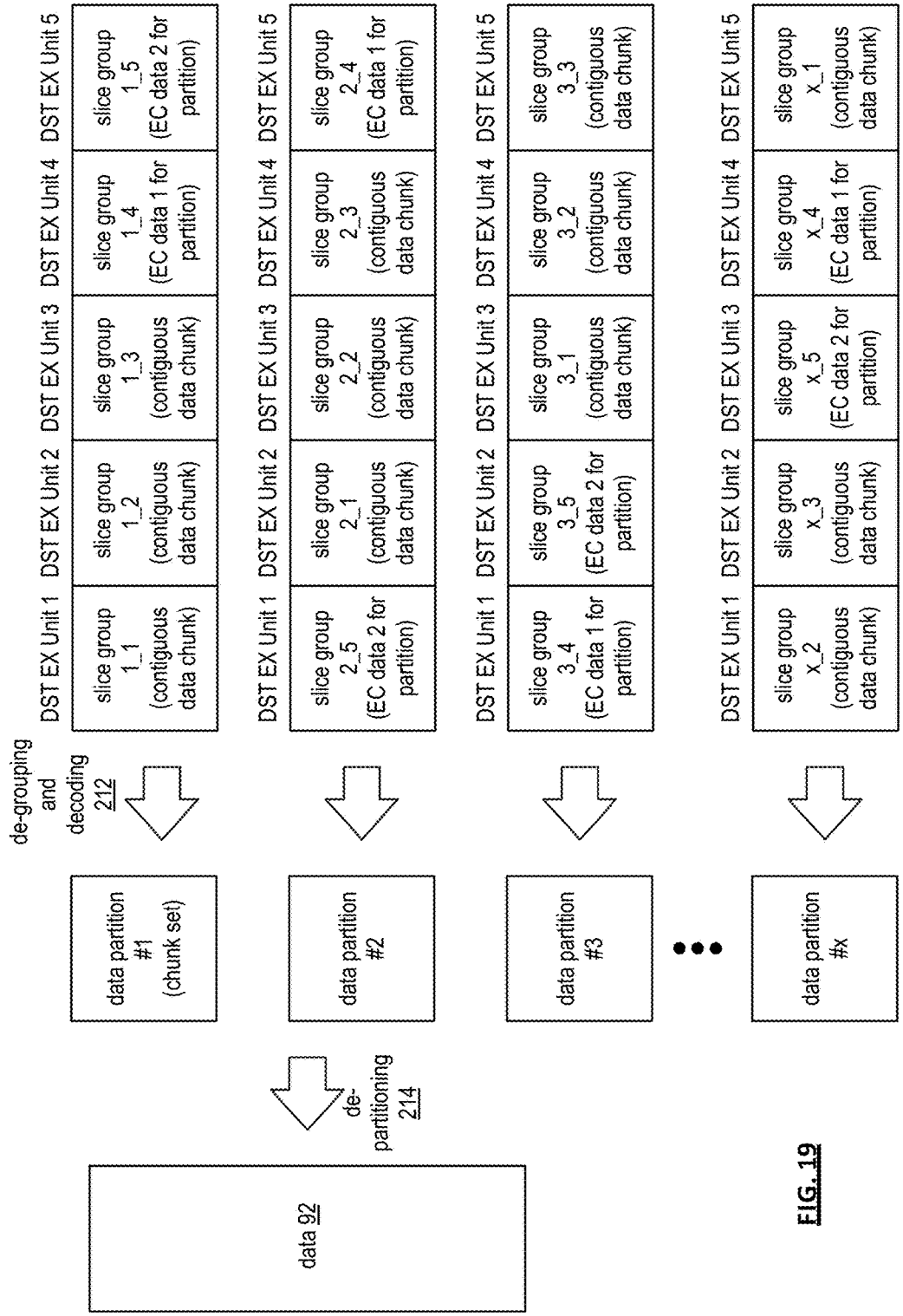
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
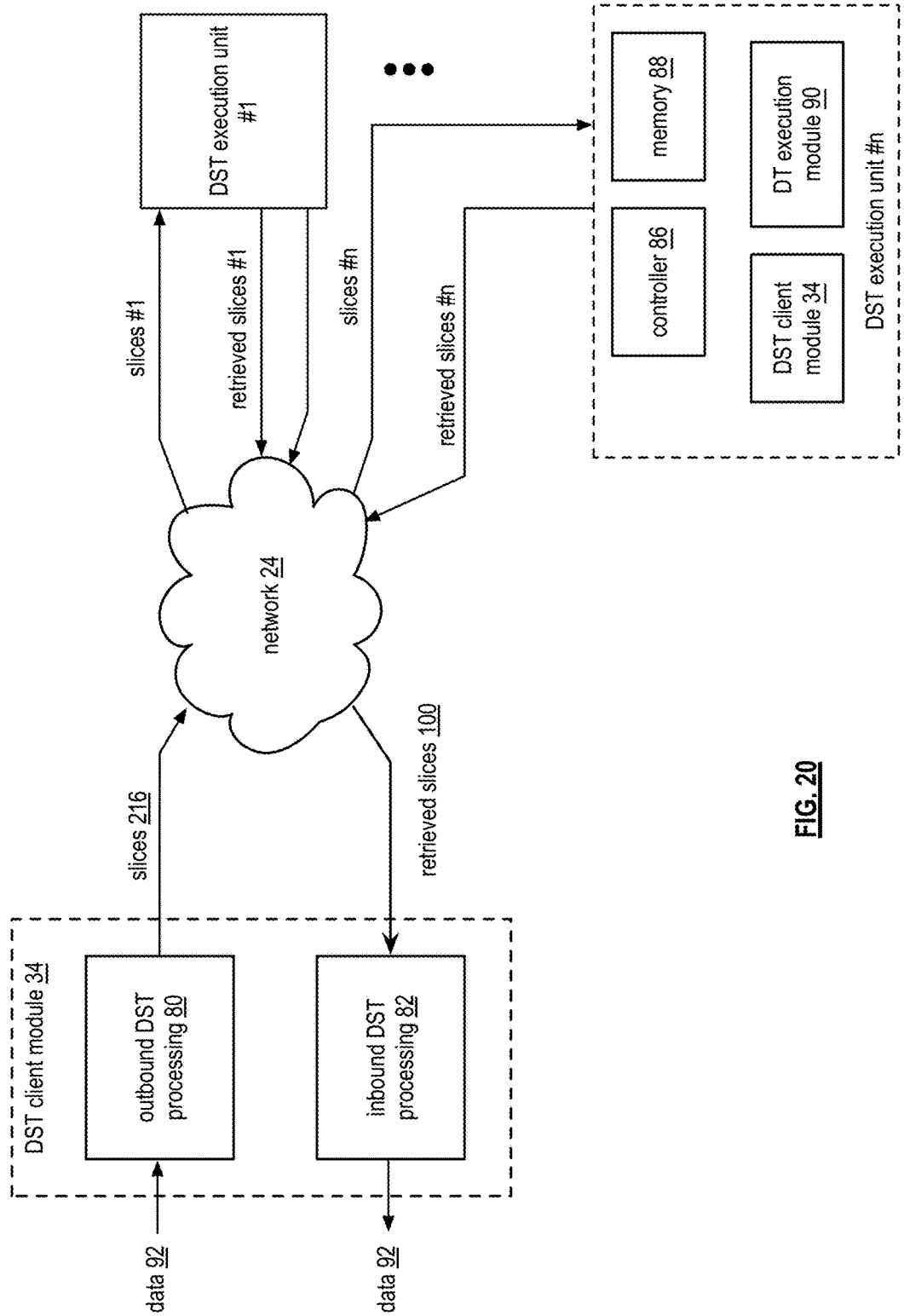
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
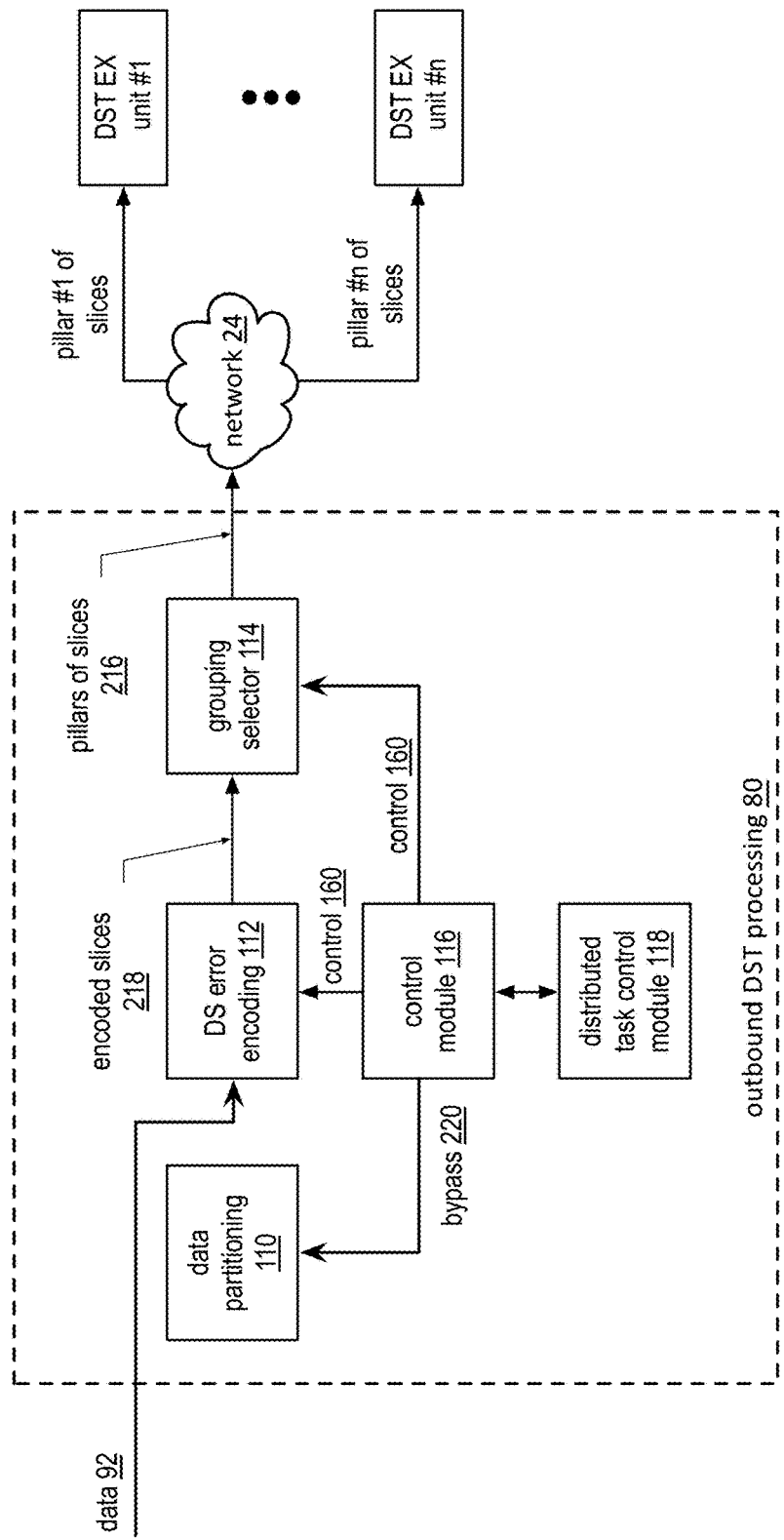
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
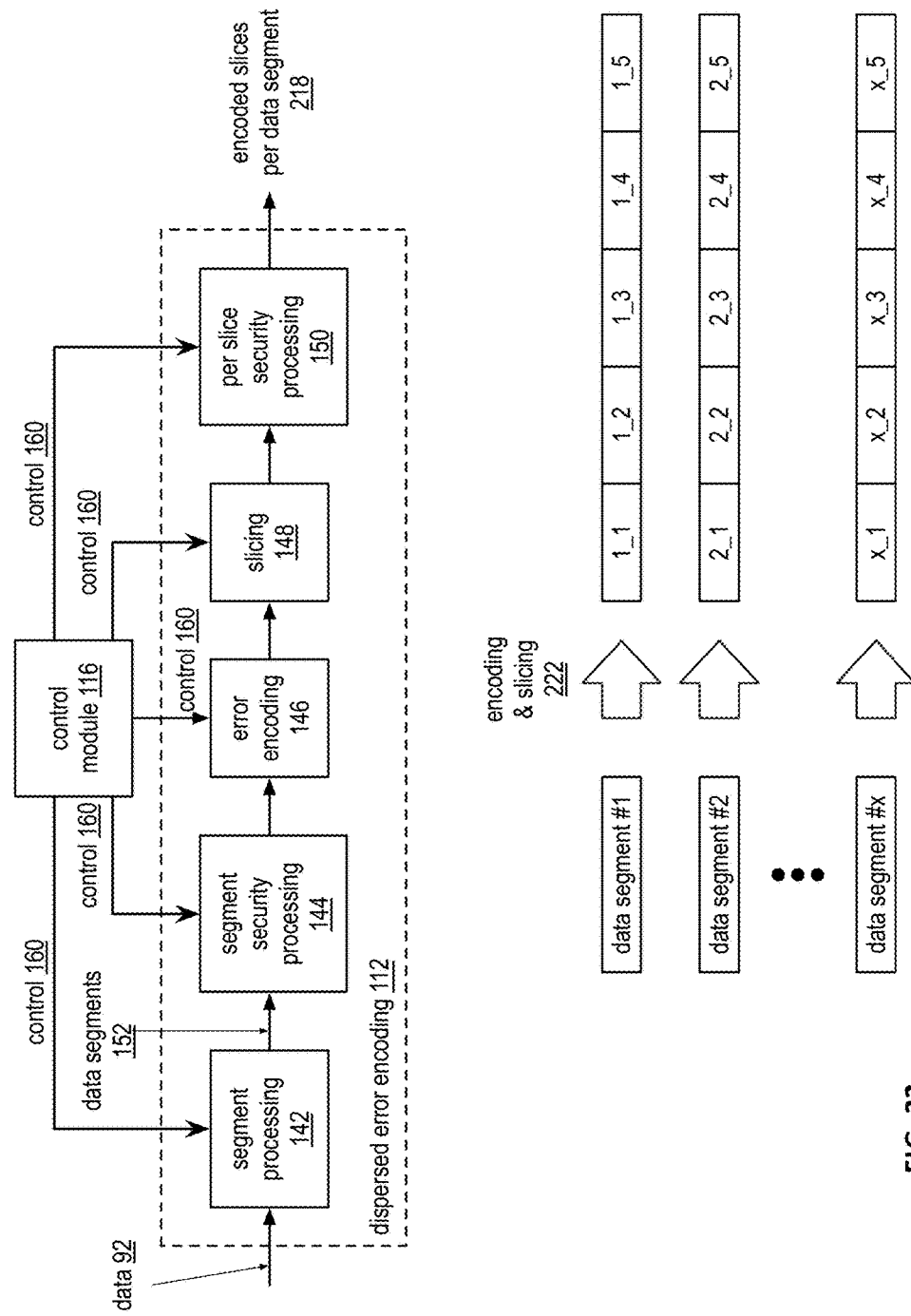
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
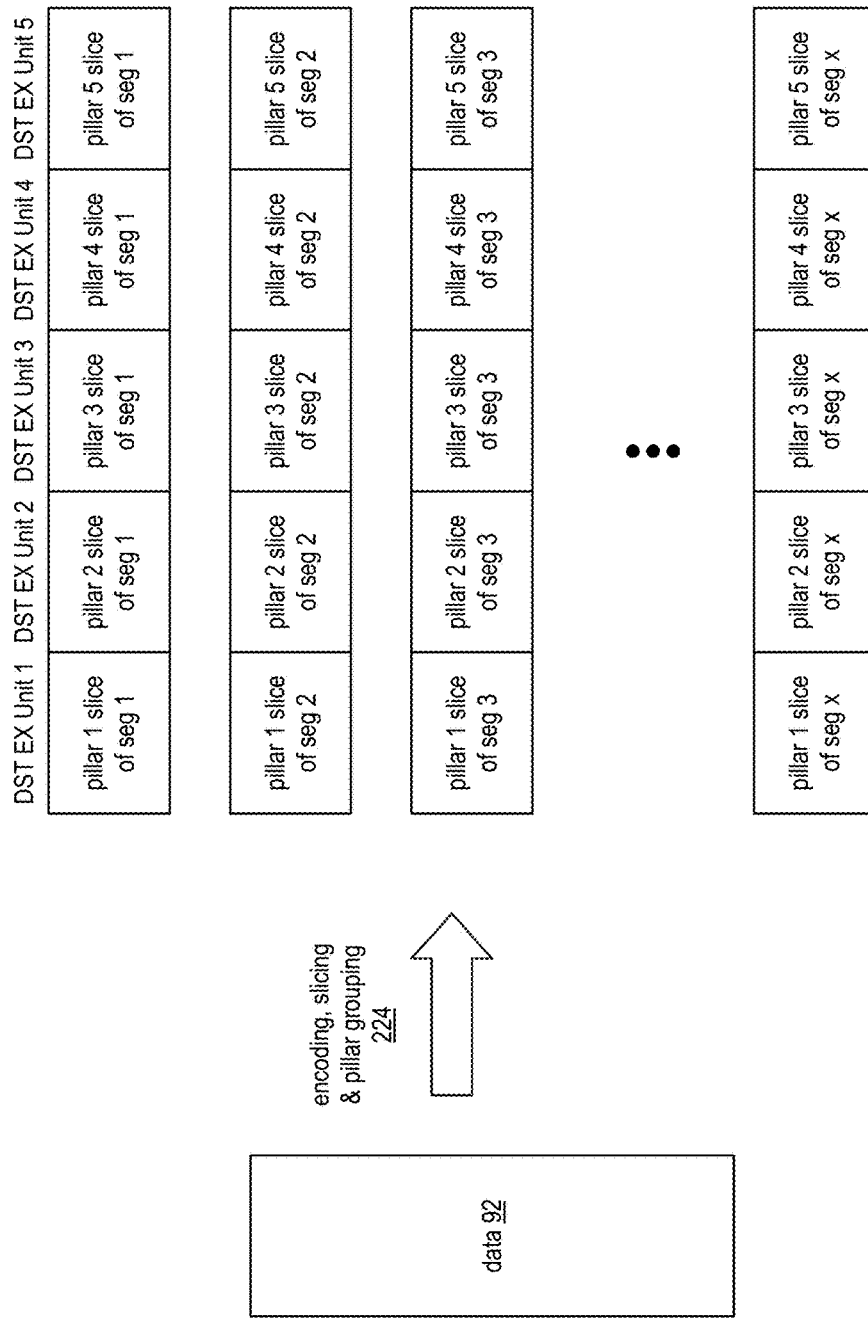
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
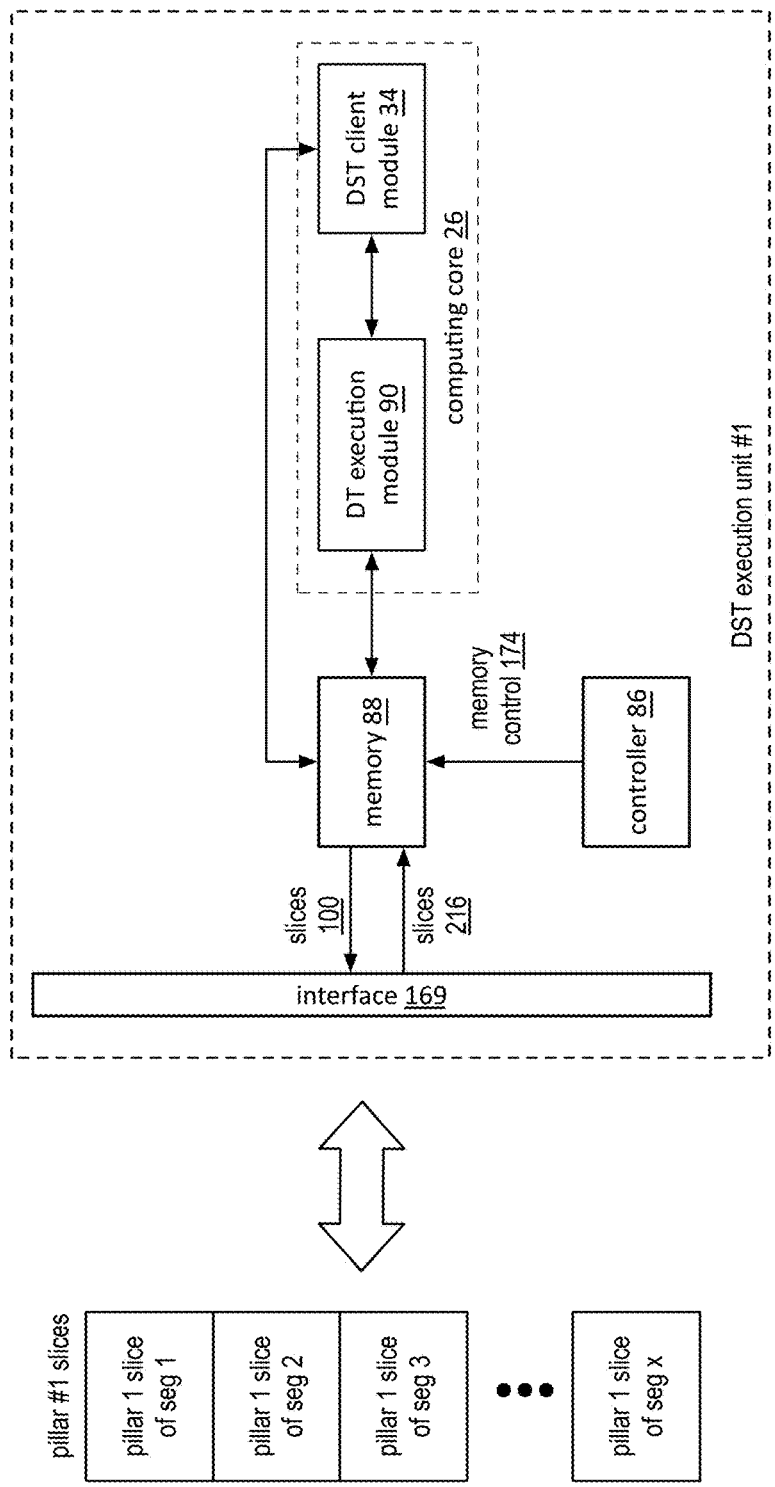
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
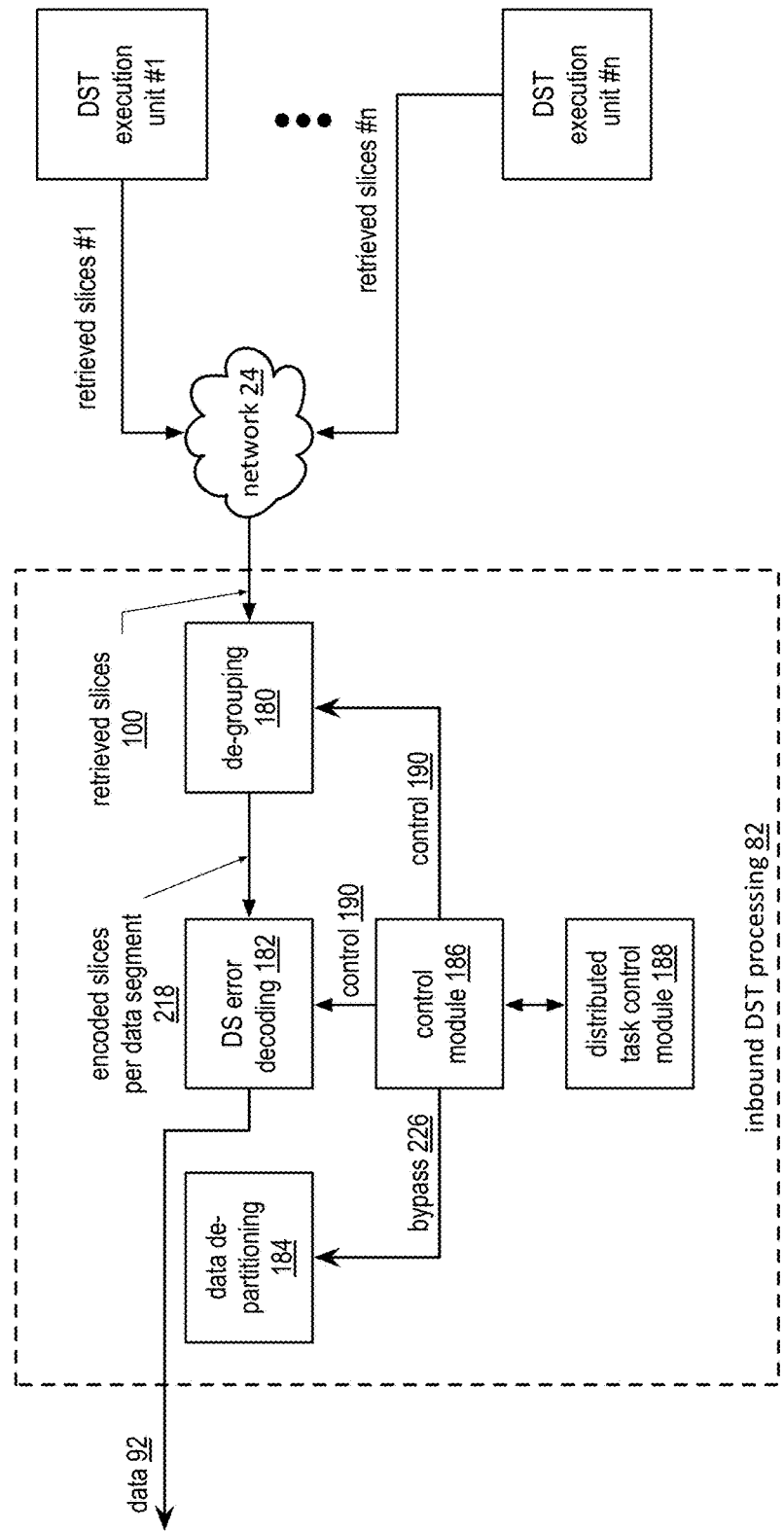
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
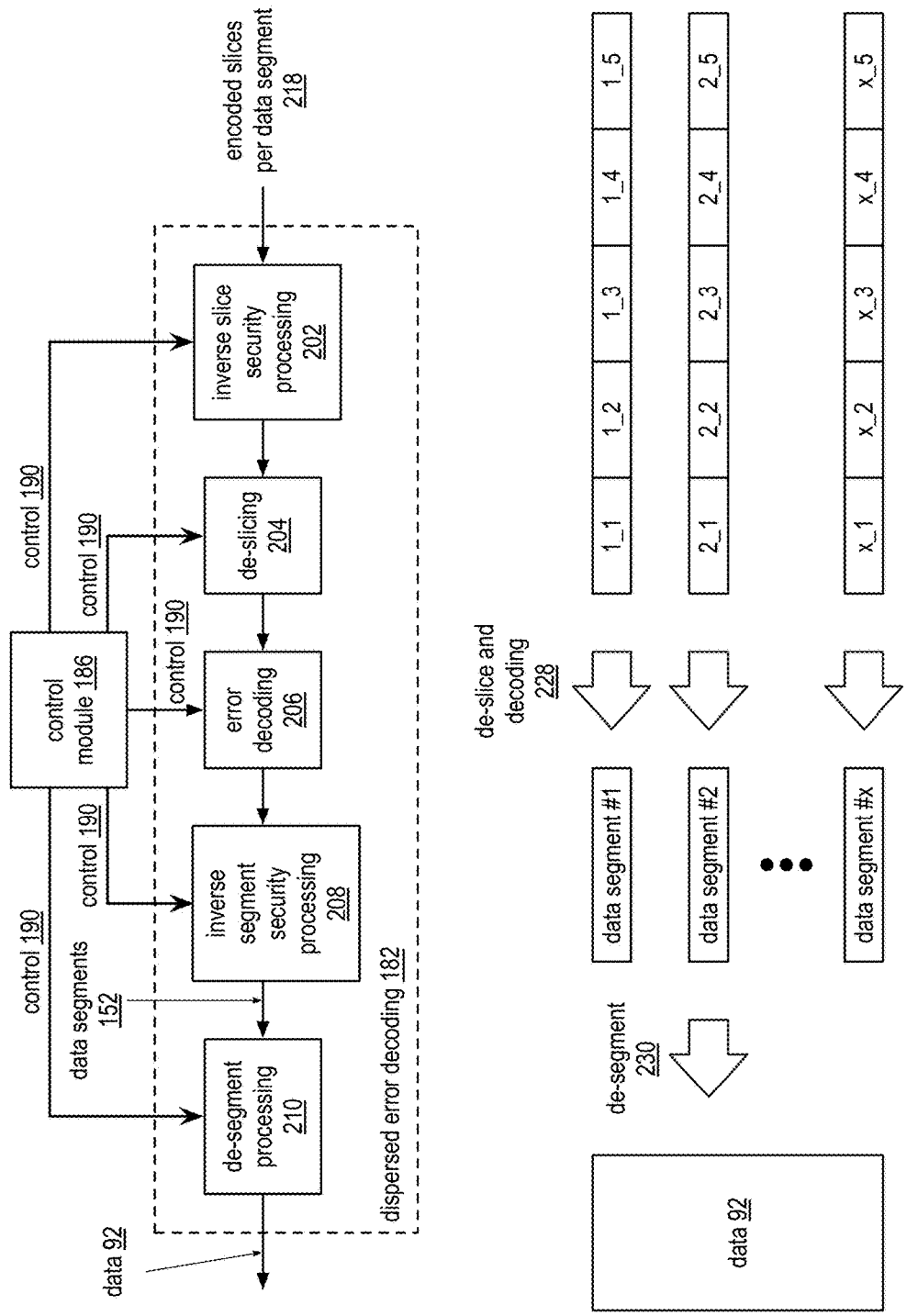
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
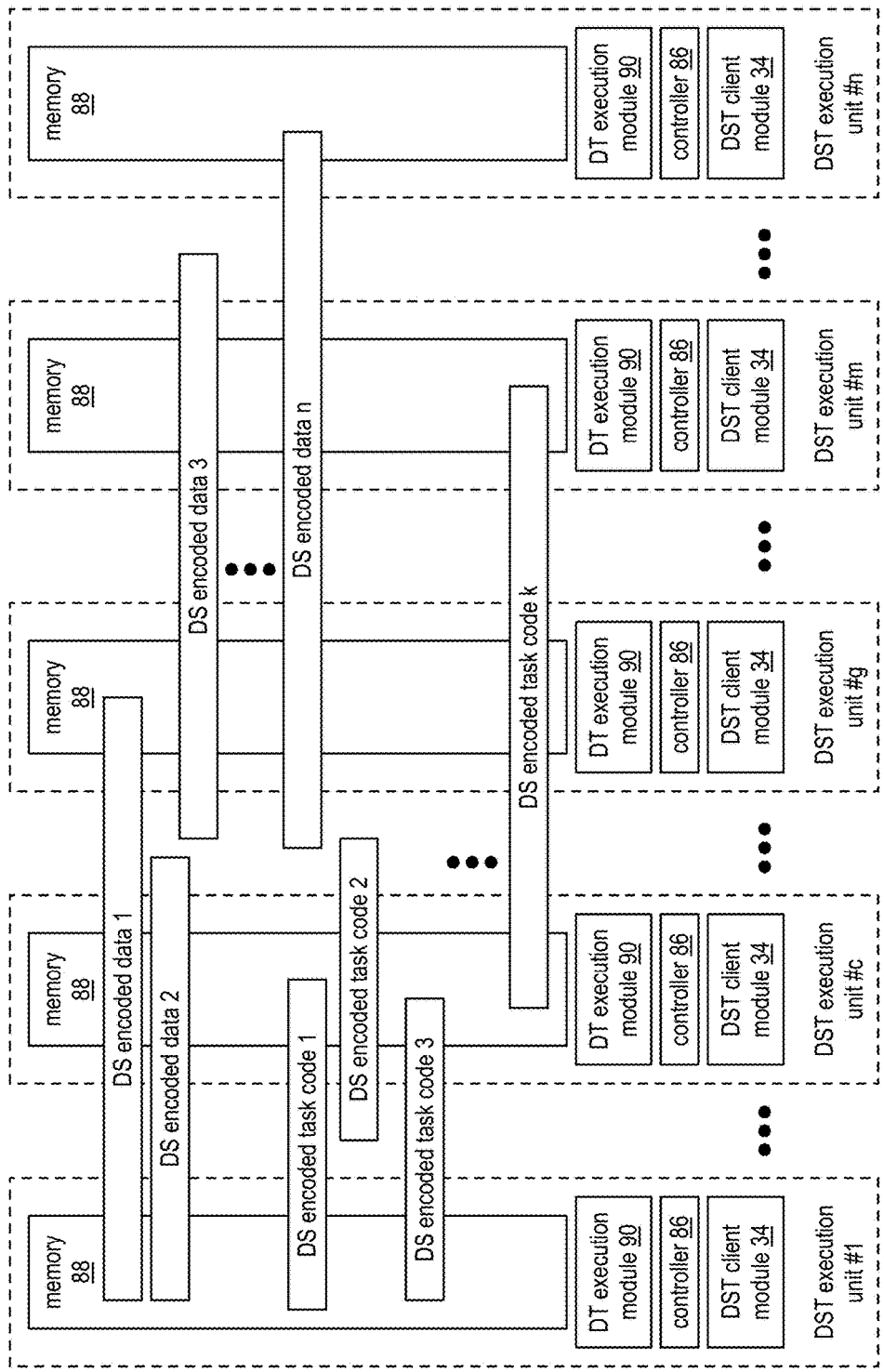
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
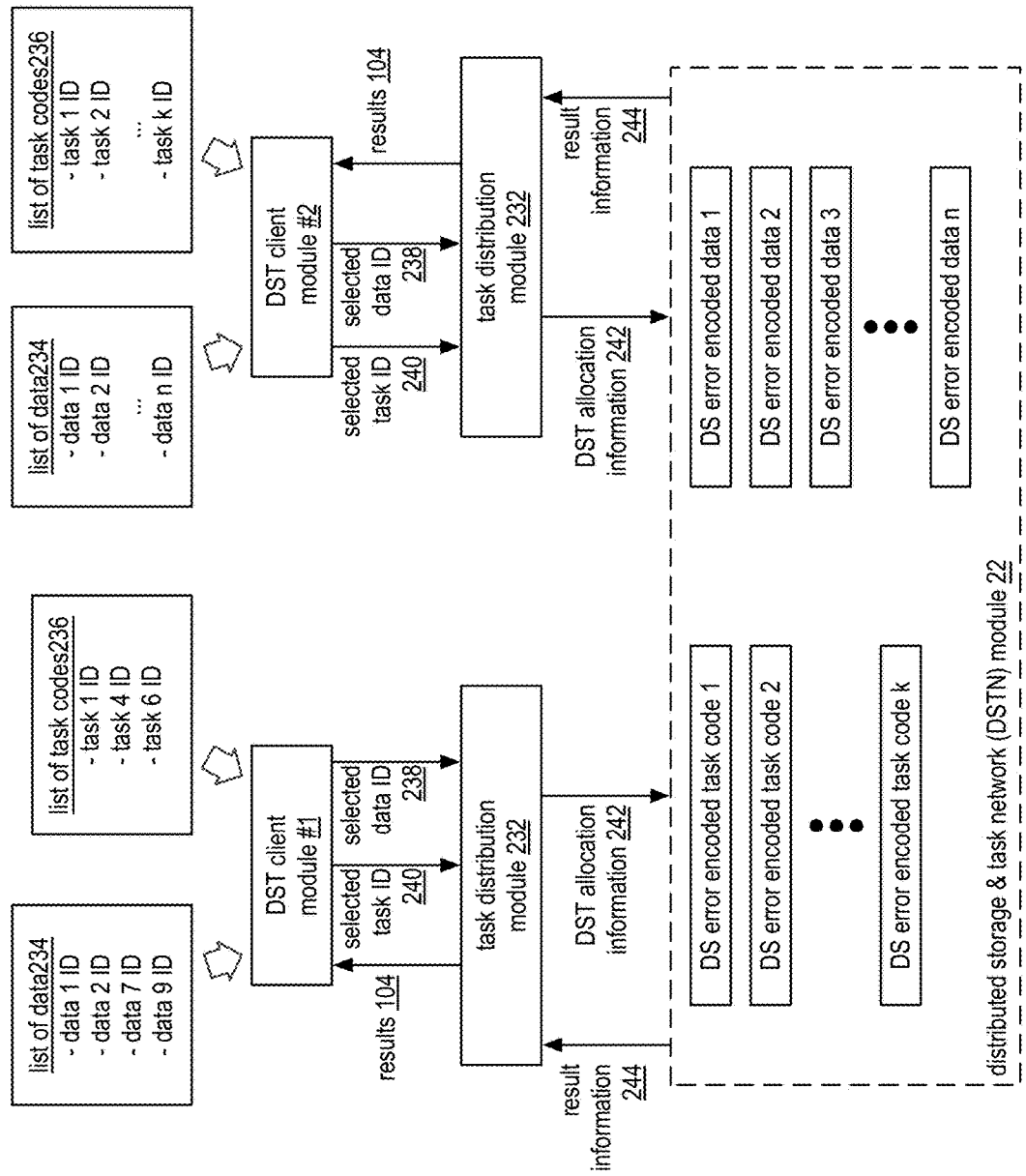
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
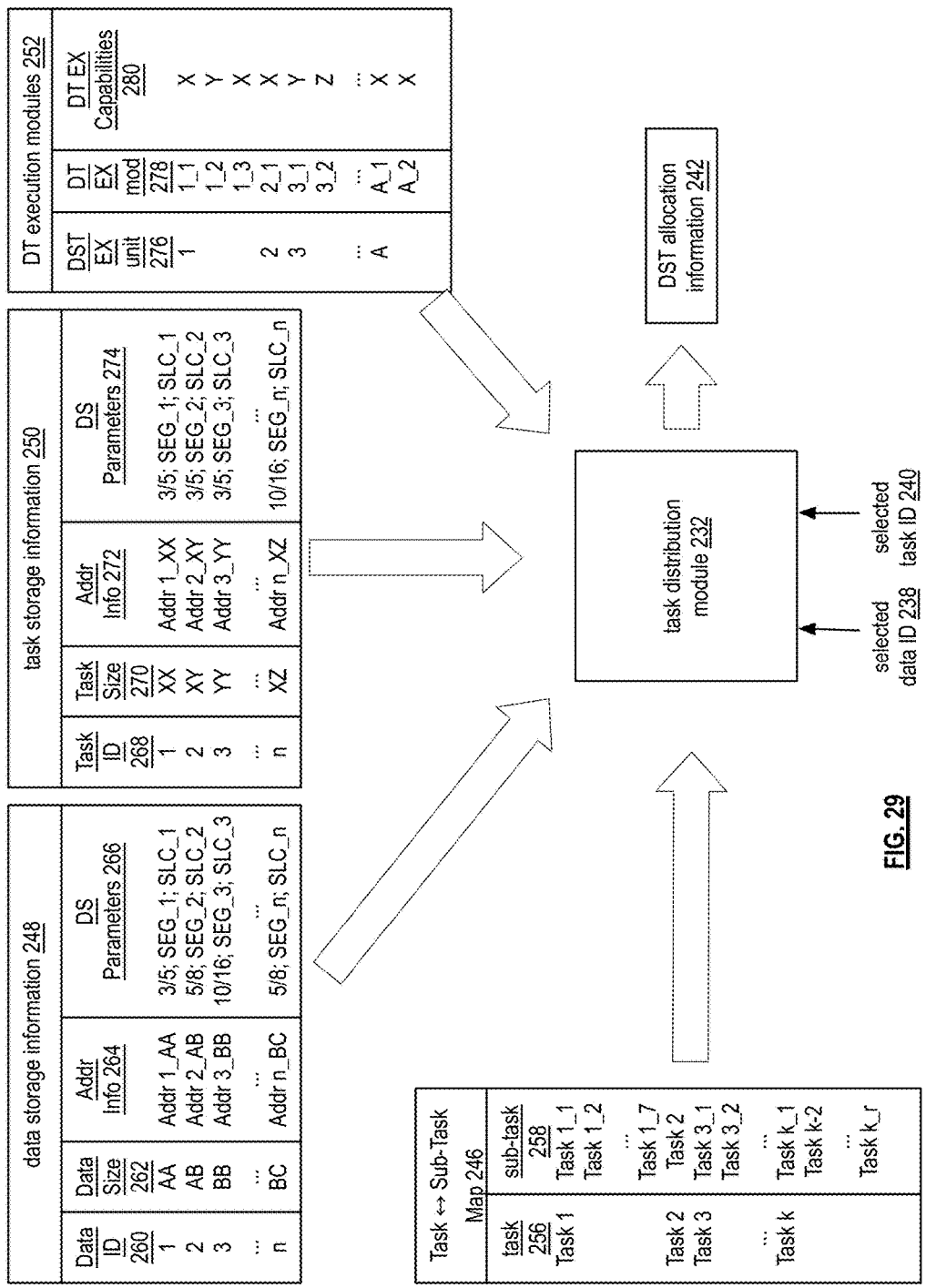
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
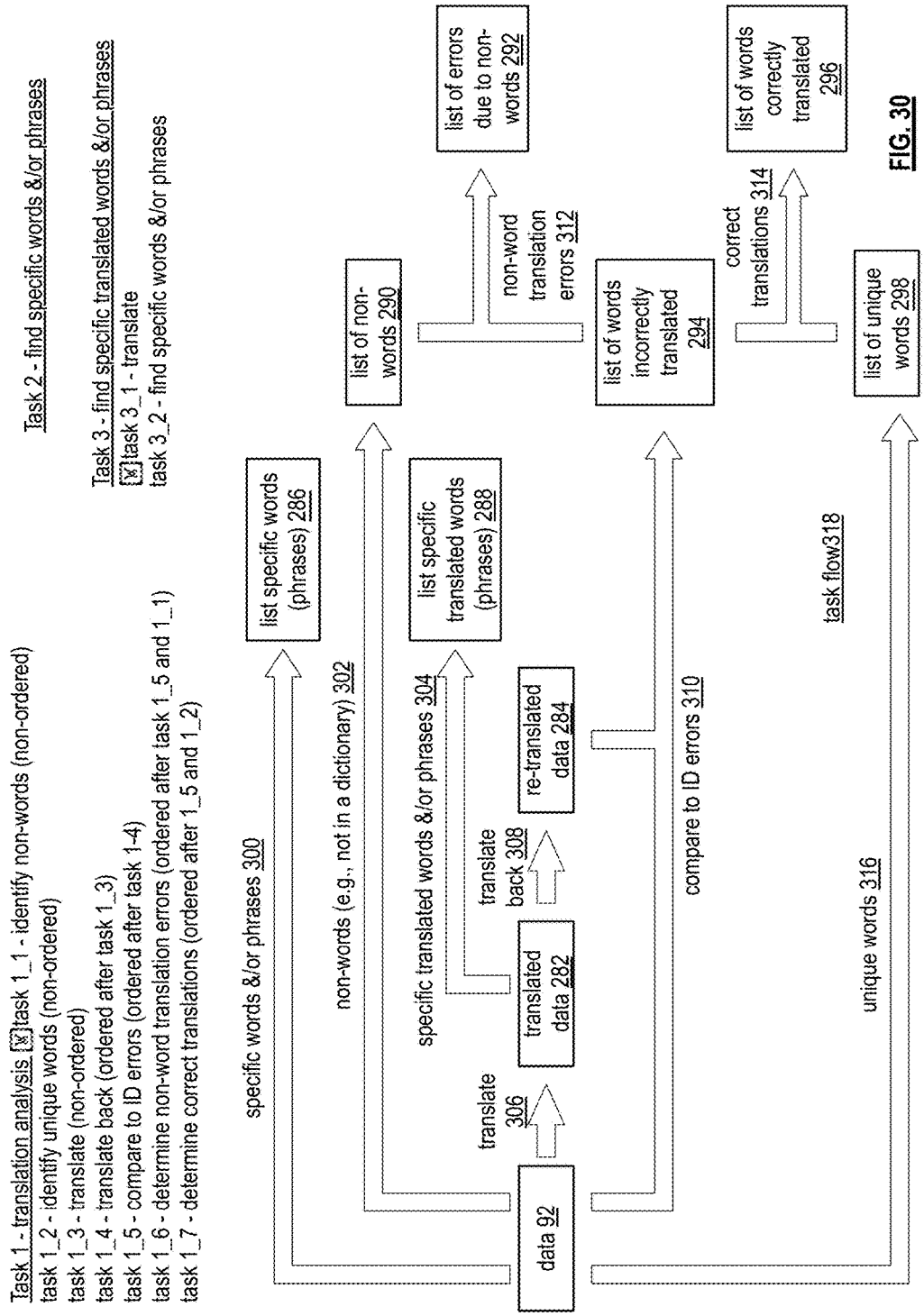
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
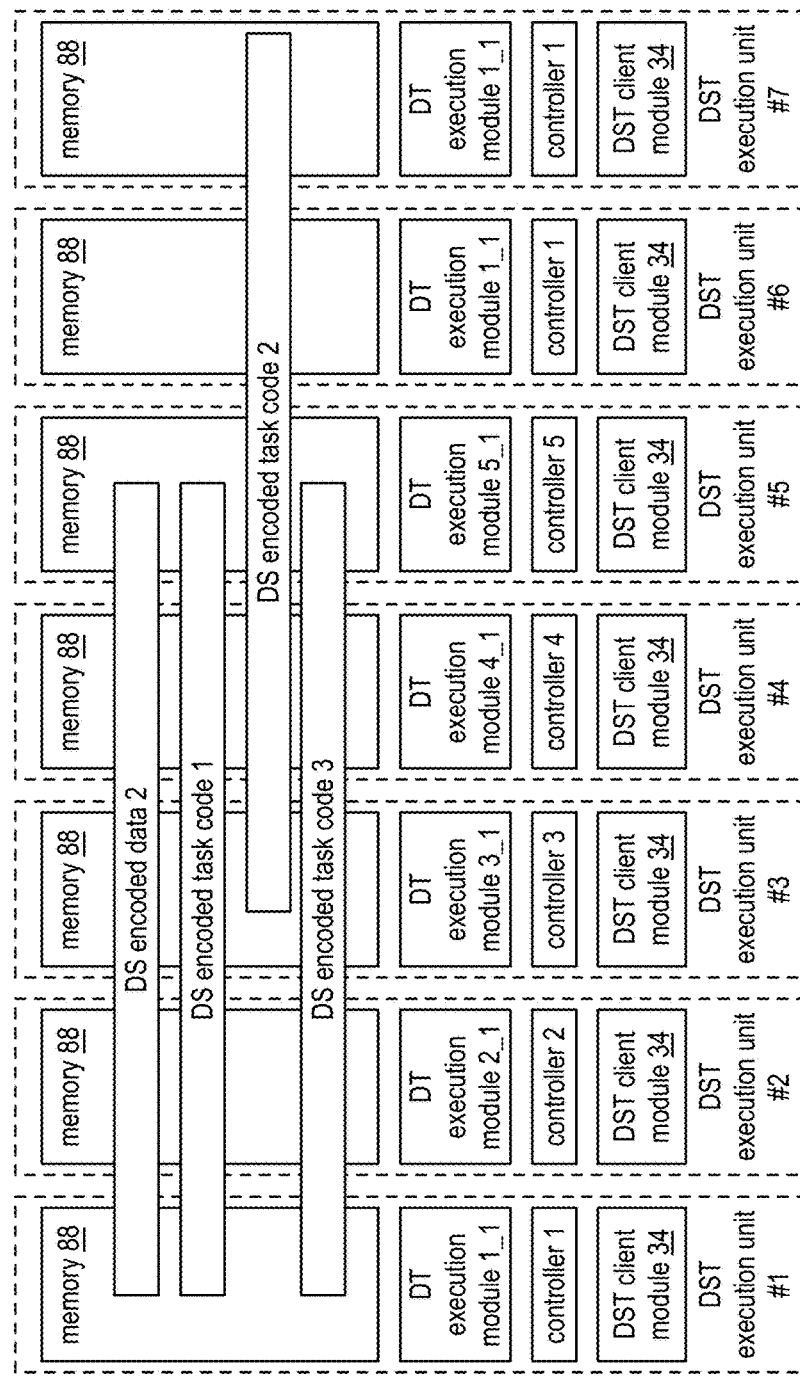
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1_4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terrabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terrabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
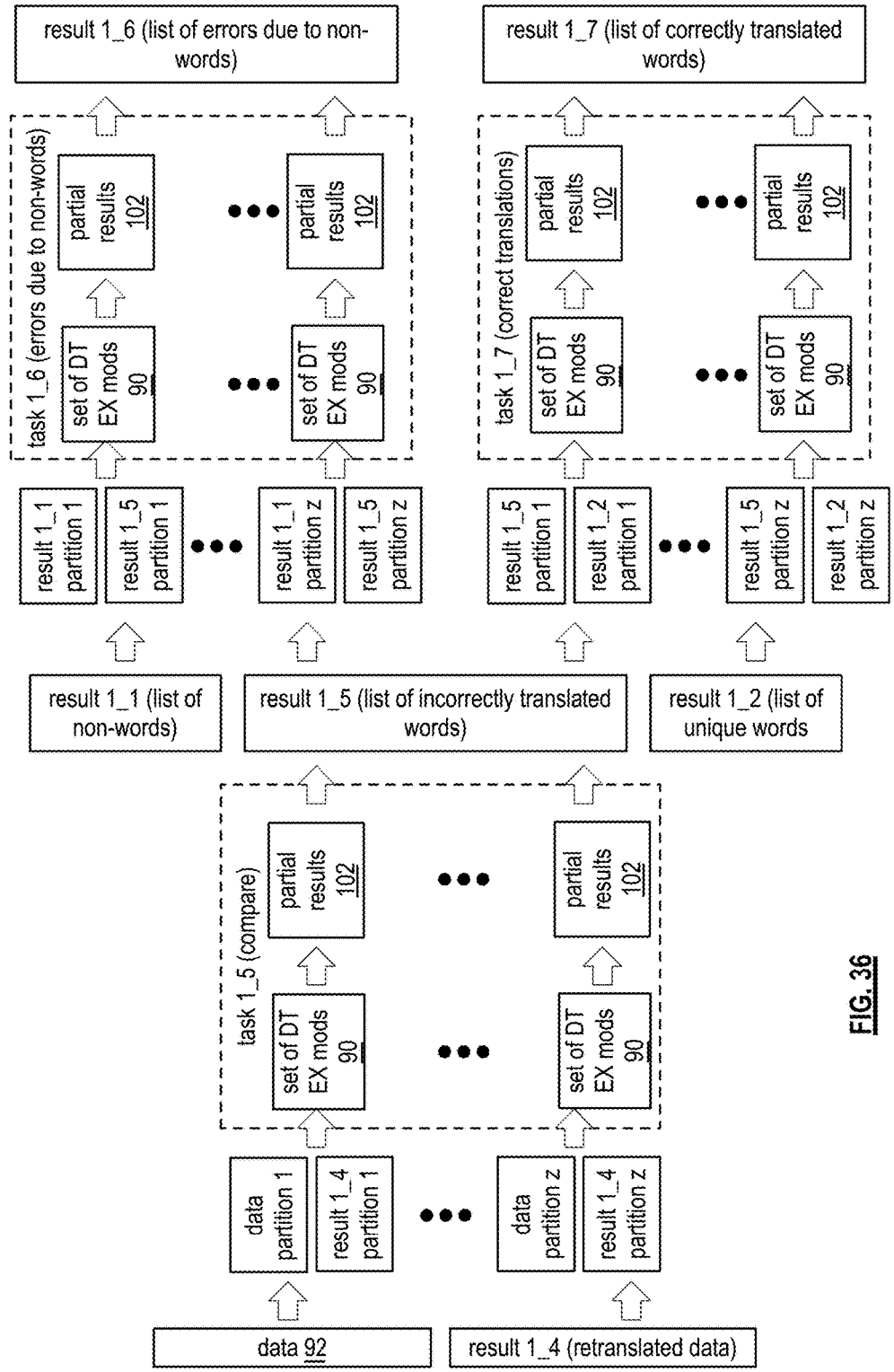

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terrabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terrabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
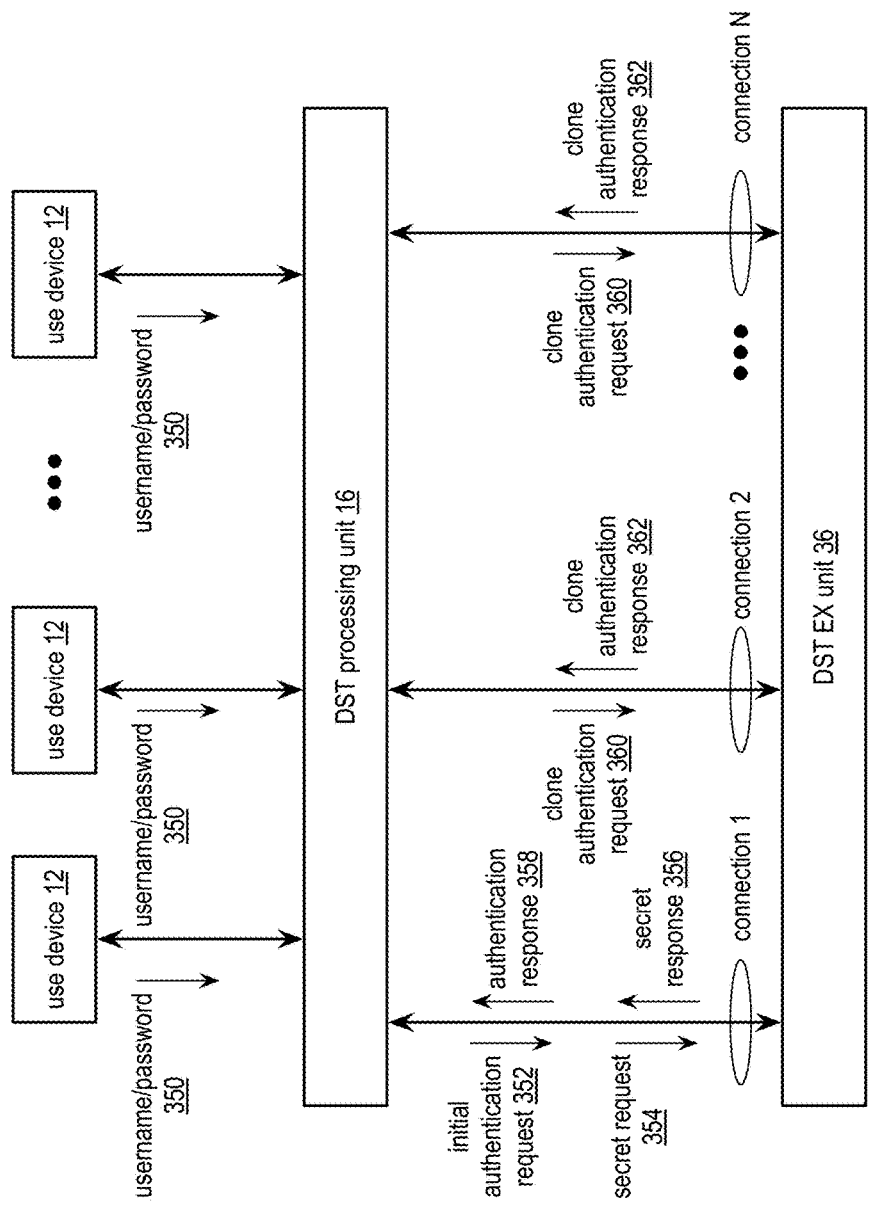
FIG. 40A is a schematic block diagram of another embodiment of a distributed computing system in accordance with the present invention.

FIG. 40A is a schematic block diagram of another embodiment of a distributed computing system that includes a plurality of user devices 12, a distributed storage and task (DST) processing unit 16, and a DST execution unit 36. The DST processing unit 16 is operably coupled to the DST execution unit 36 utilizing a plurality of connections 1-N. A connection of the plurality of connections 1-N may be implemented realizing one or more networks. Each network of the one or more networks includes at least one of a wireless network, a wireline network, an internet connection, and a private connection. Each connection of the plurality of connections 1-N may be utilized to communicate requests and responses associated with accessing the DST execution unit 36.

The system functions to authenticate each user device 12 of the plurality of user devices 12 with the DST execution unit 36 enabling each user device 12 to access the DST execution unit 36. The DST processing unit 16 receives username/passwords 350 from each user device 12. Alternatively, the DST processing unit 16 receives public-key infrastructure (PKI) credentials from one or more user devices 12. The DST processing unit 16 establishes a secure channel over a first connection of the plurality of connections 1-N with the DST execution unit 36. Establishing the secure channel includes utilizing at least one of a variety of industry standards including transport layer security (TLS), secure sockets layer (SSL), and secure shell protocol (SSH). When the secure channel is established over the first connection, the DST processing unit 16 generates and sends an initial authentication request 352 to the DST execution unit 36. The generating includes generating the request to include one or more of the username/passwords 350 and/or PKI credentials. The DST execution unit 36 verifies that each of the user devices 12 included in the initial authentication request 352 is authenticated. The DST execution unit 36 generates an authentication response 358 to include an indication with regards to authentication of each of one or more user devices 12. For example, the indication indicates an authenticated status when the DST execution unit 36 determines that a username/password 350 of the initial authentication request 352 is valid.

The DST processing unit 16 receives the authentication response 358 and may forward a portion of the authentication response 358 to each user device 12 of the plurality of user devices 12. When it is desired to utilize more than the first connection, the DST processing unit 16 establishes an additional secure channel over each of the desired additional connections. Next, the DST processing unit 16 generates and sends a secret request 354 to the DST execution 36. The secret request 354 is utilized to establish a shared secret between the DST processing unit 16 and the DST execution unit 36. The establishing the shared secret includes at least one of the DST processing unit 16 providing the shared secret, the DST execution unit 36 providing the shared secret, and the DST processing unit 16 and the DST execution unit 36 cooperating to generate the shared secret (e.g., utilizing a Diffie Hellman approach). The DST execution unit 36 generates a secret response 356 (e.g., including the shared secret, secret information to establish the shared secret) and outputs the secret response 356 to the DST processing unit 16 to facilitate completion of establishment of the shared secret. A method to establish the shared secret is discussed in greater detail with reference to FIG. 40B.

When the shared secret is established, for each other connection of the desired additional connections, the DST processing unit 16 generates a clone authentication request 360 based on the shared secret. The clone authentication request 360 includes a portion of the secret response 356 (e.g., including one or more of a shared secret acknowledgment, the shared secret, a portion of secret information). For each additional secure channel, the DST processing unit 16 outputs the clone authentication request 360 over a corresponding connection to the DST execution unit 36. The DST execution unit 36 affiliates (e.g., authenticates) the one or more user devices 12 of the initial authentication request 352 with each connection of the one or more additional connections. The DST execution unit 36 generates a clone authentication response 362 including an acknowledgment that the one or more user devices 12 of the initial authentication request 352 are now authorized to access the DST execution unit 36 via the one or more other connections. For each other connection of the one or more other connections, the DST execution unit 36 outputs the clone authentication response 362 over the other connection. Subsequent to receiving a clone authentication response 362, the DST processing unit 16 may utilize a corresponding other connection to provide access by one or more of the user devices 12 to the DST execution unit 36.

Figure 40B:
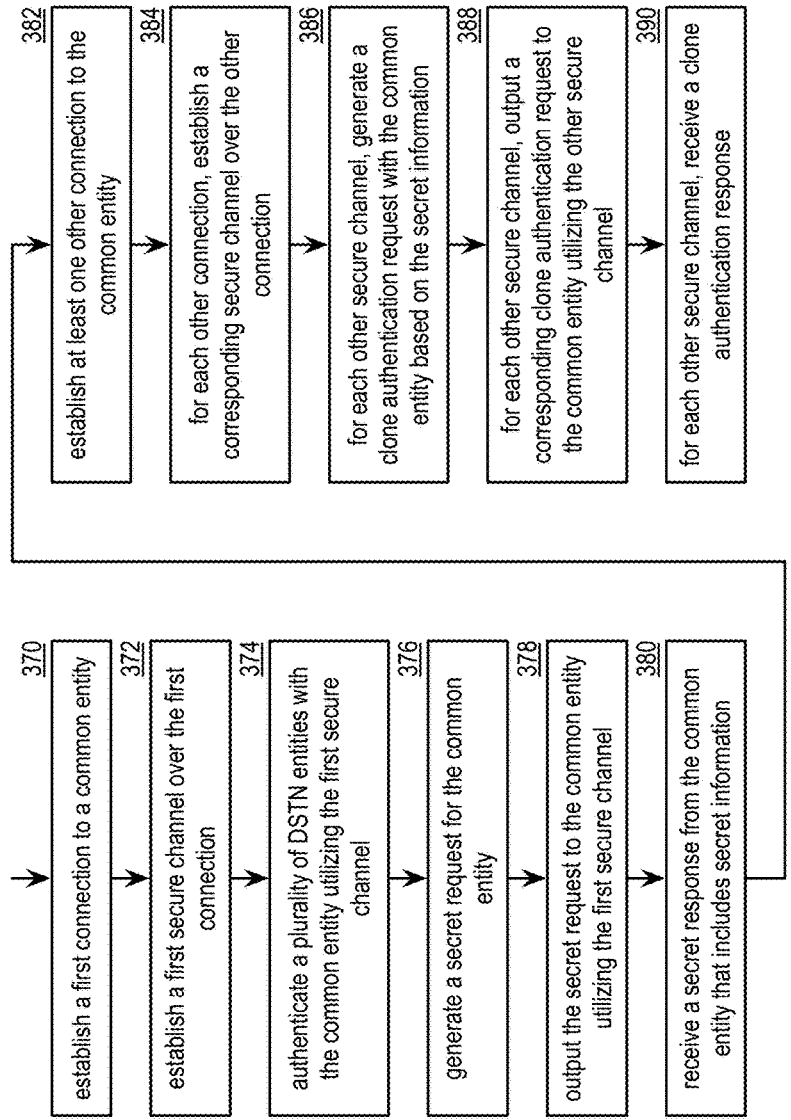
FIG. 40B is a flowchart illustrating an example of establishing a secure connection in accordance with the present invention.

FIG. 40B is a flowchart illustrating an example of establishing a secure connection. The method begins at step 370 where a processing module (e.g., of a distributed storage and task (DST) client module) establishes a first connection to a common entity (e.g., a DST execution unit). The establishing includes at least one of initializing, identifying, a query, lookup, a connectivity test, and selecting. For example, the processing module identifies the first connection utilizing an initializing connectivity test based on an internet protocol address of the common entity. The method continues at step 372 where the processing module establishes a first secure channel over the first connection (e.g., utilizing one of a variety of industry standards including transport layer security (TLS), secure sockets layer (SSL), and secure shell protocol (SSH)). The secure channel provides confidential communication between the processing module and the common entity.

The method continues at step 374 where the processing module authenticates a plurality of dispersed storage and task network (DSTN) entities (e.g., user devices) with the common entity utilizing the first secure channel. For example, a processing module generates an initial authentication request that includes username/password information for each DSTN entity of the plurality of DSTN entities. Next, the processing module outputs the initial authentication request to the common entity via the first secure channel. The processing module receives an authentication response indicating an authentication status (e.g., authenticated, not authenticated) for each DSTN entity of the plurality of DSTN entities.

The method continues at step 376 where the processing module generates a secret request for the common entity, where the secret request invokes a procedure to produce a shared secret between the processing module and the common entity. A variety of procedures may be utilized including at least one of a Diffie-Hellman approach, a random secret generation approach, a lookup approach, and a one-sided approach, wherein the one-sided approach includes at least one of the processing module and the common entity selecting the shared secret. As an example of generating the secret request when the Diffie-Hellman approach is utilized, processing module generates public values p and g, generates a value A based on public values p and g, and generates the secure request to include public values p and g, and A. The public value g is a primitive root for public value p such that every number a between 1 and (p−1), there is some integer exponent (e) such that g^e mod p=a. The processing module generates value A based on an expression of: $A=g^a$ mod p, wherein value a is a private value associated with the processing module (e.g., retrieved from memory, generating a random number, lookup).

The method continues at step 378 where the processing module outputs the secret request to the common entity utilizing the first secure channel. The common entity receives the secret request and processes the secret request to produce a secret response. The processing includes generating the secret response based on the secret request. For example, the common entity extracts public values p and g, and A from the secret request when the Diffie Hellman approach is utilized. Next, the common entity generates a private value b (e.g., retrieved from memory, generating a random number, lookup). The common entity generates a value B in accordance with an expression of $B=g^b$ mod p. The common entity generates the secret response to include the value B and outputs the secret response to the processing module. The common entity computes the shared secret in accordance with an expression of: shared secret=$A^b$ mod p.

The method continues at step 380 where the processing module receives the secret response from the common entity that includes secret information (e.g., the value B). The receiving includes generating the shared secret from the secret information. The generating includes at least one of extracting shared secret from the secret information and generating the shared secret based on the secret information. For example, when utilizing the Diffie-Hellman approach, the processing module generates the shared secret in accordance with an expression of: shared secret=$B^a$ mod p.

The method continues at step 382 where the processing module establishes at least one other connection to the common entity. The establishing may include determining a number of other connections to be established based on one or more of a network loading level, an estimated loading requirement level, a historical performance indicator, an error message, a predetermination, and they request. For each other connection, the method continues at step 384 where the processing module establishes a corresponding secure channel over the other connection.

For each other secure channel, the method continues at step 386 where the processing module generates a clone authentication request with the common entity based on the secret information. The generating includes generating the request to include one or more of a clone authentication request opcode, a requesting entity identifier, a first secure channel identifier, the present secure channel identifier, the shared secret, a list of the plurality of DSTN entities, and a portion of the secret information. For each other secure channel, the method continues at step 388 where the processing module outputs a corresponding clone authentication request to the common entity utilizing the other secure channel. The common entity authenticates the clone authentication request. The authentication includes verifying that the clone authentication request includes at least a favorable portion of the secret information (e.g., the shared secret from the processing module substantially matches a stored shared secret proofs are calculated by the common entity). The common entity affiliates the plurality of DSTN entities with the other secure channel when the authentication is favorable. For each other secure channel, the method continues at step 390 where the processing module receives a clone authentication response. The clone authentication response includes an authentication status associated with the other secure channel.

Figure 41A:
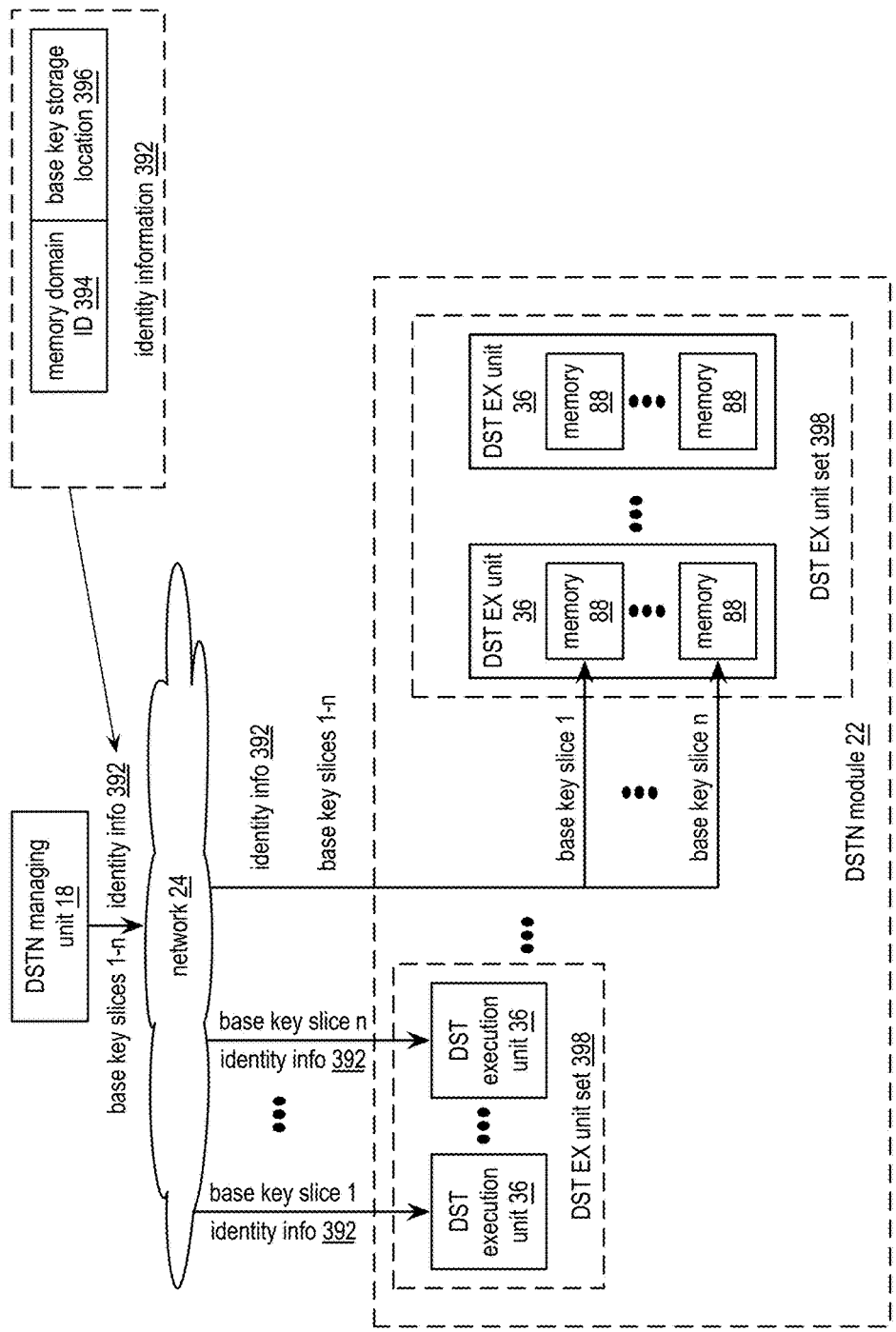
FIG. 41A is a schematic block diagram of another embodiment of a distributed computing system in accordance with the present invention.

FIG. 41A is a schematic block diagram of another embodiment of a distributed computing system that includes the DSTN managing unit 18, the network 24, and the DSTN module 22 of FIG. 1. The DSTN module 22 includes a plurality of DST execution unit sets 398, where each set includes a set of DST execution units 36. Each DST execution unit 36 includes one or more memories 88. In an example of storing a plurality of base keys in the DSTN module 22, for each base key the DSTN managing unit 18 identifies a domain of a plurality of domains of memory based on one or more of a base key affiliation indicator and a domain active indicator to produce a memory domain identifier (ID) 394.

Each domain of memory is based on at least one of addressing information and requesting entity information. The addressing information includes at least one of a vault identifier, a pillar identifier, a source name, a source name range, a vault source name identifier, a vault source name range, and a slice name range. The requesting entity information includes one or more of a user device identifier, a group of user device identifiers, a user identifier, a user group identifier, a universally unique identifier, and an Internet protocol address. For example, a first domain is associated with a first vault for all users, a second domain is associated with a second vault for all users, etc. As another example, the first domain is associated with the first vault for a first group of users, the second domain is associated with the first vault for a second group of users etc.

The base key affiliation indicator indicates whether the domain is associated with a base key. For example, the base key affiliation indicator indicates that the first domain is associated with a first base key when the first base key has been generated for the first domain. As another example, the base key affiliation indicator indicates that the second domain is associated with any base key when no base key has been generated for the second domain. The domain active indicator indicates whether the domain has been assigned for usage within the system. For example, the domain active indicator indicates that a third domain is inactive when the third domain has not yet been assigned. As another example, the domain active indicator indicates that the third domain is active when the third domain has been assigned.

As a specific example of identifying the domain based on one or more of the base key affiliation indicator and the domain active indicator, the DSTN managing unit 18 identifies the fourth domain when a base key affiliation indicator associated with the fourth domain indicates that the fourth domain is not associated with a corresponding base key and the domain active indicator indicates that the fourth domain is assigned. Having identified the domain, the DSTN managing unit 18 obtains the base key (e.g., a new base key) for the domain. The obtaining includes at least one of retrieving the base key from a base key table based on the memory domain ID 394, receiving the base key (e.g., from a key management system, from a system administrator, from a user device), and generating the base key. As a specific example of generating the base key, the DSTN managing unit 18 generates a random number and applies a deterministic function to the random number to produce the base key. The deterministic function includes at least one of a hashing function, a hash-based message authentication code function, a sponge function, a cyclic redundancy check function, and a mask generating function. For instance, the DSTN managing unit applies the mask generating function to the random number to produce the base key that includes a desired number of bits to substantially match a number of bits used by encryption functions of the system. As another specific example of generating the base key, the DSTN managing unit 18 applies the deterministic function to the memory domain ID 394 to produce the base key.

Having produced the base key for the domain, the DSTN managing unit 18 encodes the base key using a dispersed storage error coding function in accordance with dispersal parameters to produce a set of base key slices 1-n. The dispersal parameters include a pillar width number n. The DSTN managing unit 18 may select the pillar width number n based on a number of storage locations (e.g., based on one or more of a query, a lookup, a predetermination) to be utilized for storage of the set of base key slices 1-n. Having produced the set of base key slices 1-n, the DSTN managing unit 18 identifies a set of storage locations for storage of the set of base key slices 1-n. The storage locations include at least one of one or more physical storage locations and one or more virtual storage locations. A virtual storage location includes a DSTN address (e.g., a logical address of the system which may also be referred to as a dispersed storage network (DSN) address). A physical storage location includes a memory device ID and a memory address.

As a specific example of selecting the set of storage locations, the DSTN managing unit 18 selects each DST execution units 36 of a first DST execution unit set 398 when exclusively selecting logical storage locations. As another specific example, the DSTN managing unit 18 selects a set of memory devices 88 of each DST execution unit 36 of another DST execution unit set 398 when exclusively selecting physical storage locations. As yet another specific example, the DST managing unit 18 selects at least some DST execution units 36 of the first DST execution unit set 398 and at least some memories 88 of at least some DST execution units 36 of the other DST execution unit set 398 when selecting a combination of physical and logical storage locations.

Having identified the set of storage locations, the DSTN managing unit 18 stores the set of base keys at the set of storage locations. For example, the DSTN managing unit 18 sends: a first base key slice to a first DST execution unit 36 of the first DST execution unit set 398, a second base key slice to a second DST execution unit 36 of the first DST execution unit set 398, etc. As another example, the DSTN managing unit 18 sends: the first base slice key to a first memory 88 of the first DST execution unit 36 of the other DST execution unit set 398, the second base slice key to a second memory 88 of the first DST execution unit 36 of the other DST execution unit set 398, etc.

Having stored the set of base key slices, the DSTN managing unit 18 facilitates sending identity information 392 to DSTN entities associated with the domain, where the identity information 392 includes the memory domain ID 394 and base key storage location 396 (e.g., the set of storage locations). The DSTN entities associated with the domain include DST execution units 36 associated with assignment of the domain (e.g., DST execution units 36 that store data associated with the domain). For example, the DSTN managing unit 18 identifies the DSTN entities associated with the domain to include a DST execution unit set 398 assigned to the first vault when the domain is associated with the first vault. As a specific example, the DSTN managing unit 18 sends the identity information 392 to DST execution units 36 associated with the set of storage locations.

Figure 41B:
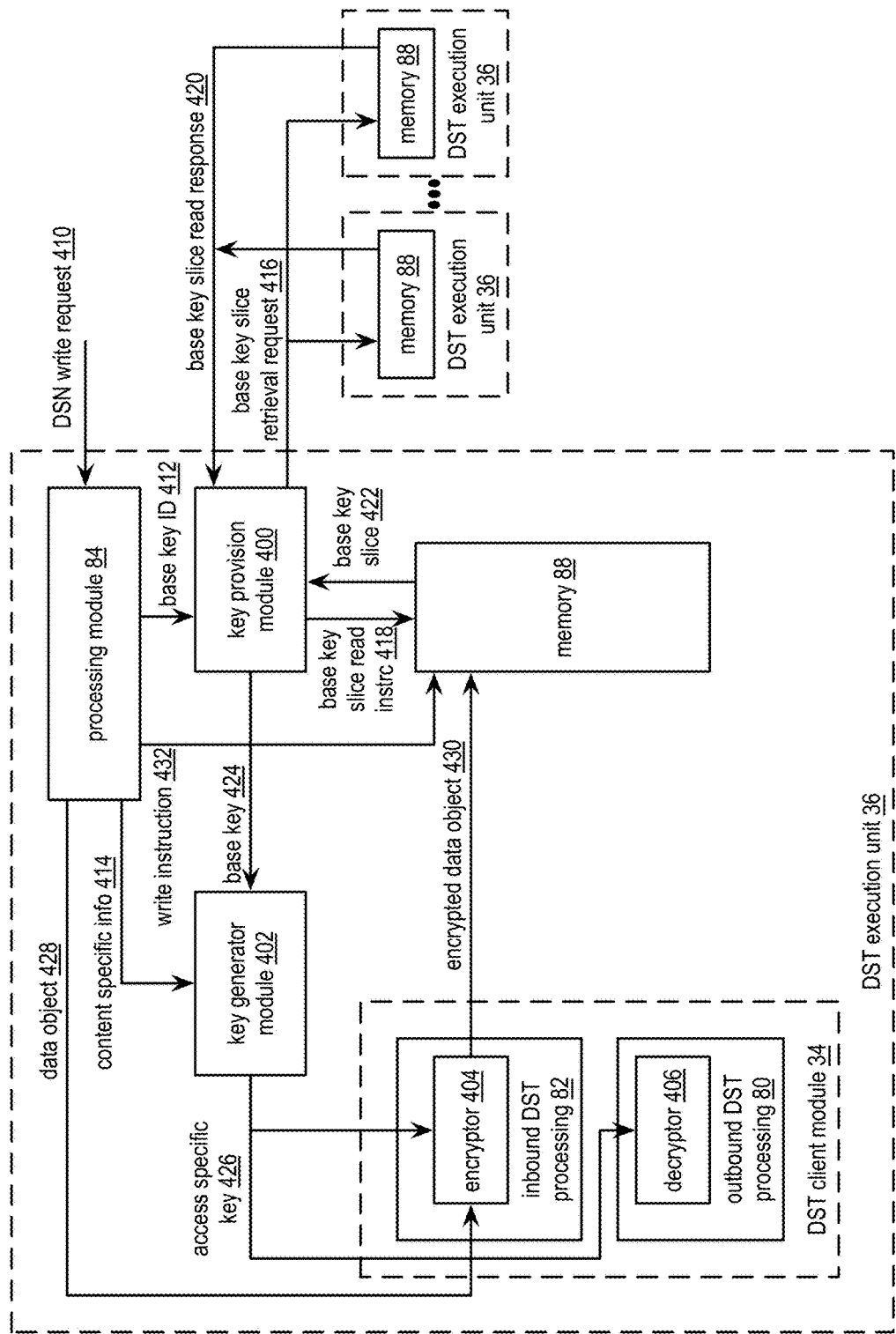
FIG. 41B is a schematic block diagram of another embodiment of a distributed storage and task execution unit in accordance with the present invention.

FIG. 41B is schematic block diagram of another embodiment of the distributed storage and task execution unit 36 of a set of DST execution units 36, where each DST execution unit 36 includes a key provision module 400, a key generator module 402, and the processing module 84, the memory 88, and the DST client module 34 of FIG. 3. The DST client module 34 includes the inbound DST processing 82 and the outbound DST processing 80 of FIG. 3. The inbound DST processing 82 includes an encryptor 404 and the outbound DST processing 80 includes a decryptor 406.

In an example of receiving an access request regarding a data object 428, the processing module 84 receives a dispersed storage network (DSN) write request 410. The access request includes a data object identifier for the data object 428, requester information, and addressing information. In an example of determining a base key identifier (ID) 412 based on the access request, the processing module 84 determines a domain based on at least one of the addressing information and the requestor information. The domain is one of a plurality of domains of memory of a DSN (e.g., or of a distributed storage and task network DSTN). A plurality of base keys are assigned to the plurality of domains. A plurality of base key identifiers are associated with the plurality of base keys. For example, the processing module 84 identifies a third domain when the requester information of the request includes a user device ID associated with the third domain and the addressing information includes a vault ID associated with the third domain. As a specific example of determining the base key ID 412, the processing module 84 determines the base key ID 412 from the plurality of base key identifiers based on the domain. For instance, the processing module 84 receives registry information from a managing unit that includes an indication of an association of the third domain with the base key ID 412. Alternatively, the processing module 84 determines the base key ID 412 by sending a domain request to the managing unit, where the domain request includes at least a portion of the access request and receiving the base key ID.

In an example of determining content specific information 414 based on the access request, the processing module 84 utilizes the data object identifier (e.g., slice name, file name, object name, etc.) as at least part of the content specific information 414. As another example, the processing module 84 determines the at least part of the content specific information 414 by determining one or more of physical addresses of memory of the DST execution unit 36 (e.g., also referred to as a storage device) from the addressing information, logical addresses regarding the data object from the addressing information (e.g., DSN address, vault ID, etc.), data type of the data object, a timestamp of the access request, and identity of a requesting device based on the requestor information. For example, the processing module 84 determines the content specific information 414 as slice name 14F3AB from the data object identifier. As another example, the processing module determines the content specific information 414 as a pillar ID of 3 when the addressing information indicates that the access request is associated with a pillar 3.

In an example of recovering a base key 424, the key provision module 400 retrieves a set of base key slices utilizing the base key ID 412. As a specific example, the key provision module 400 determines identity of a set of other DST execution units 36 (e.g., also referred to as other storage devices) based on the base key ID 412, sends a set of key slice retrieval requests 416 to the set of other DST execution units 36, and receives base key slice read responses 420 that includes at least a decode threshold number of base key slices to recover the base key. Alternatively, or in addition to, the key provision module 400 issues a base key read slice instruction 418 to memory 88 to retrieve a base key slice 422 of the set of base key slices. For example, the key provision module 400 determines the identity of the set of other DST execution units 36 by extracting base key storage location from identity information received from the managing unit.

Having retrieved the set of base key slices, the key provision module 400 decodes the set of base key slices in accordance with an error encoding function to recover the base key 424. The error encoding function includes one or more of a dispersed storage error encoding function, a Shamir shared secret encoding function, and an encryption function using a public key of public/private key pair of the DST execution unit 36 to produce an encrypted base key and dividing the encrypted based key into encrypted base key portions to produce the set of base key slices.

In an example of generating an access specific key 426 based on the recovered base key 424 and the content specific information 414, the key generator module 402 performs a function on the recovered base key 424 and the content specific information 414 to produce the access specific key 426. The function includes one or more of a deterministic function (e.g., hashing function, a mask generating function, sponge function, hash-based message authentication code function), a logical function (e.g., AND, OR, XOR, NOR, etc.), and a mathematical function (e.g., add, subtract, divide, multiply, etc.). As another example of generating the access specific key 426 based on the recovered base key 424 and the content specific information 414, the key generator module 402 encrypts the recovered base 424 key utilizing the content specific information 414 to produce the access specific key 426. As yet another example, the key generator module 402 encrypts the content specific information 414 utilizing the recovered base key 424 to produce the access specific key 426.

In an example of executing the access request regarding the data object 428 utilizing the access specific key 426 when the access request includes the DSN write request 410, the processing module 84 facilitates encrypting the data object 428 using the access specific key 426 to produce an encrypted data object 430. As a specific example, the processing module 84 instructs the encryptor 404 to encrypt the data object 428 to produce the encrypted data object 430. Having facilitated encrypting of the data object 428, the processing module 84 sends a write instruction 432 to the memory 88. The processing module 84 facilitates storing the encrypted data object 430 in the memory 88 in accordance with the write instruction 432. As a specific example, the processing module 84 instructs the inbound DST processing 82 to send the encrypted data object 430 to the memory 88.

Alternatively, or in addition to, the system may process a plurality of access requests, where the plurality of access request includes a plurality of DSN write requests. In an example of processing the plurality of access requests, the processing module 84 receives the plurality of access requests, where the plurality of access requests include the access request. The processing module 84 determines the base key ID 412 for the plurality of access requests. For instance, the base key ID 412 is associated with a common vault of the plurality of access requests. The processing module 84 determines a plurality of content specific information based on the plurality of access requests. For instance, a slice name associated with each of the plurality of access request is utilized to produce a corresponding content specific information of the plurality of content specific information.

With the plurality of content specific information produced, the key provision module 400 retrieves the set of base key slices utilizing the base key ID 412 and decodes the set of base key slices in accordance with the error encoding function to recover the base key 424. For each of the plurality of access requests, the key generator module 402 generates another unique access specific key based on the recovered base key 424 and a corresponding one of the plurality of content specific information 414. With another unique access specific key produced for each of the plurality of access requests, the processing module 84 executes the plurality of access requests utilizing each of the other unique access specific keys. For example, the processing module facilitates encryption of ten data objects to produce ten encrypted data objects for storage in the memory 88 when the plurality of access request includes the plurality of DSN write requests.

Figure 41C:
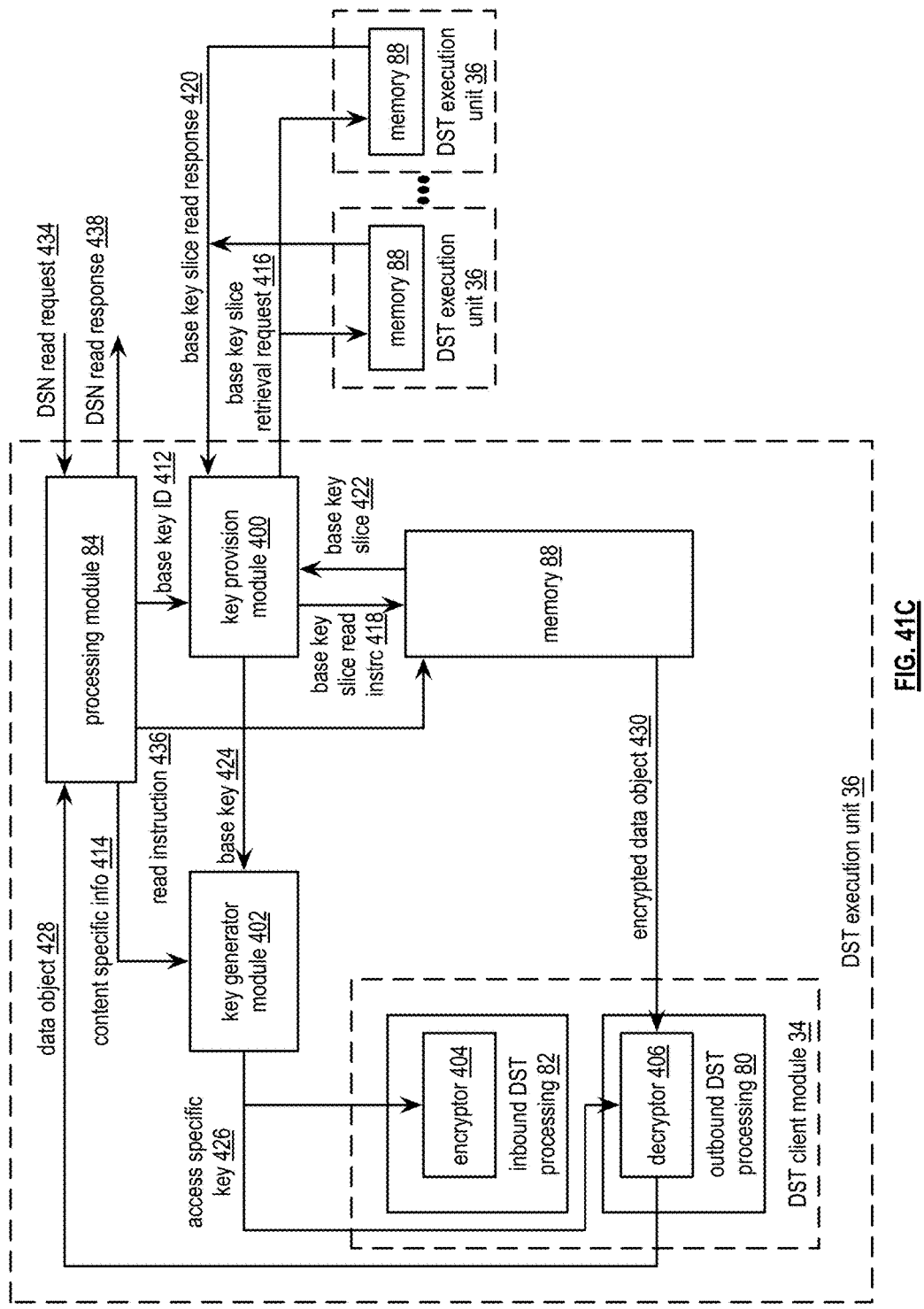
FIG. 41C is a schematic block diagram of another embodiment of a distributed storage and task execution unit in accordance with the present invention.

FIG. 41C is a schematic block diagram of another embodiment of the distributed storage and task execution unit 36 of the set of DST execution units 36 of FIG. 41B, where each DST execution unit 36 includes the key provision module 400, the key generator module 402, the processing module 84, the memory 88, and the DST client module 34 of FIG. 41B. The DST client module 34 includes the inbound DST processing 82 and the outbound DST processing 80 of FIG. 41B. The inbound DST processing 82 includes the encryptor 404 of FIG. 41B and the outbound DST processing 80 includes the decryptor 406 of FIG. 41B.

In an example of receiving an access request regarding a data object 428, the processing module 84 receives a dispersed storage network (DSN) read request 434. The processing module 84 determines the base key identifier (ID) 412 based on the access request. The processing module 84 determines the content specific information 414 based on the access request. The processing module 84 recovers the base key 424 utilizing the base key ID 412 by sending the set of key slice retrieval requests 416 to other DST execution units 36, receiving base key slice read responses 420 that includes at least a decode threshold number of base key slices to recover the base key 424. Alternatively, or in addition to, the key provision module 400 issues the base key read slice instruction 418 to memory 88 to retrieve the base key slice 422 of the set of base key slices. Having retrieved the set of base key slices, the key provision module 400 decodes the set of base key slices in accordance with the error encoding function to recover the base key 424. The key generator module 402 generates the access specific key 426 based on the recovered base key 424 and the content specific information 414.

In an example of executing the access request regarding the data object 428 utilizing the access specific key 426 when the access request includes the DSN read request 434, the processing module 84 sends a read instruction 436 to the memory 88 and facilitates retrieving the encrypted data object 430 from the memory 88 in accordance with the read instruction 436. As a specific example, the processing module 84 instructs the outbound DST processing 82 receives the encrypted data object 430. The processing module 84 facilitates decrypting the encrypted data object 430 using the access specific key 426 to recover the data object 428. As a specific example, the processing module instructs the decryptor 406 to decrypt the encrypted data object 430 using the access specific key 426 to produce the recovered data object 428. Having recovered the data object 428, the processing module 84 outputs a DSN read response 438 to a requesting entity, where the DSN read response 438 includes the recovered data object 428.

Alternatively, or in addition to, the system may process a plurality of access requests that includes a plurality of DSN read request 434. In an example of processing the plurality of access requests, the processing module 84 receives the plurality of access requests, where the plurality of access requests includes the access request. The processing module 84 determines the base key ID 412 for the plurality of access requests. The processing module 84 determines a plurality of content specific information 414 based on the plurality of access requests.

With the plurality of content specific information 414 produced, the key provision module 400 retrieves the set of base key slices utilizing the base key ID 412 and decodes the set of base key slices in accordance with the error encoding function to recover the base key 424. For each of the plurality of access requests, the key generator module 402 generates another unique access specific key based on the recovered base key 424 and a corresponding one of the plurality of content specific information. With another unique access specific key produced for each of the plurality of access requests, the processing module 84 executes the plurality of access requests utilizing each of the other unique access specific keys. For example, the processing module facilitates recovery of ten encrypted data objects from the memory 88 and decryption of the ten encrypted data objects to reproduce ten data objects when the plurality of access request includes the plurality of DSN read requests.

Figure 41D:
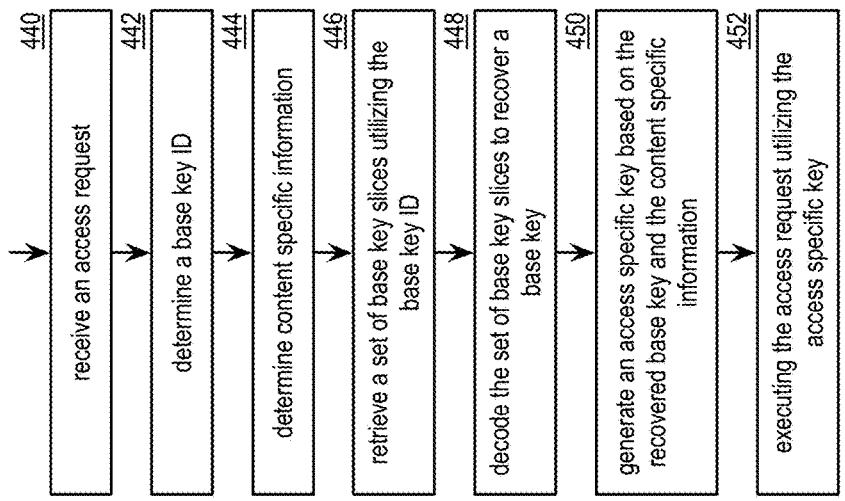
FIG. 41D is a flowchart illustrating an example of accessing secure data in accordance with the present invention.

FIG. 41D is a flowchart illustrating an example of accessing secure data. The method begins at step 440 where a processing module (e.g., of a storage unit) receives an access request regarding a data object, where the access request includes a data object identifier, requestor information, and addressing information. Alternatively, the processing module may receive a plurality of access requests, where the plurality of access requests includes the access request. Each access request may further include one of a write request and a read request.

The method continues at step 442 where the processing module determines a base key identifier based on the access request. When receiving the plurality of access requests, the processing module determines the base key identifier for the plurality of access requests (e.g., for a common vault). As an example of determining the base key identifier, the processing module determines a domain based on at least one of the addressing information and the requestor information, where the domain is one of a plurality of domains of memory of a dispersed storage network (DSN). A plurality of base keys is assigned to the plurality of domains. A plurality of base key identifiers are associated with the plurality of base keys. The processing module determines the base key identifier from the plurality of base key identifiers based on the domain. As another example of determining the base key identifier, the processing module sends a domain request to a managing unit, where the domain request includes at least a portion of the access request. The processing module receives the base key identifier from the managing unit.

The method continues at step 444 where the processing module determines content specific information based on the access request. When receiving the plurality of access requests, the processing module determines a plurality of content specific information based on the plurality of access requests (e.g., by each slice name). Examples of the processing module determining the content specific information includes one or more of utilizing the data object identifier as at least part of the content specific information (e.g., slice name, file name, object name, etc.) and determining the at least part of the content specific information one or more of physical addresses of memory of the storage device from the addressing information, logical addresses regarding the data object from the addressing information (e.g., DSN address, vault, etc.), data type of the data object, a timestamp of the access request, and identity of a requesting device based on the requestor information.

The method continues at step 446 where the processing module retrieves a set of base key slices utilizing the base key identifier. For example, the processing module determines identity of a set of other storage devices based on the base key identifier, sends a set of key slice retrieval requests to the set of other storage devices, and receives at least a decode threshold number of base key slices to recover the base key (e.g., from the other storage devices and/or a local memory of the storage device). The method continues at step 448 where the processing module decodes the set of base key slices in accordance with an error encoding function to recover a base key.

The method continues at step 450 where the processing module generates an access specific key based on the recovered base key and the content specific information. When receiving the plurality of access requests, the processing module generates another unique access specific key for each of the plurality of access requests based on the recovered base key and a corresponding one of the plurality of content specific information. For example, the processing module performs a function on the recovered base key and the corresponding one of the plurality of content specific information to produce the access specific key. The function includes at least one of a deterministic function, a logical function, and a mathematical function. As another example, the processing module performs an encrypting function on the recovered base key and the corresponding one of the plurality of content specific information to produce the access specific key. As a specific example, the processing module encrypts the recovered base key utilizing the content specific information to produce the access specific key. As another specific example, the processing module encrypts the content specific information utilizing the recovered base key to produce the access specific key.

The method continues at step 452 where the processing module executes the access request regarding the data object utilizing the access specific key. When receiving the plurality of access requests, the processing module executes the one of the plurality of access requests utilizing the other unique access specific key. As an example of executing the access request when the access request includes a read access request, the processing module sends a read instruction to memory of the storage device, retrieves an encrypted data object from the memory in accordance with the read instruction, decrypts the encrypted data object using the access specific key to recover the data object, and outputs the recovered data object. As an example of executing the access request when the access request includes a write access request, the processing module encrypts the data object using the access specific key to produce an encrypted data object, sends a write instruction to memory of the storage device, and stores the encrypted data object in the memory in accordance with the write instruction.

Figure 42A:
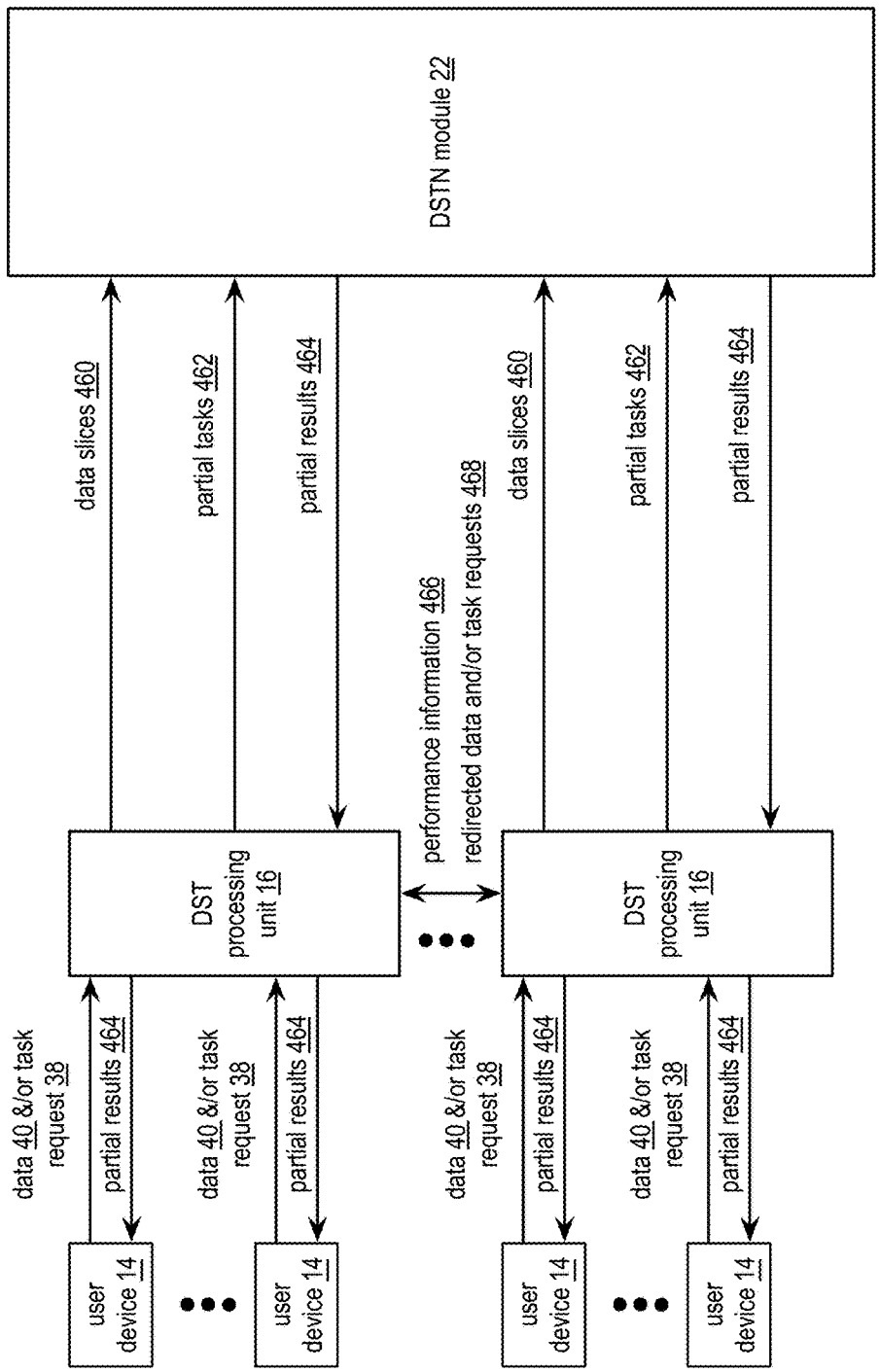
FIG. 42A is a schematic block diagram of another embodiment of a distributed computing system in accordance with the present invention.

FIG. 42A is a schematic block diagram of another embodiment of a distributed computing system that includes a distributed storage and task network (DSTN) module 22, two or more to distributed storage and task (DST) units 16, and for each DST processing unit 16 of the two or more DST unit 16, a plurality of user devices 14. Each DST processing unit 16 receives data 40 and/or task requests 38 from the plurality of user devices 14 and generates data slice accesses (e.g., including data slices 460) to the DSTN module 22 and may include partial tasks 462 when the DST processing unit 16 receives the task request 38. The DSTN module 22 generates partial results 464 in response to the partial tasks 462 executed on the data slices. The DST processing unit 16 forwards at least some of the partial results 464 to at least one of the plurality of user devices 14.

Each DST processing unit 16 of the two or more DST processing unit 16 share performance information 466. The performance information 466 includes one or more of a utilization of networking resources level, a utilization of processing resources level, a utilization of memory resources level, a capacity level of resources, a capacity level of processing resources, and a capacity of memory resources. When receiving a request (e.g., a slice access request 40, a task request 38) from a user device 14, a DST processing unit 16 determines whether to internally process the request or to redirect the request to at least one other DST processing unit 16 of the two or more DST processing unit 16. When redirecting the request, the DST processing unit 16 sends redirected data and/or task requests 468 to the other DST processing unit 16 for further processing.

In an example of operation, the DST processing unit 16 receives the slice access request 40 from a requesting user device 14. The DST processing unit 16 determines whether to internally process the request or to redirect the request based on a comparison of available resources to a resource threshold based on the performance information. When the DST processing unit 16 determines to redirect the request, the DST processing unit 16 selects another DST processing unit 16 based on performance information 466 associated with the other DST processing unit 16 such that a comparison of available resources of the other DST processing units 16 to the resource threshold is favorable. Alternatively, the selecting may be based on at least one of a round-robin approach, a predetermination, and a backup DST processing unit identifier associated with the DST processing unit 16. Next, the DST processing unit 16 facilitates sending the slice access request 40 to the other DST processing unit 16 for processing. Alternatively, or in addition to, the DST processing unit 16 generates and sends a redirect response to the requesting user device 14. The method of operation of the system is discussed in greater detail with reference to FIG. 42B.

Figure 42B:
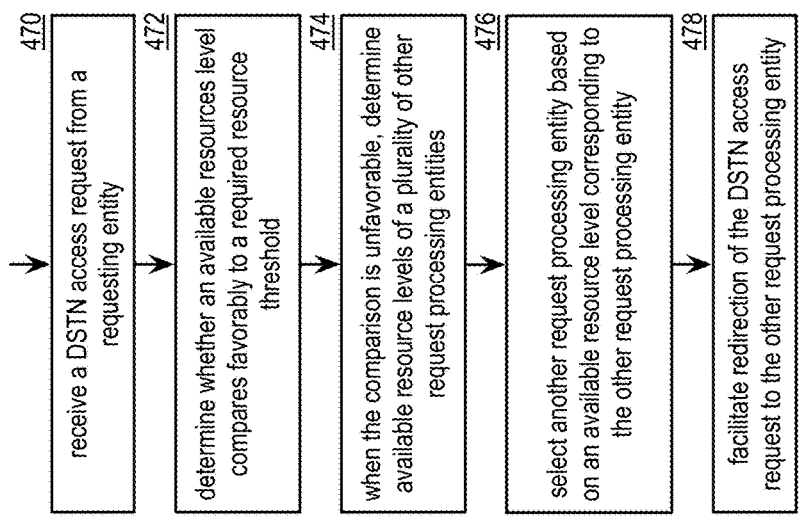
FIG. 42B is a flowchart illustrating an example of processing a distributed storage and task network (DSTN) access request connection in accordance with the present invention.

FIG. 42B is a flowchart illustrating an example of processing a distributed storage and task network (DSTN) access request connection. The method begins at step 470 where a processing module (e.g., of a distributed storage and task (DST) client module) receives a distributed storage and task network (DSTN) access request from a requesting entity. The access request includes one or more of a requesting entity identifier (ID), a request type indicator, a required level of resources, a DSTN address, a data object identifier, and a request processing entity ID (e.g., of a preselected DST processing unit).

The method continues at step 472 where the processing module determines whether an available resource level compares favorably to a required resource threshold. The determining may be based on at least one of a comparison of available resources to estimated required resources, a comparison of available resources to a resource availability threshold, and a comparison of available resources to a processing resource level of availability of an explicitly requested processing resource. For example, the processing module determines that the comparison is unfavorable when the available resource level is less than the required resource threshold. When the comparison is unfavorable, the method continues at step 474 where the processing module determines available resource levels of a plurality of other request processing entities (e.g., other DST processing units). The determining may be based on one or more of a lookup, a query, receiving information, a test, and obtaining a historic record.

The method continues at step 476 where the processing module selects another request processing entity based on an available resource level corresponding to the other request processing entity. The selecting may be based on one or more of resource availability of the other request processing entity compared to a required resource level, a round-robin approach, a predetermination, an explicit request, and identifying the other request processing entity associated with a most favorable available resource level. The method continues at step 478 where the processing module facilitates redirection of the DSTN access request to the other request processing entity. The facilitating includes at least one of generating a second access request that includes the DSTN access request and an identifier of the other request processing entity, sending the second access request to the other request processing entity, generating a redirect response and sending the redirect response to the requesting entity, and forwarding the DSTN access request to the other request processing entity.

Figure 43:
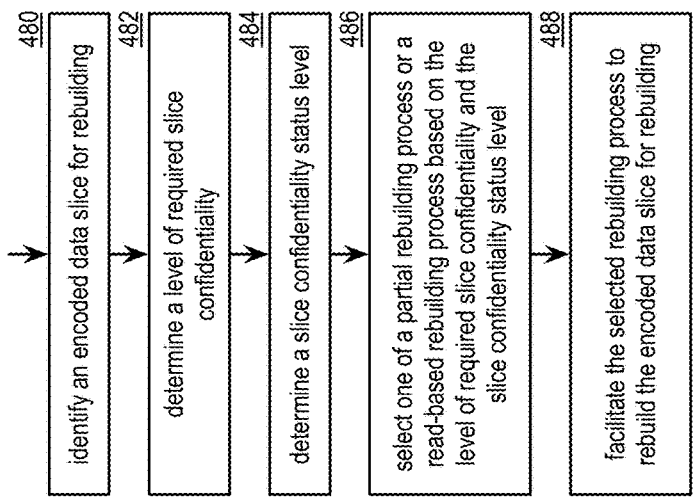
FIG. 43 is a flowchart illustrating an example of rebuilding a slice in accordance with the present invention.

FIG. 43 is a flowchart illustrating an example of rebuilding a slice. The method begins at step 480 where a processing module (e.g., of a distributed storage and task (DST) client module) identifies an encoded data slice for rebuilding. The identifying includes at least one of identifying a slice error, receiving a read slice request for a rebuilding process, and receiving a slice error message. The method continues at step 482 where the processing module determines a level of required slice confidentiality. Slice confidentiality pertains to exposure of the encoded data slice. For example, a medium level of required slice confidentiality refers to a requirement to not expose encoded data slice while a low level of required slice confidentiality refers to no requirement to not expose the encoded data slice. As another example, a high level of required slice confidentiality refers to a requirement to encrypt the slice. The determining may be based on one or more of a lookup based on a slice name of the encoded data slice for rebuilding, receiving the level, a data type indicator, and a security indicator.

The method continues at step 484 for the processing module determines a slice confidentiality status level. The status level includes at least one of the slice is encrypted, the slices not encrypted, the slices obfuscated, the slices not obfuscated and not encrypted, and the slice that includes raw data or the slice that does not include raw data. The determining may be based on where more of analyzing the slice for encryption, analyzing the slice for obfuscation, an encryption indicator, an obfuscation indicator, a query, and a lookup.

The method continues at step 486 where the processing module selects one of a partial rebuilding process or a read-based rebuilding process based on the level required slice confidentiality and the slice confidentiality status level. For example, the processing module selects the partial rebuilding when a level of required slice confidentiality is high and a slice confidentiality status level is low. As another example, the processing module selects the read-based rebuilding process when a level of required slice confidentiality is low.

The method continues at step 488 where the processing module facilitates the selected rebuilding process to rebuild the encoded data slice for rebuilding. The read-based rebuilding process includes rebuilding a data segment from a set of data slices read from a set of distributed storage and task (DST) execution units and re-encoding the data segment to produce a rebuilt data slice. Slices may be exposed when utilizing the read-based rebuilding process. The partial rebuilding process includes rebuilding the identified encoded data slice for rebuilding from retrieved partial encoded data slices generated by a decode threshold number of DST execution units. Slices are not exposed when utilizing the partial rebuilding process. The facilitating of the selected rebuilding process includes at least one of sending a reject message if a read slice request for a rebuilding process was received by a DST execution unit and the selected rebuilding process is the partial rebuilding process and initiating the selected partial rebuilding process one initiating the process (e.g., some request for partial encoded data slices or encoded data slices to a list of the potential number of DST execution units).

Figure 44A:
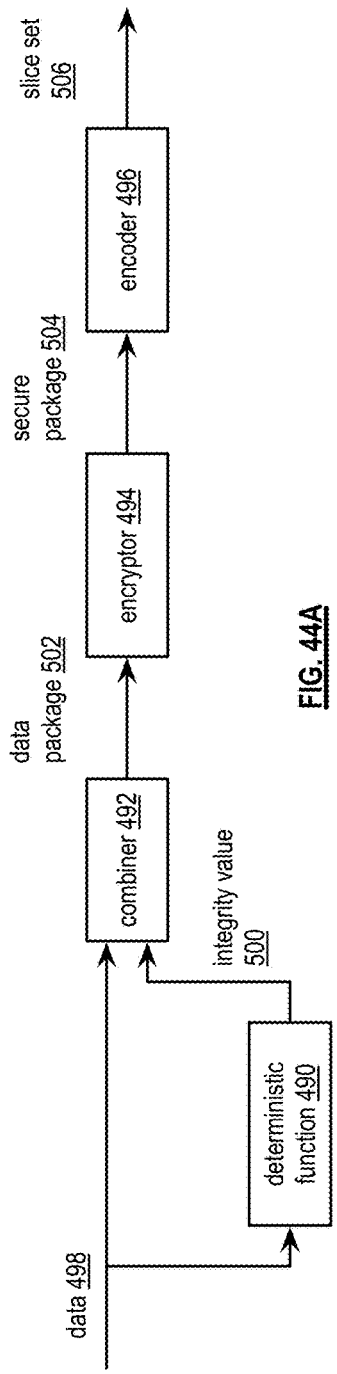
FIG. 44A is a schematic block diagram of an embodiment of a data encoding system in accordance with the present invention.

FIG. 44A is a schematic block diagram of an embodiment of a data encoding system that includes a deterministic function 490, a combiner 492, an encryptor 494, and an encoder 496. The deterministic function 490 includes at least one of a hashing function, a cyclic redundancy check function (CRC), a hash-based message authentication code (HMAC) function, and a masked generating (MGF) function. The deterministic function receives data 498 (e.g., a data segment) and applies the deterministic function to the data 498 to produce an integrity value 500. When utilizing the HMAC deterministic function, the deterministic function may utilize a key derived from the data utilizing another deterministic function.

The combiner 492 combines the data 498 and the integrity value 500 to produce a data package 502. The combining includes at least one of interspersing the integrity value 500 in a plurality of locations across the data 498 such that at least two slices of a subsequently produced slice includes at least a portion of the integrity value 500, inserting the integrity value 500 in one location of the data 498, appending the integrity value 500 to the data 498, and pre-appending the integrity value 500 to the data 498.

The encryptor 494 may determine whether the data package 502 includes data 498 that has already been encrypted. When the encryptor 494 detects that the data 498 has already been encrypted, the encryptor 494 passes the data package 502 through to the encoder 496. When the encryptor 494 detects that the data 498 has not already been encrypted, the encryptor 494 encrypts the data package 502 to produce a secure package 504 utilizing at least one of an encryption algorithm, an all or nothing transformation (AONT) function, a mathematical function, and a logical function (e.g., an exclusive OR function). The encoder 496 encodes the secure package 504 utilizing a dispersed storage error coding function to produce a set of slices. A method of operation corresponding to the data encoding system is discussed in greater detail with reference to FIG. 44C.

Figure 44B:
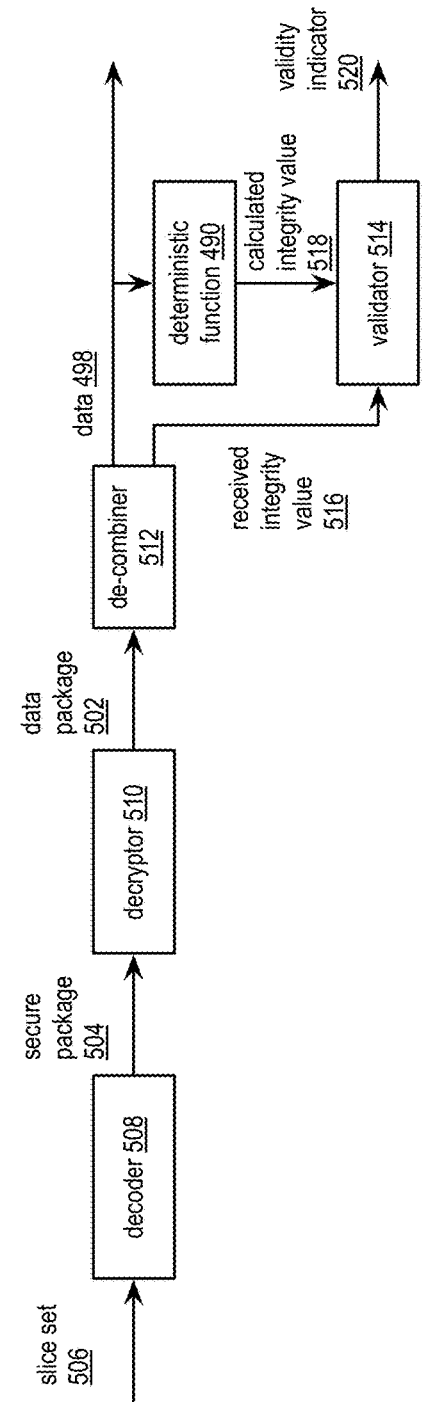
FIG. 44B is a schematic block diagram of an embodiment of a data decoding system in accordance with the present invention.

FIG. 44B is a schematic block diagram of an embodiment of a data decoding system that includes a decoder 508, a decryptor 510, a de-combiner 512, a deterministic function 490, and a validator 514. The decoder 508 receives a set of slices 506 and decodes the set of slices 506 utilizing a dispersed storage error coding function to produce a secure package 504. The decryptor 510 decrypts the secure package 504 to produce a data package 502 utilizing at least one of an encryption algorithm, an all or nothing transformation (AONT) function, a mathematical function, and a logical function (e.g., an exclusive OR function). The data package 502 was produced by combining an integrity value with data by at least one of interspersing the integrity value in a plurality of locations across the data such that at least two slices of a subsequently produced slice includes at least a portion of the integrity value, inserting the integrity value in one location of the data, appending the integrity value to the data, and pre-appending the integrity value to the data.

The de-combiner 512 de-combines portions of the data package 502 to produce data 498 and a received integrity value 516. The de-combining includes identifying a combining approach utilized to generate the data package. The identifying may be based on one or more of detecting the combining approach, a lookup, a predetermination, and receiving the approach. The deterministic function 490 includes at least one of a hashing function, a cyclic redundancy check function (CRC), a hash-based message authentication code (HMAC) function, and a masked generating (MGF) function. The deterministic function 490 applies the deterministic function to the data 498 to produce a calculated integrity value 518. The validator 514 validates the data 498 to produce a validity indicator 520 based on a comparison of the received integrity value 516 to the calculated integrity value 518. For example, the validator 514 generates the validity indicator 520 to indicate that the data 498 is valid when the received integrity value 516 is substantially the same as the calculated integrity value 518. A method operation of the data decoding system is described in greater detail with reference to FIG. 44D.

Figure 44D:
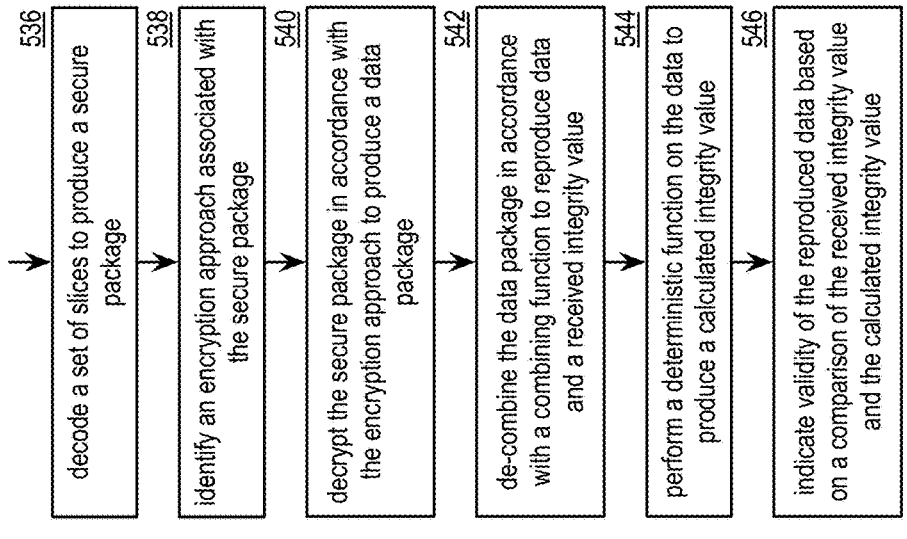
FIG. 44D is a flowchart illustrating an example of decoding data in accordance with the present invention.
Figure 44C:
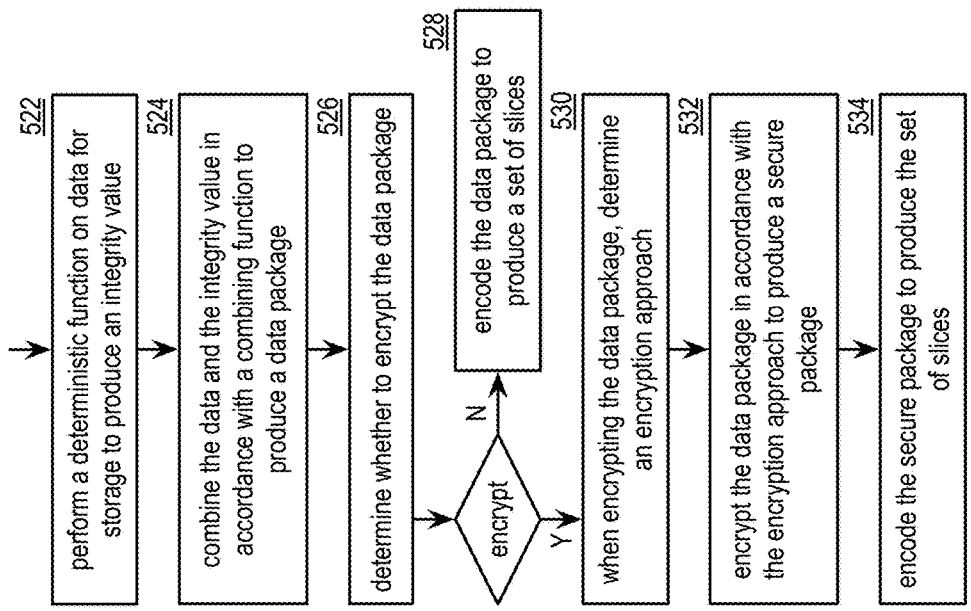
FIG. 44C is a flowchart illustrating an example of encoding data in accordance with the present invention.

FIG. 44C is a flowchart illustrating an example of encoding data. The method begins at step 522 where a processing module (e.g., of a distributed storage and task (DST) client module) performs a deterministic function on data for storage to produce an integrity value. The method continues at step 524 where the processing module combines the data and the integrity value in accordance with a combining function to produce a data package. The processing module may obtain the combining function based on at least one of a predetermination, a retrieval, receiving, and a determination based on at least one of a data type, a data size indicator, a data priority level, a dispersal function, dispersal parameters, and a data security level requirement. For example, the processing module determines the combining function to include partitioning the integrity value into 1000 portions and interspersing the 1000 portions evenly across the data when the data security level requirement indicates a high level of required security.

The method continues at step 526 where the processing module determines whether to encrypt the data package. The determining is based on at least one of a lookup, a query, receiving an encryption indicator, and testing the data to determine if the data is already encrypted. The method branches to step 530 when the processing module determines to encrypt the data package. The method continues to step 528 when the processing module determines not to encrypt the data package. The method continues at step 528 where the processing module encodes the data package to produce a set of slices utilizing a dispersed storage error coding function.

When encrypting the data package, the method continues at step 530 where the processing module determines an encryption approach. The determining may be based on at least one of a lookup, a query, and receiving the approach. The method continues at step 532 where the processing module encrypts the data package in accordance with the encryption approach to produce a secure package. The method continues at step 534 where the processing module encodes the secure package to produce the set of slices utilizing the dispersed storage error coding function.

FIG. 44D is a flowchart illustrating an example of decoding data. The method begins at step 536 where a processing module (e.g., of a distributed storage and task (DST) client module) decodes a set of slices to produce a secure package utilizing a dispersed storage error coding function. The method continues at step 538 where the processing module identifies an encryption approach associated with the secure package. The identifying may be based on at least one of a determination, a lookup, a query, and receiving the approach. The method continues at step 540 where the processing module decrypts the secure package in accordance with the encryption approach to produce a data package. For example, when utilizing a reverse all or nothing transformation as the encryption approach, processing module the combines the secure package to produce encrypted data and a masked key. Next, the processing module performs an exclusive OR function on a hash of the encrypted data and the master key to produce a key. Next, the processing module decrypts the encrypted data utilizing the key to produce the data package.

The method continues at step 542 where the processing module de-combines the data package in accordance with a combining function to reproduce data and a received integrity value. The de-combining includes identifying the combining function based on at least one of a lookup, a query, and receiving a combining function. The method continues at step 544 where the processing module performs a deterministic function on the data to produce a calculated integrity value. The method continues at step 546 where the processing module indicates validity of the reproduce data based on a comparison of the received integrity value and the calculated integrity value. For example, the processing module produces a validity indicator that indicates that the reproduce data is valid when the comparison indicates that the received integrity value and the calculated integrity value are substantially the same.

Figure 45:
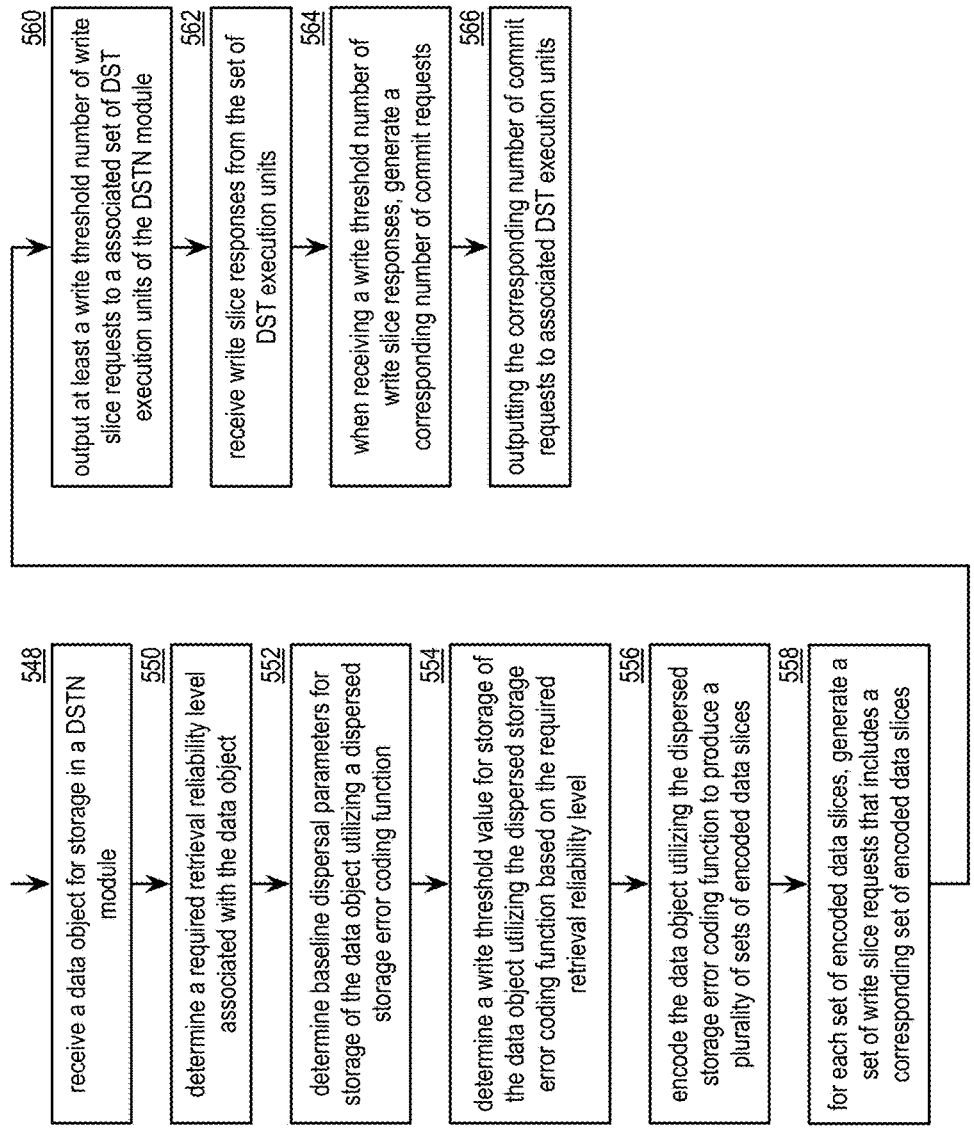
FIG. 45 is a flowchart illustrating an example of storing data in accordance with the present invention.

FIG. 45 is a flowchart illustrating an example of storing data. The method begins at step 548 where a processing module (e.g., of a distributed storage and task (DST) client module) receives a data object for storage in a dispersed storage and task network (DSTN) module. The data object includes at least one of a data file, a metadata file, a segment allocation table file, and an index node file. The method continues at step 550 where the processing module determines a required retrieval reliability level associated with the data object. A higher than average required retrieval reliability level may be associated with at least one of the metadata file, a segment allocation table file, and the index node file. The determining includes at least one of a lookup, receiving, a query, accessing a historical reliability record, and retrieving.

The method continues at step 552 where the processing module determines baseline dispersal parameters for storage of the data object utilizing a dispersed storage error coding function. The baseline dispersal parameters includes one or more of a pillar width value, a decode threshold value, and an encoding matrix. The determining may be based on one or more of the required retrieval reliability level associated with the data object, a lookup, a predetermination, and receiving. The method continues at step 554 where the processing module determines a write threshold value for storage of the data object utilizing the dispersed storage error coding function based on the required retrieval reliability level. The determining may be based on one or more of a predetermination, a lookup, a calculation, receiving, a query, and retrieving. For example, the processing module determines a higher than average right special value for a higher required retrieval reliability level.

The method continues at step 556 where the processing module encodes the data object utilizing the dispersed storage error coding function in accordance with the baseline dispersal parameters to produce a plurality of sets of encoded data slices. For each set of encoded data slices of the plurality of sets of encoded data slices, the method continues at step 558 where the processing module generates a set of write slice requests that includes the set of encoded data slices. The processing module generates a set of slice names corresponding to the set of encoded data slices. Alternatively, the processing module generates a write threshold number of write slice requests.

The method continues at step 560 where the processing module outputs at least a write threshold number of write slice requests to an associated set of dispersed storage and task (DST) execution units of the DSTN module. The method continues at step 562 where the processing module receives write slice responses from the set of DST execution units (e.g., one write slice response per DST execution unit). A write slice response includes an indicator with regards to favorable success or unfavorable failure of the write slice request. When receiving a write threshold number of favorable write slice responses, the method continues at step 564 where the processing module generates a corresponding number of commit requests (e.g., one commit request for each DST execution unit corresponding to a received favorable write slice response). The method continues at step 566 where the processing module outputs the corresponding number of commit requests to associated DST execution units (e.g., one commit request to each DST execution unit corresponding to the received favorable write slice response).

Figure 46A:
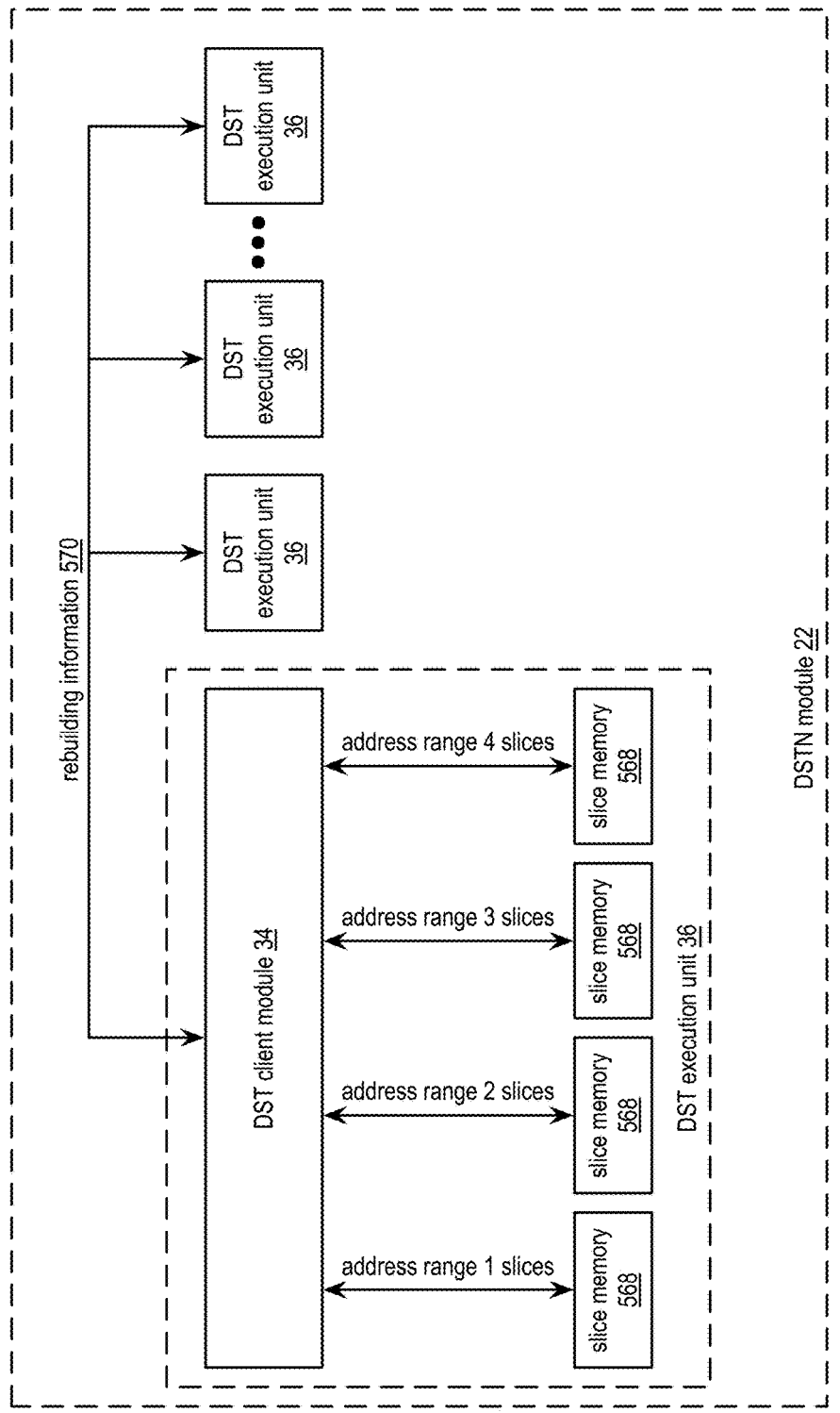
FIG. 46A is a schematic block diagram of another embodiment of a distributed storage and task network (DSTN) module in accordance with the present invention.

FIG. 46A is a schematic block diagram of another embodiment of a distributed storage and task network (DSTN) module 22 that includes a plurality of distributed storage and task (DST) execution units 36. Each DST execution unit 36 of the plurality of DST execution units 36 includes a DST client module 34 and a plurality of slice memories 568. The slice memories 568 may be implemented with one or more of a variety of storage technologies including solid-state memory, magnetic disk drive memory, and optical disc drive memory. Each storage technology of the variety of storage technologies may be associated with an input/output performance level. The input/output performance level may be associated with a variety of slice memory modules including one or more of a serial interface, a parallel interface, a buffer memory size, a buffer memory performance level, a disk controller performance level, a disk speed level, a head access speed level, and more technologies well known in the industry that limit overall performance of a storage technology.

The DSTN module 22 is operable to rebuild encoded data slices stored in one or more of the plurality of slice memories when one or more slice errors are detected. A slice error includes at least one of a missing slice, a corrupted slice, a maliciously tampered slice, and a slice associated with a slice integrity mismatch. Each DST execution unit 36 of the plurality of DST execution units 36 is associated with a DSTN address range. The DSTN address range includes a slice name range corresponding to encoded data slices stored within the DST execution unit 36. For each address range, for each DST execution unit, each slice memory of the plurality of slice memories is associated with a portion of the address range in accordance with a slice name to slice memory device mapping. For example, a first slice memory 568 is associated with address range 1 slices, a second slice memory 568 is associated with address range 2 slices, a third slice memory 568 is associated with address range 3 slices, and a fourth slice memory 568 is associated with address range 4 slices.

The DST client module 34 is operable to schedule an encoded data slice rebuilding process based on one or more of a number of encoded data slices to be rebuilt, a slice memory technology type, a number of slice errors per slice memory 568, a rebuilding performance level goal, and other processes requiring access to slice memory 568. The rebuilding performance level goals include one or more of a maximum slice memory access bandwidth level goal, a load leveling goal, a total timeframe goal, an individual slice rebuilding timeframe goal, and a maximum level of processing resources required goal.

In an example of operation, the DST client module 34 determines whether a number of simultaneous slice errors for remedy by rebuilding is greater than a slice error threshold number. When the number of simultaneous slice errors for remedy by rebuilding is greater than the slice error threshold number, DST client module 34 determines a schedule for rebuilding for a plurality of encoded data slices requiring rebuilding based on one or more of a number of slice errors associated with each DST execution unit 36, the performance level of storage technology associated with each DST execution unit 36, and the slice name to slice memory device mapping. For example, the DST client module schedules a higher than average number of rebuilding operations for encoded data slices associated with slice names in a first DSTN address range for the first slice memory 568 associated with higher than average storage technology performance level and schedules a lower than average number of rebuilding operations for encoded data slices associated with slice names in a second DSTN address range for the second slice memory 568 associated with a lower than average storage technology performance level. Alternatively, another DST client module 34 associated with another DST execution unit 36 performs such scheduling based on one or more of the number of slice errors associated with the DST execution unit 36, an estimated performance level of storage technology associated with the DST execution unit 36, and an estimated slice name to slice memory device mapping for the DST execution unit 36. At least one of the DST execution unit 36 and the other DST execution unit 36 shares rebuilding information 570 with the set of DST execution units 36, where the rebuilding information 570 includes the scheduling.

Figure 46B:
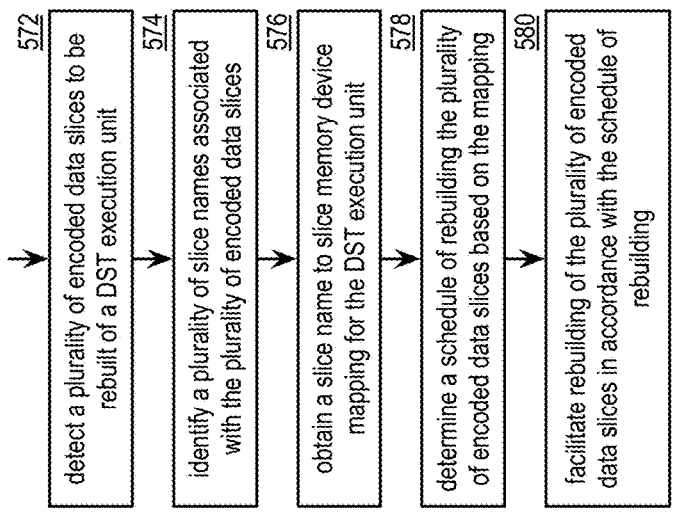
FIG. 46B is a flowchart illustrating an example of rebuilding slices in accordance with the present invention.

FIG. 46B is a flowchart illustrating an example of rebuilding slices. The method begins at step 572 where a processing module (e.g., of a distributed storage and task (DST) client module) detects a plurality of encoded data slices to be rebuilt associated with a distributed storage and task (DST) execution unit. The detecting includes one or more of receiving an error message, detecting that a retrieved integrity value does not compare favorably to a calculated integrity value for a slice, determining that a list response does not compare favorably to another list response corresponding to another DST execution unit (e.g., list responses in response to outputting list requests), and receiving a rebuilding request.

The method continues at step 574 where the processing module identifies a plurality of slice names associated with the plurality of encoded data slices. The identifying includes at least one of comparing slice names of two or more list responses, extracting from an error message, extracting from a read slice response, and receiving. The method continues at step 576 where the processing module obtains a slice name to slice memory device mapping for the DST execution unit. The obtaining includes at least one of receiving a DSTN address range assignment for the DST execution unit, estimating address range assignments for each slice memory of a plurality of slice memories associated with the DST execution unit (e.g., dividing the address range assignment for the DST execution unit by a number of slice memories), retrieving, initiating a query, and look up, and receiving.

The method continues at step 578 where the processing module determines a schedule of rebuilding the plurality of encoded data slices based on the mapping. The determining includes selecting a rebuilding order and/or rebuilding timeframe of rebuilding steps to achieve a load leveling performance goal with regards to accessing each slice memory of the plurality of slice memories. The method continues at step 580 where the processing module facilitates rebuilding the plurality of encoded data slices in accordance with the schedule of rebuilding. The facilitating includes at least one of rebuilding in accordance with the mapping and issuing a rebuild request to a rebuilding module such that the rebuilding request includes a portion of the schedule of rebuilding. For instance, the processing module outputs rebuilding information to another DST execution unit that includes the portion of the schedule of rebuilding.

FIG. 47 is a flowchart illustrating an example of storing data and metadata. The method begins at step 582 where a processing module (e.g., of a distributed storage and task (DST) client module) receives a data object for storage in a dispersed storage and task network (DSTN) module. The data object may include the number of bytes that is one of more than the average number of bytes of an average data object, about the same number of bytes of the average data object, and less than the average number of bytes of the average data object. The method continues at step 584 where the processing module generates metadata corresponding to the data object. The generating includes one or more of generating a source name corresponding to a storage location for the data; and obtaining metadata parameters of the data object including one or more of a data size, a data type, a number of segments, a segmentation method, and a segment size.

The method continues at step 586 where the processing module determines whether to store the data and the metadata as one storage object in the DSTN module. The determining may be based on the number of bytes of the data object, a number of bytes of the metadata, a segment size dispersal parameter, and a size threshold. For example, the processing module indicates to store the data and the metadata as one storage object when a sum of the number of bytes of the data object and the number of bytes of the metadata is less than the size threshold. As another example, the processing module indicates to store the data and the metadata as one storage object when the sum of the number of bytes of the data object and the number of bytes of the metadata is less than the segment size dispersal parameter.

When storing the data and the metadata as the one storage object, the method continues at step 588 where the processing module combines the data and the metadata to produce the one storage object in accordance with the combining approach. The combining approach includes at least one of pre-appending the metadata to the data, post-appending the metadata to the data, interleaving the metadata with the data. The combining approach may further include appending a metadata pointer to the data. The metadata pointer indicates the combining approach and/or where the metadata was combined with respect to the data.

The method continues at step 590 where the processing module encodes the one storage object utilizing a dispersed storage error coding function to produce a set of slices. The encoding may include padding a segment with filler bytes (e.g., a fixed pattern, all ones, all zeros, a random pattern) when the encoding produces a number of bytes that is less than a segment size number of bytes. The method continues at step 592 where the processing module facilitates storage of the set of slices in the DSTN module. The facilitating includes generating a set of slice names corresponding to the set of slices, generating a set of write slice requests that includes the set of slices and the set of slice names, and outputting the set of write slice requests to the DSTN module. The method may provide a system-level efficiency improvement by storing metadata and data in a single set of slices in the DSTN module.

FIG. 48A is a schematic block diagram of an embodiment of a dispersed storage network system that includes an outbound distributed storage and task (DST) processing 80, a distributed storage and task network (DSTN) module 22, and an inbound DST processing 82. The DSTN module 22 includes a storage pool 596 that includes a plurality of DST execution units 36. The outbound DST processing 80 performs storage processing on data 92 to produce one or more encoded data slice sets 1-S for storage in the storage pool 596, where each encoded data slice sets includes a set of encoded data slices. The inbound DST processing 82 retrieves at least a decode threshold number of encoded data slices for each of at least a threshold number of encoded data slice sets for recovery processing to reproduce the data 92 as recovered data 594.

In an example of storage processing, the outbound DST processing 80 encodes the data 92 to produce a plurality of data portions such that recovery of a threshold number of the data portions is required to recover the data 92. The outbound DST processing 80 dispersed storage error encodes each data portion to produce a corresponding one or more sets of encoded data slices. For each data portion, the outbound DST processing 80 selects a set of DST execution units 36 to form a corresponding DST execution unit set. For instance, the outbound DST processing 80 selects a set of 16 DST execution units 36 utilizing a dispersed storage network (DSN) address generation function to form a DST execution unit set 1 for storage of the corresponding one or more sets of encoded data slices of a first data portion. The outbound DST processing 80 sends the one or more sets of encoded data slices to the DST execution unit set 1 using one or more sets of DSN addresses produced by the DSN address generation function. An example of sending sets of encoded data slices to DST execution unit sets using the DSN addresses is discussed in greater detail with reference to FIG. 48B.

The DSN address generation function includes generating a preliminary DSN address based on the encoding and a unique source name assigned to the data portion, mapping the preliminary DSN address to a DSN address for utilization within the storage pool 596, where the DSN address is associated with a particular DST execution unit 36. For instance, for a first set of encoded data slices of the first data portion, the outbound DST processing 80 assigns a first unique source name associated with the first data portion. Next, the outbound DST processing 80 generates a pillar field entry for each of the set of encoded data slices (e.g., 1-4 when pillar width of the encoding is 4). The outbound DST processing 80 combines the pillar field entries and the first unique source name to produce a set of preliminary DSN addresses. Next, the DST processing 80 maps each of the preliminary DSN addresses to a corresponding DSN address using the DSN address generation function. For instance, the DST processing 80 performs a table lookup to map a pillar 1 preliminary DSN address to a 6th of eight pillars of the DSN addresses, a pillar 2 preliminary DSN address to a 3rd pillar of the DSN addresses, a pillar 3 preliminary DSN address to a 7th pillar of the DSN addresses, and a pillar 4 preliminary DSN address to a 1st pillar of the DSN addresses. Having generated a set of DSN addresses for the set of encoded data slices, the outbound DST processing 80 identifies DST execution units associated with the set of DSN addresses (e.g., a table lookup).

In another example of storage processing, the outbound DST processing 80 encodes each data portion to produce a plurality of data segments. The outbound DST processing 80 dispersed storage error encodes each data segment of each of the plurality of data segments to produce corresponding sets of encoded data slices for each data segment. Having produced the sets of encoded data slices, the outbound DST processing 80 selects the DST execution unit set 1 for storage of sets of encoded data slices associated with the plurality of data segments of the first data portion and selects a DST execution unit set 2 for storage of other sets of encoded data slices associated with another plurality of data segments of a second data portion.

In an example of recovery processing, the inbound DST processing 82 accesses one or more sets of DST execution units of the storage pool 596 to retrieve at least a decode threshold number of encoded data slices for each set of storage encoded data slices. For instance, the inbound DST processing 82 retrieves a decode threshold number of encoded data slices corresponding for all data portions of the plurality of data portions when the threshold associated with the plurality data portions is equivalent to the number of data portions. The inbound DST processing 82 dispersed storage error decodes each decode threshold number of encoded data slices to reproduce the data 92 as recovered data 594.

FIG. 48B is a schematic block diagram of another embodiment of a dispersed storage network system that includes the outbound DST processing 80 and storage pool 596 of FIG. 48A. In an example of outputting sets of encoded data slices to the storage pool 596, the outbound DST processing 80 produces two sets of slices (e.g., slice set 1: data slice 1_1, data slice 1_2, data slice 1_3, data slice 1_4, and slice set 2: data slice 2_1, data slice 2_2, data slice 2_3, data slice 2_4). The outbound DST processing 80 produces two sets of DSN addresses corresponding to the two sets of encoded data slices, where each DSN address is associated with a DSN address range of a DST execution unit of the storage pool 596 as well as a unique slice set. For instance, a DSN address 7_1 is produced for data slice 1_3 of the slice set 1, where the data slice 1_3 is to be stored in a DST execution unit 7 associated with a 7th address range. In another instance, a DSN address 7_2 is produced for data slice 2_2 of the slice set 2, where the data slice 2_2 is to be stored in the DST execution unit 7 associated with the seventh address range.

The DST execution units associated with a common slice set form a DST execution unit set. For example, DST execution units 1, 3, 6, and 7 form DST execution unit set 1 associated with the slice set 1 and DST execution units 2, 4, 7, and 8 form DST execution unit set 2 associated with the slice set 2. A single DST execution unit may be associated with any number of DST execution unit sets (e.g., 0, 1, 2, . . . sets). For instance, DST execution unit 7 is associated with both DST execution unit sets 1 and 2. In another instance, DST execution unit 5 is not associated with either of DST execution unit set 1 and 2. A single DST execution unit typically stores one encoded data slice per set of encoded data slices when associated with the set of encoded data slices to improve system reliability.

The storage pool 596 may include any number of DST execution units. The outbound DST processing 80 determines a number of address ranges based on one or more of a number of the set of encoded data slices, a DSN address generation function, a predetermination, a table lookup, DST execution unit availability information, a vault identifier, a requesting entity identifier, and a system performance indicator. For instance, the outbound DST processing 80 determines to utilize eight DSN address ranges when the number of pillars of the set of encoded data slices is four. In another instance, the outbound DST processing 80 determines to utilize 32 DSN address ranges when the number of pillars of the set of encoded data slices is 16 and the DSN address generation function indicates to double the number of pillars of the set of encoded data slices to produce the number of DSN address ranges.

FIG. 48C is a diagram illustrating an example of generating a dispersed storage network address (DSN) from a preliminary DSN address using an address generating module 598. The address generating module 598 performs the address generating function as introduced in FIG. 48A. In the example, a preliminary DSN address is generated for the data slice 1_1 of FIG. 48B and the address generating module 598 applies the address generating function to the preliminary DSN address 1_1 to produce the DSN address 6_1 of FIG. 48B. The data slice 1_1 corresponds to a first encoded data slice of a first data segment of the first data portion. The preliminary DSN address 1_1 is generated to include a pillar field entry of 1 (e.g., first encoded data slice), a source name field entry of the first unique source name 1, and a segment field entry of segment 1.

The address generating module 598 performs the address generating function on the preliminary DSN address 1_1 to generate the DSN address 6_1 to include a slice index field entry of 6, a source name field entry of source name 1_A, and a segment field entry of segment 1 corresponding to segment 1 of the preliminary DSN address 1_1. For the example, the address generating module 598 performs the address generating function on the pillar field entry of the luminary DSN address 1_1 by adding an offset of 5 to the pillar 1 entry to produce the slice index entry of 5. As another example, the address generating module 598 performs address generating function on the unique source name 1 entry of the source name field of the preliminary DSN address 1_1 by adding another offset to the unique source name 1 to produce the source name 1_A based, where the offset is based in part on the offset utilized to produce the pillar entry of the DSN address 6_1. For instance, the address generating module 598 generates the source name 1_A to correspond to a DSN address range of a sixth storage unit associated with slice index 6. As such, the DSN address 6_1 falls within the DSN address range of the sixth storage unit.

FIG. 48D is a diagram illustrating a dispersed storage network (DSN) address generation function 604 that includes applying a DSN address generating function introduced in FIG. 48A to a preliminary DSN address 1 of a preliminary addressing pinwheel 600 to produce a DSN address 6 of a DSN addressing pinwheel 602. The preliminary addressing pinwheel 600 represents a total DSN addressing range wrapped into a circle where a beginning of the circle at the top of the preliminary addressing pinwheel 600 represents a preliminary addressing zero (PREADDR 0) for a starting point of the DSN address range and an end of the circle at the top represents a preliminary addressing maximum (PREADDR MAX).

The preliminary addressing pinwheel 600 may be divided into equal portions corresponding to a number of pillars of preliminary DSN addresses. For example, the preliminary addressing pinwheel 600 is divided into four DSN address ranges corresponding to four pillars of preliminary DSN addresses associated with the encoding of data using a pillar width of four. Each preliminary DSN address of a set of preliminary DSN addresses corresponds to one of the DSN address ranges. For example, a first preliminary DSN address (e.g., preliminary DSN address 1) is associated with a first DSN address range (e.g., pillar 1) that starts at PREADDR 0 and ends at a PREADDR 1/4 MAX, a second preliminary DSN address is associated with a second DSN address range (e.g., pillar 2) that starts at PREADDR 1/4 MAX and ends at a PREADDR 2/4 MAX, a third preliminary DSN address is associated with a third DSN address range (e.g., pillar 3) that starts at PREADDR 2/4 MAX and ends at a PREADDR 3/4 MAX, and a fourth preliminary DSN address is associated with a fourth DSN address range (e.g., pillar 4) that starts at PREADDR 4/4 MAX and ends at the PREADDR MAX.

The DSN addressing pinwheel 602 represents another total DSN addressing range wrapped into another circle where a beginning of the other circle at the top of the DSN addressing pinwheel 602 represents an address zero (ADDR 0) for a starting point of the other DSN address range and an end of the other circle at the top represents an address maximum (ADDR MAX). The DSN addressing pinwheel 602 may be divided into equal portions corresponding to a number of pillars of DSN addresses utilized for storage of encoded data slices in associated storage units. For example, the DSN addressing pinwheel 602 is divided into eight DSN address ranges corresponding to a pillars of DSN addresses associated with the storage of the encoded data slices amongst eight storage units.

Each DSN address of the DSN addressing pinwheel 602 corresponds a DSN address range of the DSN addressing pinwheel 602, where each DSN address range is associated with a storage unit. For example, a first DSN address falling within a first DSN address range (e.g., pillar 1) that starts at PREADDR 0 and ends at a ADDR 1/8 MAX is associated with a storage unit 1 (SU1), a second DSN address falling within a second DSN address range (e.g., pillar 2) that starts at ADDR 1/8 MAX and ends at a ADDR 2/8 MAX is associated with a storage unit 2 (SU2), a third DSN address falling within a third DSN address range (e.g., pillar 3) that starts at ADDR 2/8 MAX and ends at a ADDR 3/8 MAX is associated with a storage unit 3 (SU3), a fourth DSN address falling within a fourth DSN address range (e.g., pillar 4) that starts at ADDR 3/8 MAX and ends at a ADDR 4/8 MAX is associated with a storage unit 4 (SU4), a fifth DSN address falling within a fifth DSN address range (e.g., pillar 5) that starts at ADDR 4/8 MAX and ends at a ADDR 5/8 MAX is associated with a storage unit 5 (SU5), a sixth DSN address falling within a sixth DSN address range (e.g., pillar 6) that starts at ADDR 5/8 MAX and ends at a ADDR 6/8 MAX is associated with a storage unit 6 (SU6), a seventh DSN address falling within a seventh DSN address range (e.g., pillar 7) that starts at ADDR 6/8 MAX and ends at a ADDR 7/8 MAX is associated with a storage unit 7 (SU7), and an eighth DSN address falling within an eighth DSN address range (e.g., pillar 8) that starts at ADDR 7/8 MAX and ends at the ADDR MAX is associated with a storage unit 8 (SU8).

The DSN address generating function 604 is applied to the preliminary DSN address of the preliminary addressing pinwheel 600 to produce a corresponding DSN address of the DSN addressing pinwheel 602. The DSN address generating function includes at least one of a pinwheel function (e.g., adding an offset function), a deterministic function, a mathematical function, and a logical function. For example, when utilizing the pinwheel function, a pillar offset is applied to the pillar number of the preliminary DSN address of the preliminary addressing pinwheel 600 to generate a pillar number of the DSN address of the DSN addressing pinwheel 602. For instance, a pillar offset of 5 is added to pillar 1 of preliminary DSN address 1 to produce pillar 6 of the DSN address 6. As another example, a source name offset is applied to a source name of the preliminary DSN address to produce a source name of the DSN address such that a source name of the DSN address falls within a DSN address range associated with the pillar number of the DSN address. For instance, the source name offset is applied to a source name of preliminary DSN address 1 to generate the source name of the DSN address 6 such that the DSN address 6 falls within the address range of pillar 6 of the DSN addressing pinwheel 602, where pillar 6 is associated with storage unit 6.

FIG. 48E is a diagram illustrating examples of portion addressing that includes a portion 1 addressing 606 and a portion 2 addressing 608. Each of the portion 1-2 addressing 606-608 illustrates application of the DSN addressing generation function 604 discussed in FIG. 48E to one or more sets of preliminary DSN addresses to generate corresponding one or more sets of DSN addresses. The one or more sets of DSN addresses are utilized for storing one or more corresponding sets of encoded data slices in a corresponding set of storage units, where, for each of the one or more corresponding sets of encoded data slices, a corresponding data portion is encoded to produce the one or more corresponding sets of encoded data slices.

In an example, a first data portion is encoded to produce a first plurality of data segments. Each data segment is encoded using a dispersed storage error coding function to produce a set of encoded data slices of a first plurality of sets of encoded data slices. A first plurality of sets of preliminary DSN addresses are generated for the first plurality of sets of encoded data slices using a common unique source name. For instance, a first set of preliminary DSN addresses 1_1 through 1_4 for a first set of encoded data slices includes a unique source name 1 corresponding to the first data portion, pillar numbers 1-4, and a segment 1 entry.

The DSN address generation function 604 is applied to the preliminary DSN addresses to produce the DSN addresses. For example, the DSN address generation function 604 is applied to the first plurality of sets of preliminary DSN addresses to produce a first plurality of sets of DSN addresses, where the first plurality of sets of DSN addresses share a common source name, each set of DSN addresses shares a common segment number, and each DSN address associated with a common pillar number of a corresponding preliminary DSN address set is associated with a common slice index number. For instance, the DSN address generation function 604 is applied to the first set of preliminary DSN addresses 1_1 through 1_4 to generate a first set of DSN addresses 6_1, 3_1, 7_1, and 1_1 where each of the DSN addresses includes a segment 1 indicator, a common source name 1_A, and a slice index that corresponds to a pillar number of a corresponding preliminary DSN address (e.g., slice index 6 for pillar 1, slice index 3 for pillar 2, slice index 7 for pillar 3, and slice index 1 for pillar 4). As another instance, the DSN address generation function 604 is applied to a second set of preliminary DSN addresses to generate a second set of DSN addresses 6_2, 3_2, 7_2, and 1_2 where each of the DSN addresses includes a segment 2 indicator, a common source name 1_A for data portion 1, and a slice index that corresponds to a pillar number of a corresponding preliminary DSN address as in the first set of DSN addresses (e.g., slice index 6 for pillar 1, slice index 3 for pillar 2, slice index 7 for pillar 3, and slice index 1 for pillar 4).

In another example, a second data portion is encoded to produce a second plurality of data segments. Each data segment is encoded using the dispersed storage error coding function to produce a set of encoded data slices of a second plurality of sets of encoded data slices. A second plurality of sets of preliminary DSN addresses are generated for the second plurality of sets of encoded data slices using a second common unique source name. For instance, a first set of preliminary DSN addresses 2_1 through 2_4 for a first set of encoded data slices includes a unique source name 2 corresponding to the second data portion, pillar numbers 1-4, and a segment 1 entry.

The DSN address generation function 604 is applied to the second preliminary DSN addresses to produce the DSN addresses. For example, the DSN address generation function 604 is applied to the second plurality of sets of preliminary DSN addresses to produce a second plurality of sets of DSN addresses, where the second plurality of sets of DSN addresses share a common source name (e.g., source name 2_A), each set of DSN addresses shares a common segment number, and each DSN address associated with a common pillar number of a corresponding second preliminary DSN address set is associated with a common slice index number. For instance, the DSN address generation function 604 is applied to the first set of portion 2 preliminary DSN addresses 2_1 through 2_4 to generate a first set of DSN addresses 4_1, 7_1, 2_1, and 8_1 where each of the DSN addresses includes a segment 1 indicator, a common source name 2_A, and a slice index that corresponds to a pillar number of a corresponding preliminary DSN address (e.g., slice index 4 for pillar 1, slice index 7 for pillar 2, slice index 2 for pillar 3, and slice index 8 for pillar 4). As another instance, the DSN address generation function 604 is applied to a second set of portion 2 preliminary DSN addresses to generate a second set of DSN addresses 4_2, 7_2, 2_2, and 8_2 where each of the DSN addresses includes a segment 2 indicator, a common source name 2_A for data portion 2, and a slice index that corresponds to a pillar number of a corresponding preliminary DSN address as in the first set of DSN addresses for portion 2 (e.g., slice index 4 for pillar 1, slice index 7 for pillar 2, slice index 2 for pillar 3, and slice index 8 for pillar 4).

FIG. 48F is a schematic block diagram of another embodiment of a dispersed storage network (DSN) system that includes a computing device 610 and a DSN 612. The computing device 610 may be the distributed storage and task (DST) processing unit 16 of FIG. 1, and includes an outbound DST processing 80. The outbound DST processing 80 includes an encoding module 614, a first data portion module 616, a second data portion module 618, a third data portion module 620, and may include further data portion modules. Alternatively a single data portion module may include each of the first, second, third, data portion modules 616-620. The DSN 612 includes a storage pool 596 that includes a plurality of DST execution units 36. The outbound DST processing 80 selects the DST execution units 36 to form one or more DST execution unit sets. For example the first data portion module 616 selects DST execution units 36 to form DST execution unit set 1, the second data portion module 618 selects DST execution units 36 to form DST execution unit set 2, and the third data portion module 620 selects DST execution units 36 to form DST execution unit set 3. The selecting of the DST execution units 36 may result in a common DST execution unit 36 being selected for two or more DST execution unit sets.

In an example of encoding a data file 622 (e.g., video, streaming data, audio, text, images, one or more electronic documents, a collection of information such as user names, passwords, credit card information, etc.), the encoding module 614 encodes the data file 622 into a plurality of data portions 1-3, etc., where a threshold number of the data portions are required to reconstruct the data file 622. The threshold number may include any number from one data portion to all data portions. Each data portion may include one or more data segments. As a specific example, the encoding module 614 divides the data file 622 into the plurality of data portions. As another specific example, the encoding module 614 encrypts the data file 622 in accordance with a key to produce an encrypted data file and divides the encrypted data file into the plurality of data portions. The encoding module 614 may obtain the key in a variety of ways including at least one of retrieving from a key management system, retrieving from a memory, applying a deterministic function (e.g., a hashing function, a hash-based message authentication code function, a mask generating function, a sponge function) to a data name associated with the data file 622, and receiving the key.

As yet another specific example of encoding the data file 622, the encoding module 614 encrypts the data file 622 in accordance with the key to produce the encrypted data file, combines a representation of the key (e.g., the key itself, an obfuscated key) with encrypted data file to produce a combined data file, and divides the combined data file into the plurality of data portions. The encoding module 614 may obtain the representation of the key by generating the representation of the key. For example, the encoding module 614 performs another deterministic function on the encrypted data to produce transformed data and masks (e.g., using an exclusive OR logical function) the key using the transformed data to produce the representation of the key. As a still further specific example of encoding the data file 622, the encoding module 614 dispersed storage error encodes the data file 622 to produce the plurality of data portions. For instance, the encoding module 614 dispersed storage encodes the data file 622 to produce a plurality of data segments as the plurality of data portions. As yet a still further specific example of encoding the data file 622, the encoding module 614 performs a secret sharing function (e.g., Shamir) on the data file 622 to produce the plurality of data portions.

Each data portion may include one or more data segments. Each data portion may be further encoded to produce further data portions. For example, the encoding module 614 may segment a ninth data portion to produce one data segment as a further data portion. As another example, encoding module 614 may segment the ninth data portion to produce four data segments as further data portions of the ninth data portion. As yet another example, the encoding module 614 may encode a tenth data portion to produce five data segments as five further data portions.

In an example of processing a first data portion (e.g., data portion 1) of the plurality of data portions 1-3, etc., when each data portion includes a single data segment or a plurality of data segments, the first data portion module 616, for the first data portion, assigns a first unique source name to the first data portion. The source name includes a portion of a DSN address utilized to store slices in the DSN 612. For example, the source name includes a vault identifier (ID) associated with a requesting entity and an object number that is associated with the data file 622. As an example of assigning the first unique source name, the first data portion module 616 generates the first unique source name based on a name of the data file 622. For instance, the first data portion module 616 performs yet another deterministic function on the name to produce the object number and combines the object number and the vault ID associated with the requesting entity to produce the first unique source name. In another instance, the first data portion module 616 generates the object number based on a random number and combines the object number with the vault ID associated with a requesting entity to produce the first unique source name.

Having assigned the first unique source name, the first data portion module 616 dispersed storage error encodes the first data portion to produce one or more sets of encoded data slices 624. A threshold number of encoded data slices for each of the one or more sets of encoded data slices 624 are required to be retrieved to facilitate recovery of the first data portion. The first data portion module 616 generates (e.g., selects, identifies, calculates, etc.) one or more sets of DSN addresses for the one or more sets of encoded data slices 624 based on the first unique source name. As a specific example of generating DSN addresses, the first data portion module 616 generates a set of DSN addresses of the one or more sets of DSN addresses by utilizing an addressing pinwheel to generate the set of DSN addresses based on the first unique source name. For instance, for the set of DSN addresses, the first data portion module 616 generates a set of preliminary DSN addresses that includes the first unique source name and a unique pillar number for each DSN address of the set of DSN addresses and applies a DSN address generation function associated with the addressing pinwheel to the set of preliminary DSN addresses to produce the set of DSN addresses. The DSN address generation function associated with the addressing pinwheel transforms (e.g., offsets a pillar number) each location on a preliminary addressing pinwheel based on each preliminary DSN address to each location on a DSN addressing pinwheel to produce each is DSN address. For instance, a pillar one location on the preliminary addressing wheel translates to a pillar six location on the DSN addressing pinwheel when the transforming includes offsetting the pillar number by five.

As an alternative specific example of generating DSN addresses, the first data portion module 616 performs yet another deterministic function on the first unique source name to generate the set of DSN addresses. For instance, the first data portion module 616 performs a hashing function on the first unique source name to produce a source name of the set of DSN addresses. In another instance, the first data portion module 616 performs a mask generating function on the pillar number and the first unique source name of the preliminary DSN address to produce a corresponding slice index field value and common source name of the set of DSN addresses. As another alternative specific example of generating DSN addresses, the first data portion module 616 performs a mathematical function (e.g., add, subtract, divide, multiply, etc.) on the first unique source name to generate the set of DSN addresses. For instance, the first data portion module 616 multiplies the first unique source name by two to produce the slice index field value and the common source name of the set of DSN addresses. As yet another alternative specific example, the first data portion module 616 performs a logical function (e.g., exclusive OR, OR, AND, NAND) on the first unique source name to generate the set of DSN addresses. For instance, the first data portion module 616 applies the exclusive OR function to a combination of the first unique source name and the pillar number with a transformation template value (e.g., a predetermined constant) to produce the set of DSN addresses.

Having generated the one or more sets of DSN addresses, the first data portion module 616 identifies the DST execution unit set 1 (e.g., the first set of storage units of the DSN 612) based on the one or more sets of DSN addresses. A storage unit of the first set of storage units has an assigned DSN address range in which a corresponding DSN address of one of the one or more sets of DSN addresses falls. As a specific example, the first data portion module 616 accesses a DSN address-to-physical location table to identify each DST execution unit 36 based on a corresponding DSN address. As another specific example, the first data portion module 616 identifies a mapping of the DSN addressing pinwheel to DST execution units 36. For instance, the first data portion module 616 identifies a sixth DST execution unit 36 associated with a sixth pillar when the DSN addresses associated with the six pillar of eight pillars on the DSN addressing pinwheel. Having identified the first set of storage units, the first data portion module sends the one or more sets of encoded data slices 624 to the first set of storage units in accordance with the one or more sets of DSN addresses.

In an example of processing a second data portion of the plurality of data portions 1-3, etc., when each data portion includes the single data segment or the plurality of data segments, the second data portion module 618, for the second data portion assigns a second unique source name to the second data portion (e.g., unique source name per data portion). For instance, the second data portion module 618 generates the second unique source name based on the name of the data file. At least one of the encoding module 614, the first data portion module 616, and the second data portion module 618 links the first and second unique source names to the name of the data file in at least one of a directory and a dispersed hierarchical index.

Having assigned the second unique source name to the second data portion, the second data portion module 618 dispersed storage error encodes the second data portion to produce a second one or more sets of encoded data slices 626. A threshold number of encoded data slices for each of the second one or more sets of encoded data slices are required to be retrieved to recover the second data portion. The second data module 618 generates a second one or more sets of DSN addresses for the second one or more sets of encoded data slices 626 based on the second unique source name. Since the first unique source name and second unique source name are different, unauthorized acquisition of a DSN address of the one or more sets of DSN addresses yields substantially no information regarding a DSN address of the second one or more sets of DSN addresses. Having generated the second one or more sets of DSN addresses, the second data module 618 identifies the DST execution unit set 2 (e.g., a second set of storage units of the DSN 612) based on the second one or more sets of DSN addresses, where a storage unit of the second set of storage units has an assigned DSN address range in which a corresponding DSN address of the second one of the one or more sets of DSN addresses falls. Having identified the second set of storage units, the second data portion module 618 sends the second one or more sets of encoded data slices to the second set of storage units.

In an example of processing a third data portion of the plurality of data portions 1-3, etc., when each data portion includes the single data segment or the plurality of data segments, the third data portion module 620, for the third data portion, assigns a third unique source name to the third data portion. The third data portion module 620 dispersed storage error encodes the third data portion to produce a third one or more sets of encoded data slices 628. To recover the third data portion, a threshold number of encoded data slices for each of the third one or more sets of encoded data slices 628 are required to be retrieved. Having encoded the third data portion, the third data portion module 620 generates a third one or more sets of DSN addresses for the third one or more sets of encoded data slices 628 based on the third unique source name. The third data portion module 620 identifies the DST execution unit set 3 (e.g., a third set of storage units of the DSN 612) based on the third one or more sets of DSN addresses, where a storage unit of the third set of storage units has an assigned address range in which a corresponding DSN address of the third one of the one or more sets of DSN addresses falls. Having identified the third set of storage units, the third data portion module 620 sends the third one or more sets of encoded data slices 628 to the third set of storage units.

In another example of processing the third data portion of the plurality of data portions, when each data portion includes the single data segment or the plurality of data segments, the third data portion module 620, for the third data portion assigns the first unique source name to the third data portion. The third data portion module 620 dispersed storage error encodes the third data portion to produce the third one or more sets of encoded data slices 628, where to recover the third data portion, a threshold number of encoded data slices for each of the third one or more sets of encoded data slices 628 are required to be retrieved. Having encoded the third data portion, the third data portion module 620 generates the third one or more sets of DSN addresses for the third one or more sets of encoded data slices 628 based on the first unique source name. The third data portion module 620 sends the third one or more sets of encoded data slices 628 to the first set of storage units in accordance with the third one or more sets of DSN addresses.

Alternatively, each data portion may only include the plurality of data segments. In an example of processing the first data portion, when each data portion includes only the plurality of data segments, the first data portion module 616 divides the first data portion into the plurality of data segments. For instance, the first data portion module 616 divides the first data portion into twenty 1 MB data segments when a desired data segment size is 1 MB and the first data portion is 20 MB. For a first data segment of the plurality of data segments, the first data portion module 616 assigns the first unique source name to the first data segment. The first data portion module 616 dispersed storage error encodes the first data segment to produce a first set of encoded data slices 630 of the one or more sets of encoded data slices. Having encoded the first data segment, the first data portion module 616 generates a first set of DSN addresses of the one or more sets of DSN addresses for the first set of encoded data slices 630 based on the first unique source name, where a DSN address of the first set of DSN addresses falls within the assigned address range of the storage unit of the first set of storage units. The first data portion module 616 sends the first set of encoded data slices 630 to the first set of storage units (e.g., DST execution unit set 1) in accordance with the first sets of DSN addresses.

For a second data segment of the plurality of data segments, the first data portion module 616 assigns the first unique source name to the second data segment and dispersed storage error encodes the second data segment to produce a second set of encoded data slices 632 of the one or more sets of encoded data slices. The first data portion module 616 generates a second set of DSN addresses of the one or more sets of DSN addresses for the second set of encoded data slices based on the first unique source name, where a DSN address of the second set of DSN addresses falls within the assigned address range of the storage unit of the first set of storage units. Having generated the second set of DSN addresses, the first data portion module 616 sends the second set of encoded data slices to the first set of storage units in accordance with the second sets of DSN addresses.

In another example of processing the first data portion, when each data portion includes only the plurality of data segments, the first data portion module 616, for the first data portion, encodes the first data portion into a plurality of encoded data segments, where at least a threshold number of encoded data segments of the plurality of encoded data segments are required to reconstruct the first data portion. The encoding includes at least one of a dispersed storage encoding and a shared secret function encoding (e.g., Shamir). Having encoded the first data portion, the first data portion module 616 dispersed storage error encodes the plurality of encoded data segments to produce a plurality of sets of encoded data slices 634. For instance, for each data segment, the first data portion module 616 dispersed storage encodes the data segment to produce a corresponding set of encoded data slices of the plurality of sets of encoded data slices 634. Having encoded the plurality of encoded data segments, the first data portion module 616 generates a plurality of sets of DSN addresses for the plurality of sets of encoded data slices 634 based on the first unique source name. The first data portion module 616 sends the plurality of sets of encoded data slices 634 to the first set of storage units (e.g., DST execution unit set 1) in accordance with the plurality of sets of DSN addresses.

Alternatively, each data portion may only include the single data segment. In an example of processing the first data portion, when each data portion includes only the single data segment, the first data portion module 616, for the first data portion, dispersed storage error encodes the first data portion to produce the first set of encoded data slices 630, where, to recover the first data portion, a threshold number of encoded data slices of the first set of encoded data slices 630 are required to be retrieved. The first data portion module 616 generates a first set of DSN addresses for the first set of encoded data slices 630 based on the first unique source name. The first data portion module 616 sends the first set of encoded data slices to the first set of storage units in accordance with the first set of DSN addresses.

In an example of processing the second data portion, when each data portion includes only the single data segment, the second data portion module 618, for the second data portion, dispersed storage error encodes the second data portion to produce the second set of encoded data slices 632, where, to recover the second data portion, a threshold number of encoded data slices of the second set of encoded data slices 632 are required to be retrieved. The first data portion module 616 generates a second set of DSN addresses for the second set of encoded data slices 632 based on the second unique source name. The first data portion module 616 sends the second set of encoded data slices 632 to the second set of storage units in accordance with the second set of DSN addresses.

FIGS. 48G, H, and I are flowcharts illustrating another example of storing data, where a data file is stored in a dispersed storage network (DSN) in a manner to increase difficulty in hacking the data file. The method begins at step 640 where a processing module (e.g., of the DST processing unit 16 of FIG. 1) encodes the data file into a plurality of data portions, where a threshold number of the data portions are required to reconstruct the data file. The threshold number may include any number from one to all data portions. For example, the processing module divides the data file into the plurality of data portions. As another example, the processing module encrypts the data file in accordance with a key to produce an encrypted data file and divides the encrypted data file into the plurality of data portions. As yet another example, the processing module encrypts the data file in accordance with the key to produce the encrypted data file, combines a representation of the key (e.g., an obfuscated key, a masked key, an encrypted key, the key itself) with encrypted data file to produce a combined data file, and divides the combined data file into the plurality of data portions. As a still further example, the processing module dispersed storage error encodes the data file to produce the plurality of data portions. As yet a still further example, the processing module performs a secret sharing function (e.g., Shamir) on the data file to produce the plurality of data portions.

The data portions may be processed using a variety of approaches. In one approach, each data portion is encoded to produce one or more sets of encoded data slices. In another approach, a plurality of data segments are produced from the data portions for further processing. The method branches to starting point "A" of FIG. 48I when the plurality of data segments are to be produced. The method continues to step 642 when data portions are to be encoded to produce the one or more sets of encoded data slices.

When the data portions are to be encoded to produce the one or more sets of encoded data slices, the method continues at step 642 where the processing module assigns a first unique source name to a first data portion. The processing module may generate the first unique source name based on a name of the data file (e.g., performing a deterministic function on the name). Each data portion may be encoded to produce a single set of encoded data slices. The method branches to step 652 when the first data portion is to be encoded to produce the single set of encoded data slices. The method continues to step 644 when the first data portion is to be encoded to produce the one or more sets of encoded data slices.

When the first data portion is to be encoded to produce the one or more sets of encoded data slices, the method continues at step 644 where the processing module dispersed storage error encodes the first data portion to produce the one or more sets of encoded data slices. A threshold number of encoded data slices for each of the one or more sets of encoded data slices are required to be retrieved to recover the first data portion. The method continues at step 646 where the processing module generates one or more sets of DSN addresses for the one or more sets of encoded data slices based on the first unique source name. For example, the processing module generates a set of DSN addresses of the one or more sets of DSN addresses by utilizing an addressing pinwheel to generate the set of DSN addresses based on the first unique source name (e.g., mapping a preliminary addressing pinwheel to the DSN addressing pinwheel). As another example, the processing module performs a deterministic function on the first unique source name to generate the set of DSN addresses. As yet another example, the processing module performs a mathematical function on the first unique source name to generate the set of DSN addresses. As a further example, the processing module performs a logical function on the first unique source name to generate the set of DSN addresses.

The method continues at step 648 where the processing module identifies a first set of storage units of the DSN based on the one or more sets of DSN addresses. A storage unit of the first set of storage units has an assigned DSN address range in which a corresponding DSN address of one of the one or more sets of DSN addresses falls. For instance, the processing module identifies the assigned DSN address range for the corresponding DSN address and identifies the storage unit associated with the assigned DSN address range (e.g., a table lookup, issuing a query, receiving a query response). The method continues at step 650 where the processing module sends the one or more sets of encoded data slices to the first set of storage units in accordance with the one or more sets of DSN addresses. For instance, the processing module generates a set of write slice requests that includes the set of encoded data slices and a set of slice names corresponding to a single set of DSN addresses, and outputs the set of write slice requests to the first set of storage units. The method branches to step 658.

When the first data portion is to be encoded to produce the single set of encoded data slices, the method continues at step 652 where the processing module dispersed storage error encodes the first data portion to produce a first set of encoded data slices, where to recover the first data portion, a threshold number of encoded data slices of the first set of encoded data slices are required to be retrieved. The method continues at step 654 where the processing module generates a first set of DSN addresses for the first set of encoded data slices based on the first unique source name. The method continues at step 656 where the processing module sends the first set of encoded data slices to the first set of storage units in accordance with the first set of DSN addresses.

The method continues at step 658 where the processing module, for a second data portion of the plurality of data portions, assigns a second unique source name to the second data portion. For example, the processing module generates the second unique source name based on the name of the data file (e.g., performing a deterministic function on the name). The method continues at step 660 where the processing module links the first and second unique source names to a name of the data file within at least one of a file directory and a dispersed hierarchical index.

A second data portion may be encoded to produce a second single set of encoded data slices. The method branches to step 670 when the second data portion is to be encoded to produce the second single set of encoded data slices. The method continues to step 662 when the second data portion is to be encoded to produce a second one or more sets of encoded data slices.

When the second data portion is to be encoded to produce the second one or more sets of encoded data slices, the method continues at step 662 where the processing module dispersed storage error encodes the second data portion to produce the second one or more sets of encoded data slices, where to recover the second data portion, a threshold number of encoded data slices for each of the second one or more sets of encoded data slices are required to be retrieved. The method continues at step 664 where the processing module generates a second one or more sets of DSN addresses for the second one or more sets of encoded data slices based on the second unique source name. The method continues at step 666 where the processing module identifies a second set of storage units of the DSN based on the second one or more sets of DSN addresses. A storage unit of the second set of storage units has an assigned address range in which a corresponding DSN address of the second one of the one or more sets of DSN addresses falls. The method continues at step 668 where the processing module sends the second one or more sets of encoded data slices to the second set of storage units in accordance with the second one or more sets of DSN addresses. As such, unauthorized acquisition of a DSN address of the one or more sets of DSN addresses yields substantially no information regarding a DSN address of the second one or more sets of DSN addresses. The method branches to entry point "B" of FIG. 48H when processing a third data portion.

When the second data portion is to be encoded to produce the second single set of encoded data slices, the method continues at step 670 where the processing module dispersed storage error encodes the second data portion to produce a second set of encoded data slices, where to recover the second data portion, a threshold number of encoded data slices of the second set of encoded data slices are required to be retrieved. The method continues at step 672 where the processing module generates a second set of DSN addresses for the second set of encoded data slices based on the second unique source name. The method continues at step 674 where the processing module sends the second set of encoded data slices to the second set of storage units in accordance with the second set of DSN addresses. The method continues to entry point "B" of FIG. 48H when processing the third data portion.

Figure 48H:
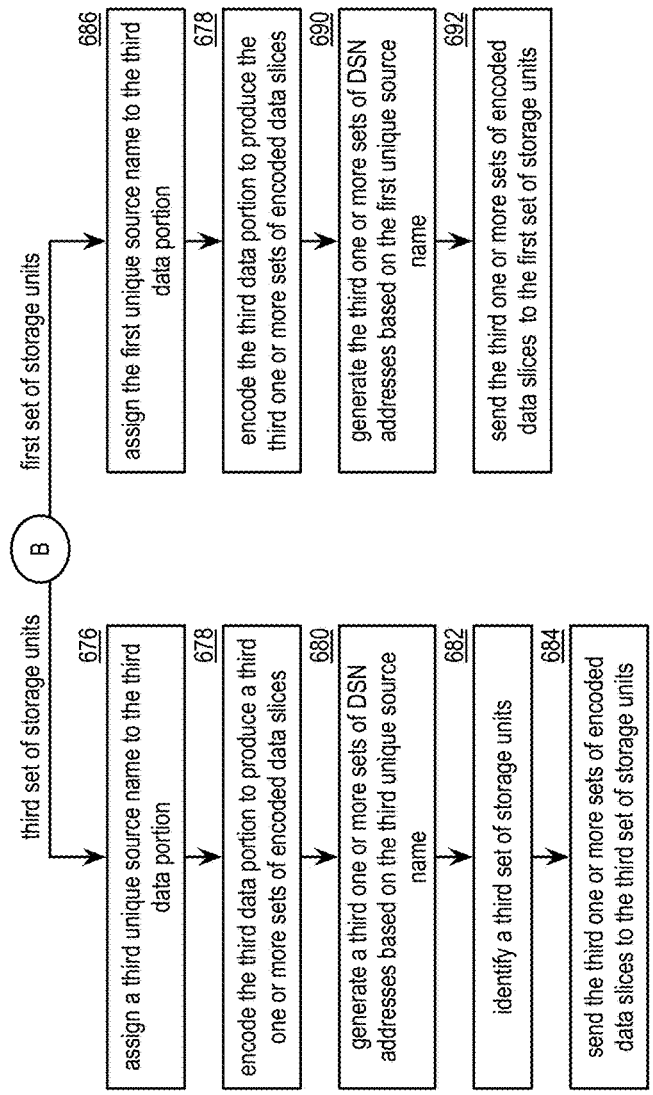

FIG. 48H is a flowchart illustrating an example of processing the third data portion of FIG. 48G. The processing of the third data portion may include utilizing the first set of storage units of FIG. 48G. The method begins at step 686 when the processing utilizes the first set of storage units.

Alternatively, the processing of the third data portion may include utilizing a third set of storage units. The method begins at step 676 when the processing utilizes the third set of storage units.

When the processing utilizes the third set of storage units, the method begins at step 676 where the processing module of FIG. 48G, for the third data portion of the plurality data portions, assigns a third unique source name to the third data portion. The method continues at step 678 where the processing module dispersed storage error encodes the third data portion to produce a third one or more sets of encoded data slices. To recover the third data portion, a threshold number of encoded data slices for each of the third one or more sets of encoded data slices are required to be retrieved. The method continues at step 680 where the processing module generates a third one or more sets of DSN addresses for the third one or more sets of encoded data slices based on the third unique source name. The method continues at step 682 where the processing module identifies the third set of storage units of the DSN based on the third one or more sets of DSN addresses. A storage unit of the third set of storage units has an assigned address range in which a corresponding DSN address of the third one of the one or more sets of DSN addresses falls. The method continues at step 684 where the processing module sends the third one or more sets of encoded data slices to the third set of storage units in accordance with the third one or more sets of DSN addresses.

When the processing utilizes the first set of storage units, the method begins at step 686 where the processing module, for the third data portion of the plurality of data portions, assigns the first unique source name to the third data portion. The method continues at step 678 where the processing module dispersed storage error encodes the third data portion to produce the third one or more sets of encoded data slices. The method continues at step 690 where the processing module generates the third one or more sets of DSN addresses for the third one or more sets of encoded data slices based on the first unique source name. The method continues at step 692 where the processing module sends the third one or more sets of encoded data slices to the first set of storage units in accordance with the third one or more sets of DSN addresses.

Figure 48I:
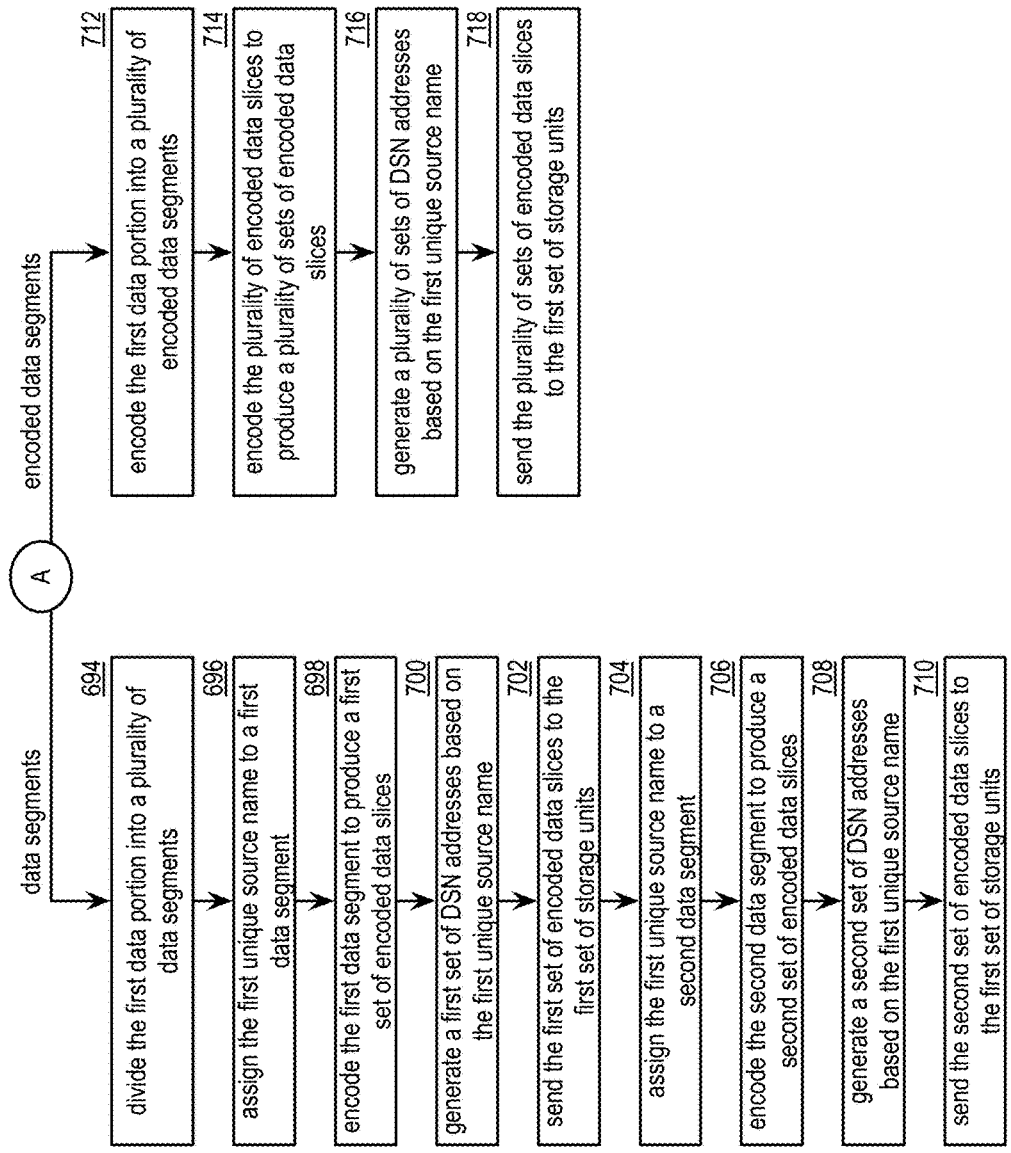

FIG. 48I is a flowchart illustrating an example of processing the data portions to produce the plurality of data segments of FIG. 48G. The processing of the data portions may produce encoded data segments. The method begins at step 712 when the processing of the data portions produces encoded data segments. Alternatively, the processing of the data portions may produce data segments. The method begins at step 694 when the processing of the data portions produces the data segments.

When the processing of the data portions produces the data segments, the method begins at step 694 where the processing module of FIG. 48G divides the first data portion into the plurality of data segments. The method continues at step 696 where, for a first data segment of the plurality of data segments, the processing module assigns the first unique source name to the first data segment. The method continues at step 698 where the processing module dispersed storage error encodes the first data segment to produce a first set of encoded data slices of the one or more sets of encoded data slices. The method continues at step 700 where the processing module generates a first set of DSN addresses of the one or more sets of DSN addresses for the first set of encoded data slices based on the first unique source name. A DSN address of the first set of DSN addresses falls within the assigned address range of the storage unit of the first set of storage units. The method continues at step 702 where the processing module sends the first set of encoded data slices to the first set of storage units in accordance with the first sets of DSN addresses.

The method continues at step 704 where the processing module, for a second data segment of the plurality of data segments, assigns the first unique source name to the second data segment. The method continues at step 706 where the processing module dispersed storage error encodes the second data segment to produce a second set of encoded data slices of the one or more sets of encoded data slices. The method continues at step 708 where the processing module generates a second set of DSN addresses of the one or more sets of DSN addresses for the second set of encoded data slices based on the first unique source name. A DSN address of the second set of DSN addresses falls within the assigned address range of the storage unit of the first set of storage units. The method continues at step 710 where the processing module sends the second set of encoded data slices to the first set of storage units in accordance with the second sets of DSN addresses.

When the processing of the data portions produces the encoded data segments, the method begins at step 712 where the processing module, for the first data portion, encodes the first data portion into the plurality of encoded data segments (e.g., dispersed storage encoding, secret sharing function encoding), where at least a threshold number of encoded data segments of the plurality of encoded data segments are required to reconstruct the first data portion. The method continues at step 714 where the processing module dispersed storage error encodes the plurality of encoded data segments to produce a plurality of sets of encoded data slices. The method continues at step 716 where the processing module generates a plurality of sets of DSN addresses for the plurality of sets of encoded data slices based on the first unique source name. The method continues at step 718 where the processing module sends the plurality of sets of encoded data slices to the first set of storage units in accordance with the plurality of sets of DSN addresses.

FIG. 49A is a schematic block diagram of another embodiment of a distributed computing system that includes a plurality of user devices 14, a distributed storage and task (DST) processing unit 16, and a distributed storage and task network (DSTN) module 22. The DST processing unit 16 includes a DST client module 34 and a pre-fetch segment memory 720. The system functions to retrieve data 728 from the DSTN module 22 for one or more of the user devices 14 in response to one or more limited data request requests 722. A limited data request 722 includes one or more of a requesting entity identifier (ID), a data ID, a portion ID, a limited retrieval opcode, and a maximum number of bytes per retrieval indicator.

A user device 14 outputs the limited data request 722 to the DST processing unit 16 to retrieve at least a portion of data 728. The DST client module 34 determines a number of data segments associated with the data 728 to retrieve from the DSTN module 22 in a first retrieval sequence. The determining may be based on one or more of a pre-fetch profile associated with the user device (e.g., a historical record indicating an average portion size for retrieval), a communication latency level associated with the DSTN module 22, a communication bandwidth level associated with the DSTN module 22, a DST processing unit resource availability level, a communication latency level to the user device 14, and a communication bandwidth level associated with the user device 14. The DST client module 34 generates data slice request sets 724 corresponding to the number of data segments for retrieval. For each data segment, the generating includes generating a set of read slice requests and outputting the set of read slice requests to the DSTN module 22. The DST client module 34 receives a set of data slices 726 for each data segment of the number of data segments for retrieval. For each received set of data slices 726, the DST client module 34 decodes the set of data slices 726 utilizing a dispersed storage error coding function to produce the data segment.

The DST client module 34 stores each decoded data segment of the number of data segments for retrieval in the pre-fetch segment memory 720. The DST client module 34 facilitates sending one or more data segments of the number of data segments for retrieval to the user device 14 as the portion of the data 728. For example, the DST client module 34 retrieves a first data segment from the pre-fetch segment memory 720 and outputs the first data segment as the portion of the data 728 to the user device 14.

The DST client module 34 suspends the sending to the user device 14 when receiving a stop sending request from the user device 14. When no stop sending request is received from the user device 14 and each data segment of the plurality of data segments of the data has not been retrieved from the DSTN module 22, the DST client module 34 initiates another retrieval sequence beginning with determining a second number of data segments associated with the data 728 to retrieve from the DSTN module 22 in the second retrieval sequence. Alternatively, the DST client module 34 initiates the other retrieval sequence when receiving a next limited data request 722 from the user device 14. The process may continue until each data segment of the plurality of data segments has been retrieved and sent to the user device 14. A method of operation of the system is described in greater detail preference to FIG. 49B.

FIG. 49B is a flowchart illustrating another example of retrieving data. The method begins at step 730 where a processing module (e.g., of a distributed storage and task (DST) client module) receives a limited data request from a requesting entity (e.g., a user device). The method continues at step 732 where the processing module determines a pre-fetch number of data segments for retrieval. The determining may include identifying a data segment to start with based on a last retrieved data segment identifier. For example, the processing module identifies an 11th data segment for retrieval when a last retrieved data segment was data segment 10 of a previous pre-fetch number of data segments retrieved that includes data segments 1-10.

The method continues at step 734 where the processing module facilitates retrieval of the pre-fetch number of data segments from a distributed storage and task network (DSTN) module. For each data segment, the facilitating includes generating a set of read slice requests, outputting the set of read slice request to the DSTN module, receiving a set of slices, and decoding the set of slices utilizing a dispersed storage error coding function to reproduce the data segment. While retrieving the pre-fetch number of data segments from the DSTN module, the processing module may suspend retrieving the data segments when receiving a request to stop retrieving from the requesting entity.

The method continues at step 736 where the processing module temporarily stores the pre-fetch number of data segments in a pre-fetch segment memory. The method continues at step 738 where the processing module outputs the pre-fetch number of data segments to the requesting entity. The processing module may output the pre-fetch number of data segments to the requesting entity at a transmission rate compatible with connectivity to the requesting entity. The outputting includes retrieving the pre-fetch number of data segments from the pre-fetch segment memory and sending the pre-fetch number of data segments to the requesting entity. Alternatively, the processing module suspends outputting the pre-fetch number of data segments to the requesting entity when receiving the request to stop retrieving from the requesting entity.

FIG. 50A is a schematic block diagram of another embodiment of a distributed computing system that includes a distributed storage and task (DST) processing unit 16 and a DST execution unit 36. The DST processing unit 16 includes a DST client module 34 and a plurality of interfaces 32. The DST execution in 36 includes another plurality of interfaces 32 associated with the plurality of interfaces 32 of the DST processing unit 16, a DST client module 34, and a slice memory 88. The other plurality of interfaces 32 enables communication of slices 742 between the DST processing unit 16 and the DST execution unit 36 via a plurality of communication paths and/or communication networks. For example, a wireless network may be utilized to provide connectivity between a first interface 32 of the DST processing and 16 and an associated first interface 32 of the DST execution unit 36. As another example, a wireline router network may be utilized to provide connectivity between a second interface 32 of the DST processing and 16 and an associated second interface 32 of the DST execution unit 36.

Each communication path of the plurality of communication paths may be associated with a performance level of a plurality of performance levels (e.g., latency, jitter, error rate, bandwidth, etc.). One or more of the DST client modules 34 establishes two or more communication paths between the DST processing unit 16 and the DST execution unit 36. The one or more of the DST client modules 34 obtains performance information with regards to each of the two or more communication paths. When communication of a first slice 742 is required between the DST processing unit 16 in the DST execution unit 36, the one or more DST client modules 34 selects at least one connection of the two or more connections to support communication of the first slice 742 based on the performance information. The one or more DST client modules 34 facilitates utilization of the at least one connection to support communication of the first slice 742. A method of operation of the system is described in greater detail with reference to FIG. 50B.

FIG. 50B is a flowchart illustrating an example of establishing communications. The method begins at step 744 where a processing module (e.g., of a distributed storage and task (DST) client module) establishes two or more connections to a DST execution unit. The establishing includes identifying one or more of potential access interfaces, one or more networks, and invoking the two or more connections utilizing the identified access interfaces and the one or more networks. The method continues at step 746 where the processing module obtains performance information with regards to each of the two or more connections. The obtaining includes one or more of initiating a query, performing a task, accessing a historical performance record, receiving the performance information, and retrieving the performance information.

The method continues at step 748 where the processing module determines to access the DST execution unit. The determining may be based on one or more of receiving an access request, detecting and access condition, determining to rebuild a slice, and generating an access request. The method continues at step 750 where the processing module selects at least one connection of the two or more connections to support accessing the DST execution unit. The selecting may be based on one or more of an access type, the performance information, and an access performance requirement. For example, the processing module selects a fourth connection associated with higher than average latency to write slices. As another example, the processing module selects a seventh connection associated with lower than average latency to read slices and list slices. The method continues at step 752 where the processing module facilitates utilization of the at least one connection to access the DST execution unit. The facilitating includes sending one or more access messages associated with accessing the DST execution unit via the at least one connection.

FIG. 51A is a diagram illustrating an example of ingesting a large data file 760 into a dispersed storage network (DSN). The example includes the large data file 760, the network 24, and the distributed storage and/or task network (DSTN) module 22 of FIG. 1. The DSTN module 22 includes a plurality of storage units which may be the DST execution units 36 of FIG. 1. In an ingesting example, the large data file 760 is received over time for storage in the DSN. The initial dispersed storage error encoding parameters are determined for storing the large data file 760. The initial dispersed storage error encoding parameters indicate an error coding number and a decode threshold number. The error coding number indicates a number of encoded data slices that results when a data segment 762 of the large data file 760 is encoded using a dispersed storage error encoding function and the decode threshold number indicates a minimum number of the encoded data slices that are needed to recover the data segment 762.

Data segments 762 are generated (e.g., dividing, encoded) for each of a series of n data portions during a corresponding series of n time intervals. For example, data segments 762 are generated for a first data portion during a first time interval, more data segments 762 are generated for a second data portion during a second time interval, etc. The time intervals may be of a same or different durations. The time intervals may be established based on at least one of a predetermination, a user input, a registry record lookup, and performance of the ingesting.

A first plurality of data segments 762 of a first portion of the large data file 760 are encoded using the dispersed storage error encoding function and during the first time interval of receiving the large data file 760, using the initial dispersed storage error encoding parameters to produce a first plurality of sets of encoded data slices 766. A write data request 764 is sent to the DSTN module 22 to write, during the first time interval, the first plurality of sets of encoded data slices 766 to the storage units of the DSN. The processing of the writing the first plurality of sets of encoded data slices 766 is monitored to produce first write processing performance information (e.g., based on how many of the slices 766 are successfully written within desired time frames). When the first write processing performance information compares unfavorably to a desired write performance range (e.g., a predetermined range), for the second time interval of receiving the large data file 760, at least one of the error coding number and the decode threshold number is adjusted to produce adjusted dispersed storage error encoding parameters. As a specific example, the error coding number may be raised to improve reliability performance.

With the data segment 762 of the first data portion stored in the DSTN module 22, a second plurality of data segments 762 of the second portion of the large data file 760 are encoded during the second time interval using the dispersed storage error encoding function and using the adjusted dispersed storage error encoding parameters to produce a second plurality of sets of encoded data slices 766. Another right data request 764 sent to the DSTN module 22 to write, during the second time interval, the second plurality of sets of encoded data slices 766 to the storage units of the DSN.

FIG. 51B is a diagram illustrating an example of encoding a data segment 762 into a set of data blocks D1-Dn. The set of data blocks provides a representation of the data segment 762. For example, the data segment is divided into n equal portions to form data blocks D1-Dn. As another example, the data segment is divided into as many portions as required when a fixed data portion sizes utilized.

FIG. 51C is a diagram illustrating an example of matrix multiplication of an encoding matrix (E) and a data matrix (D) to produce a coded matrix (C). In an example of a Reed Solomon encoding function, the matrix multiplication is utilized to encode a data segment to produce a set of data blocks as a representation of the data segment. The Reed Solomon encoding function is associated with an error coding number and a decode threshold number. As a specific example, the encoding matrix includes the error coding number 770 number of Y rows and the decode threshold number 768 number of X columns. Accordingly, the encoding matrix includes Y rows of X coefficients. The data segment is arranged into the data matrix having X rows of Z number of data words. The data matrix is matrix multiplied by the encoding matrix to produce the coded matrix, which includes Y rows of Z number of encoded values.

The encoding function may utilize a variety of encoding approaches to facilitate dispersed storage error encoding of data. The encoding function includes, but not limited to, at least one of the Reed Solomon encoding, an information dispersal algorithm, on-line codes, forward error correction, erasure codes, convolution encoding, Trellis encoding, Golay, Multidimensional parity, Hamming, Bose Ray Chauduri Hocquenghem (BCH), and/or Cauchy-Reed-Solomon.

FIG. 51D is a diagram illustrating an example of matrix multiplication of an encoding matrix (E) and a data matrix (D) to produce a coded matrix (C) using initial dispersed storage error encoding parameters. In an example of a dispersed storage error encoding utilizing a Reed Solomon encoding function, the matrix multiplication is utilized to encode a data segment represented as the data matrix (D) using the encoding matrix (E) to produce a set of data blocks of the coded matrix (C) as a representation of the data segment. The Reed Solomon encoding function is associated with the initial dispersed storage error encoding parameters that includes an error coding number of five and a decode threshold number of three.

As a specific example, the encoding matrix (E) includes five rows of three coefficients (e.g., a-o). The data segment is divided into data blocks which are arranged into the data matrix (D) having 3 rows of 4 data blocks when the number of data blocks is 12. The number of rows of the data matrix matches the number of columns of the encoding matrix (e.g., the decode threshold number). The number of columns of the data matrix increases as the number of data blocks of the data segment increases. The data matrix is matrix multiplied by the encoding matrix to produce the coded matrix, which includes 5 rows of 4 encoded values (e.g., X11-X14, X21-X24, X31-X34, X41-X44, and X51-X54). The number of rows of the coded matrix matches the number of rows of the encoding matrix (e.g., the error coding number). For instance, X11=aD1+bD5+cD9; X12=aD2+bD6+cD10; X21=dD1+eD5+fD9; X23=dD3+eD7+fD11; X31=gD1+hD5+iD9; X34=gD4+hD8+iD12; and X54=mD4+nD8+oD12.

FIG. 51E is a diagram illustrating an example of generating a set of encoded data slices from a coded matrix (C). The coded matrix illustrates the coded matrix (C) of FIG. 51D. A number of rows of the coded matrix is equivalent to an error coding number (e.g., which may also be referred to as width, a pillar width, n). A number of columns of the coded matrix is equivalent to a number of columns of a data matrix and is dependent on a number of data blocks of the data matrix (e.g., dependent on a size of a data segment that is utilized to form the data matrix).

One or more coded values from each row of the coded matrix are selected to form a corresponding encoded data slice. Accordingly, an error coding number of encoded data slices are produced from the coded matrix. For example, coded values X11-X14 are selected to produce an encoded data slice 1, coded values X21-X24 are selected to produce an encoded data slice 2, coded values X31-X34 are selected to produce an encoded data slice 3, coded values X41-X44 are selected to produce an encoded data slice 4, and coded values X51-X54 are selected to produce an encoded data slice 5.

The data matrix (e.g., the data segment) may be recovered when any decode threshold number of encoded data slices are available of the set of encoded data slices. A number of combinations of the decode threshold number of encoded data slices of the set of encoded data slices may be expressed as error coding number choose the decode threshold number. For example, the number of combinations is 10 which can be expressed as 5 choose 3 when the error coding number is 5 and the decode threshold number 3. As a recovery example, the data segment is recoverable when encoded data slices 1-3 are available. As another recovery example, the data segment is recoverable when encoded data slices 3-5 are available. As yet another recovery example, the data segment is recoverable when encoded data slices 1, 3, and 5 are available.

Reliability of the recovery may be improved by adjusting initial dispersed storage error encoding parameters to produce adjusted dispersed storage error encoding parameters to encode a subsequent data segment. For example, the reliability recovery may be improved when more encoded data slices are available as compared to a number of encoded data slices available utilizing the initial dispersed storage error encoding parameters (e.g., a larger error coding number without changing the decode threshold number). As a specific example, the number of combinations is 20 which can be expressed as 6 choose 3 when the error coding number is increased to 6 from 5 and the decode threshold remains at 3. As such, twice as many encoded data slices may be available for utilization of a decode threshold number of encoded data slices to recover the subsequent data segment.

FIG. 51F is a diagram illustrating an example of matrix multiplication of an encoding matrix and a data matrix to produce a coded matrix using adjusted dispersed storage error encoding parameters. In an example of adjusting the initial dispersed storage error encoding parameters to produce adjusted dispersed storage error encoding parameters, a decode threshold number is maintained at 3 and an error coding number is increased to 6 from 5. For instance, the encoding matrix of the example of FIG. 51D is associated with the initial dispersed storage error encoding parameters and is modified in accordance with the adjusted dispersed storage error encoding parameters, where the encoding matrix (E) now includes an additional sixth row of 3 values (e.g., p, q, r). The encoding matrix (E) is matrix multiplied by the data matrix (D) to produce the coded matrix (C). The coded matrix includes the coded matrix of FIG. 51D (e.g., associated with the initial dispersed storage error encoding parameters) and an additional row of coded values X61-X64.

When coded values of the coded matrix have been stored as a set of encoded data slices, the matrix multiplication may be a simplified by matrix multiplying only the additional sixth row of the encoding matrix by the data matrix to produce the sixth row (e.g., additional row) of the coded matrix. For example, X61=pD1+qD5+rD9, X62=pD2+qD6+rD10, X63=pD3+qD7+rD11, and X64=pD4+qD8+rD12. Each additional row of the coded matrix may be utilized to form a corresponding additional encoded data slice. For example, coded values X61-X64 forms a sixth encoded data slice of the set of encoded data slices.

FIG. 51G is a timing diagram illustrating an example of adjusting dispersed storage error encoding parameters based on write processing performance information. The timing diagram tracks time 772 from right to left as time increases. Time traverses a plurality of time intervals (e.g., 1st time interval, 2nd time interval, etc.). The timing diagram illustrates a desired write performance range 774, write processing performance 776, and adjusted dispersed storage (DS) error encoding parameters 780 on a vertical scale. Write performance is associated with processing of writing a large data file to a dispersed storage network (DSN) using a dispersed storage error encoding parameters. The desired write performance range 774 represents a range from high to low of acceptable write processing performance 776. The write processing performance 776 represents actual performance level of the writing process utilizing the dispersed storage error encoding parameters. When the write processing performance 776 compares unfavorably to the desired write performance range 774, the dispersed storage error encoding parameters are adjusted to produce the adjusted DS error encoding parameters 780.

In an example of adjusting the error encoding parameters, at a beginning of the first time interval, a set of write requests are sent to a set of storage units, where the set of write requests includes a set of encoded data slices that were encoded using the initial DS error encoding parameters 778 (e.g., error coding encode number of 5, decode threshold number of 3). Write acknowledgments are received from at least some of the storage units. The write acknowledgments are monitored (e.g., number of acknowledgments, number of resending of write requests, number of storage failures, etc.) to create first write processing performance information. Alternatively, or in addition to, storage performance history regarding the storage units may be included in the first write processing performance information.

With the first write processing performance information created, the first write processing information is compared to the desired write performance range 774 to determine whether the comparison is unfavorable (e.g., unfavorable when too few write acknowledgments, too many write acknowledgments, write acknowledgment response time too long, write acknowledgment response time too short, too many write requests resends, etc.). For example, the write processing performance 776 is above the desired write performance range 774 near an end of the first time interval. The initial DS error encoding parameters 778 are adjusted when the comparison is unfavorable. For example, the error coding number is decreased and the decode threshold number is maintained when the unfavorable comparison indicates increased storage performance (e.g., above the desired write performance range 774). For instance, the decode threshold number of 3 is maintained at 3 and the error coding encode number of 5 is decreased to 4. Alternatively, or in addition to, when the comparison is unfavorable, a beginning of the second time interval may be established to correspond to when the first write processing performance information compares unfavorably to the desired write performance range 774. The adjusting of the DS error encoding parameters continues from time interval time interval. For example, an unfavorable comparison at the end of the second time interval produces an adjustment where the error coding encode number is increased from 4 to 5 and the decode threshold number of 3 is maintained when the comparison indicates decreased storage performance. As another example, an unfavorable comparison at the end of a third time interval produces an adjustment where the error coding encode number is increased from 5 to 6 and the decode threshold number of 3 is maintained when the comparison indicates further decreased storage performance. As yet another example, an unfavorable comparison at the end of a fourth time interval produces an adjustment where the error coding encode number is increased from 6 to 8 and the decode threshold number of 3 is increased to 4 when the comparison indicates still further decreased storage performance. As a still further example, an unfavorable comparison at the end of a fifth time interval produces an adjustment where the error coding encode number is decreased from 8 to 5 and the decode threshold number of 4 is decreased to 3 when the comparison indicates increased storage performance.

FIG. 51H is a diagram illustrating an example of normalizing dispersed storage error encoding parameters that includes a representation of a large data file as stored 782, a series of changes, and a resulting normalized storage of the large data file 784 based on applying the series of changes to the large data file is stored. The large data file as stored 782 represents a result of the storing the large data file utilizing adjusted dispersed storage error encoding parameters of FIG. 51G. For example, during a first time interval, a first data portion was encoded using an error coding encode number of 5 and a decode threshold number of 3 to produce a first plurality of sets of encoded data slices for storage in a dispersed storage network (DSN).

When the large data file is stored, a determination may be made whether to normalize the dispersed storage error encoding parameters associated with each of the data portions (e.g., each of the pluralities of sets of encoded data slices). The determination may be based on one or more of analyzing history of read performance, detection of expiration of a time frame since the large data file was stored, and receiving a request. For example, the dispersed storage error encoding parameters are to be normalized when a one-week since storage time frame has expired and the history of read performance over a previous one-week time period indicates favorable read performance.

When the dispersed storage error encoding parameters are to be normalized, the dispersed storage error encoding parameters associated with storage of a corresponding plurality of sets of encoded data slices for each of the time intervals is normalized to produce normalized dispersed storage error encoding parameters. The normalized dispersed storage error encoding parameters may be determined based on one or more of a lookup, a request, receiving parameters, the history of read performance, a data type of the large data file, an owner of the large data file, and a data size of the large data file. For example, the normalized dispersed storage error encoding parameters are retrieved from registry information associated with the large data file (e.g., a vault lookup). For instance, an error coding number of 5 and a decode threshold number of 3 are utilized for the normalized dispersed storage error encoding parameters.

Having determined the normalized dispersed storage error encoding parameters, the changes are selected and applied to the data portions which may result in, for each data portion, no changes 786, adding a slice 788, removing a slice 790, and re-encoding 792 all of the slices of each set of encoded data slices. The no change 786 is selected and applied when the dispersed storage error encoding parameters are substantially the same as the normalized dispersed storage error encoding parameters. The add a redundancy slice 788 is selected and applied when the error coding number is increased. The remove a redundancy slice 790 is selected and applied when the error coding number is decreased. The re-encode 792 is selected and applied when the decode threshold number changes.

In an example of no change, encoded data slices and dispersed storage error encoding parameters associated with the first time interval, a third time interval, and the sixth time interval are not adjusted. As an example of add a redundancy slice 788, for the second time interval, the decode threshold number remains constant at 3 and the error coding number is increased to 5 from 4. The dispersed storage error encoding storage of the large data file is updated using the normalized dispersed storage error encoding parameters which includes the error coding number of 5 and the decode threshold number of 3. For instance, for each set of encoded data slices, a data segment is recovered and encoded using a modified encoding matrix (e.g., that includes an extra row) to produce an extra row of a coded matrix that forms an additional encoded data slice for storage in the DSN.

In an example of removing a redundancy slice 790, for the fourth time interval, the decode threshold number remains constant at 3 and the error coding number is decreased from 6 to 5. For instance, a sixth slice of a corresponding set of slices is deleted from the DSN. As an example of re-encode 792, for the fifth time interval, a data segment is recovered and re-encoded using another modified encoding matrix (e.g., that includes one less column and three fewer rows) to produce an updated coded matrix that forms an updated set of encoded data slices (e.g., 5 slices) for storage in the DSN.

FIG. 51I is a diagram illustrating an example of reading a large data file from a dispersed storage network (DSN). The example includes the large data file 760, the network 24, and the distributed storage and/or task network (DSTN) module 22 of FIG. 51A. In an example of reading, a data portion of the large data file 760 is read from the storage units (e.g., DST execution units 36) after the large data file 760 is stored as multiple pluralities of sets of encoded data slices. At least two of the pluralities of sets of encoded data slices were encoded using different dispersed storage error encoding parameters. As a specific example, for a data segment 762 of a first data portion, a set of read slice requests are sent to a set of storage units and slices 766 are provided as read data 794. Next, the set of slices 766 are dispersed storage error decoded using associated dispersed storage error encoding parameters to reproduce the data segment 762.

The reading of the encoded data slices is monitored to produce read processing performance information (e.g., number of storage units sending a read response, read response time, number of resends of a read request, a read response indicating a storage failure). When the read processing performance information compares unfavorably to a desired read performance range (e.g., a predetermined range), a determination is made to adjust the dispersed storage error encoding parameters for the set of encoded data slices. When the dispersed storage error encoding parameters for the set of encoded data slices are to be adjusted, the dispersed storage error encoding parameters are adjusted for the set of encoded data slices to produce read-based adjusted dispersed storage error encoding parameters and storage of the set of encoded data slices is updated in accordance with the read-based adjusted dispersed storage error encoding parameters (e.g., no change, remove a redundancy slice, add a redundancy slice, re-encode).

FIGS. 51J-K are timing diagrams illustrating examples of adjusting dispersed storage error encoding parameters based on read processing performance information. The timing diagrams illustrates time 772 increasing to the right as a one or more reads 796 are performed to recover portions of a large data file. FIG. 51J illustrates a plurality of read 796 while FIG. 51K illustrates one read 796. A vertical scale of the timing diagram illustrates a desired read performance range 798 and a read processing performance level 800.

In an example of reading, in a read request, a read large data file or portion thereof 796 is performed to read a portion of the large data file. Read performance is monitored during the reading when recovering a set of encoded data slices to produce the read processing performance 800. When the read processing performance 800 compares unfavorably to the desired read performance range 798 (e.g., increasing above the range, decreasing below the range, increasing at too fast a rate, decreasing at too fast a rate), dispersed storage error encoding parameters associated with the set of encoded data slices is adjusted to produce read-based adjusted dispersed storage error encoding parameters. Storage of the set of encoded data slices is updated in accordance with the read-based adjusted dispersed storage error encoding parameters.

FIG. 51J illustrates a specific example of adjusting the dispersed storage error encoding parameters, at an end of a first read process, where a determination is made to not change the dispersed storage error encoding parameters when the read processing performance 800 compares favorably to the desired read performance range 798. As another specific example, of adjusting the dispersed storage error encoding parameters, at an end of a second read process, a determination is made to adjust the dispersed storage error encoding parameters when the read processing performance 800 compares unfavorably to the desired read performance range 798 (e.g., the read processing performance 800 is decreasing at too fast of a rate). As yet another specific example, of adjusting the dispersed storage error encoding parameters, at an end of a third read process, a determination is made to adjust the dispersed storage error encoding parameters when the read processing performance 800 compares unfavorably to the desired read performance range 798 (e.g., the read processing performance 800 is still decreasing at too fast of a rate).

FIG. 51K illustrates a specific example of adjusting the dispersed storage error encoding parameters, at an end of a single read process, a determination is made to adjust the dispersed storage error encoding parameters when the read processing performance 800 compares unfavorably to the desired read performance range 798 (e.g., the read processing performance 800 is decreasing at too fast of a rate and has been below the desired read performance range 798 at least twice during the single reprocess).

FIGS. 51L-M are diagrams illustrating examples of changing dispersed storage error encoding parameters where that includes a representation of storage of a large data file, a series of changes, and resulting storage of the large data file. FIG. 51L illustrates an example where representation of storage of the large data file is a normalized storage of the large data file 784, the series of changes, and a resulting change encoding of large data file 802. The series of changes includes one or more of no change 786, remove a redundancy slice 790, add a redundancy slice 788, and re-encode 792 a set of encoded data slices. The normalized storage of the large data file 784 represents a result of normalizing a previously stored large data file to utilize normalize dispersed storage error encoding parameters as illustrated in FIG. 51H.

When the large data file is stored as the normalized storage of large data file 784, a determination may be made whether to change the dispersed storage error encoding parameters associated with each data portion (e.g., each of a plurality of sets of encoded data slices). The determination may be based on one or more of analyzing history of read performance, detection of expiration of a time frame since the large data file was stored, and receiving a request. For example, the large data file is read, read processing is monitored to produce read processing performance, and the determination is made to change the dispersed storage error encoding parameters based on the read processing performance.

When the dispersed storage error encoding parameters are to be changed, the dispersed storage error encoding parameters associated with storage of a corresponding plurality of sets of encoded data slices for each of the time intervals is changed to produce changed dispersed storage error encoding parameters. The changed dispersed storage error encoding parameters may be determined data portion by data portion for each time interval, based on one or more of a lookup, a request, receiving parameters, the history of read performance, the read processing performance, a data type of the large data file, an owner of the large data file, and a data size of the large data file. For example, the changed dispersed storage error encoding parameters are determined for a second data portion based on the read processing performance of the second data portion. For instance, an error coding number is changed from 5 to 4 and a decode threshold number of 3 is left unchanged when the change is to remove a redundancy slice 790.

Having determined the changed dispersed storage error encoding parameters, the changes are selected and applied to the data portions which may result in, for each data portion, the no changes 786, the adding a slice 788, the removing a slice 790, and the re-encoding 792 all of the slices of each set of encoded data slices. In an example of no change, encoded data slices and dispersed storage error encoding parameters associated with a first time interval, a third time interval, and a sixth time interval are not changed. As an example of add a redundancy slice 788, for a fourth time interval, the decode threshold number remains constant at 3 and the error coding number is increased from 5 from 6. The dispersed storage error encoding storage of the large data file is updated using the changed dispersed storage error encoding parameters which includes the error coding number of 6 and the decode threshold number of 3. For instance, for each set of encoded data slices, a data segment is recovered and encoded using a modified encoding matrix (e.g., that includes an extra row) to produce an extra row of a coded matrix that forms an additional encoded data slice for storage in a DSN.

In an example of removing a redundancy slice 790, for the second time interval, the decode threshold number remains constant at 3 and the error coding number is decreased from 5 to 4. For instance, a fifth slice of a corresponding set of slices is deleted from the DSN. As an example of re-encode 792, for a fifth time interval, a data segment is recovered and re-encoded using another modified encoding matrix (e.g., that includes one more column and three more rows) to produce an updated coded matrix that forms an updated set of encoded data slices (e.g., 8 slices) for storage in the DSN.

FIG. 51M illustrates an example where representation of storage of the large data file is a large data file is stored 782, the series of changes, and a resulting change encoding of large data file 804. The series of changes includes one or more of no change 786, remove a redundancy slice 790, add a redundancy slice 788, and re-encode 792 a set of encoded data slices. The large data file is stored 782 represents a result of initial storage of the large data file as illustrated in FIG. 51H.

When the large data file is stored as the large data file is stored 782, a determination may be made whether to change the dispersed storage error encoding parameters associated with each data portion (e.g., each of a plurality of sets of encoded data slices). The determination may be based on one or more of analyzing history of read performance, detection of expiration of a time frame since the large data file was stored, and receiving a request. For example, the large data file is read, read processing is monitored to produce read processing performance, and the determination is made to change the dispersed storage error encoding parameters based on the read processing performance.

When the dispersed storage error encoding parameters are to be changed, the dispersed storage error encoding parameters associated with storage of a corresponding plurality of sets of encoded data slices for each of the time intervals is changed to produce changed dispersed storage error encoding parameters. The changed dispersed storage error encoding parameters may be determined data portion by data portion for each time interval, based on one or more of a lookup, a request, receiving parameters, the history of read performance, the read processing performance, a data type of the large data file, an owner of the large data file, and a data size of the large data file. For example, the changed dispersed storage error encoding parameters are determined for a second data portion based on the read processing performance of the second data portion. For instance, an error coding number is changed from 4 to 5 and a decode threshold number of 3 is left unchanged when the change is to add a redundancy slice 788.

Having determined the changed dispersed storage error encoding parameters, the changes are selected and applied to the data portions which may result in, for each data portion, the no changes 786, the adding a slice 788, the removing a slice 790, and the re-encoding 792 all of the slices of each set of encoded data slices. In an example of no change, encoded data slices and dispersed storage error encoding parameters associated with a third time interval and a fifth time interval are not changed. As an example of add a redundancy slice 788, for the second time interval, the decode threshold number remains constant at 3 and the error coding number is increased from 4 from 5. The dispersed storage error encoding storage of the large data file is updated using the changed dispersed storage error encoding parameters which includes the error coding number of 5 and the decode threshold number of 3. For instance, for each set of encoded data slices, a data segment is recovered and encoded using a modified encoding matrix (e.g., that includes an extra row) to produce an extra row of a coded matrix that forms an additional encoded data slice for storage in a DSN. In an example of re-encode 792, for a fourth time interval, a data segment is recovered and re-encoded using another modified encoding matrix (e.g., that includes one more column and two more rows) to produce an updated coded matrix that forms an updated set of encoded data slices (e.g., 8 slices) for storage in the DSN.

FIG. 51N is a schematic block diagram of another embodiment of a dispersed storage network (DSN) system that includes a computing device 810 and a DSN 812. The computing device 810 may be the distributed storage and task (DST) processing unit 16 of FIG. 1. The DSN 812 may be the DSTN module 22 of FIG. 1. The DSN 812 includes a plurality of storage units 814. The storage unit 814 may be the DST execution unit 36 of FIG. 1. The computing device 810 includes a dispersed storage (DS) module 816. The DS module 816 may be the DST client module 34 of FIG. 1. The DS module 816 includes the outbound DST processing 80 and the inbound DST processing 82 of FIG. 3. The outbound DST processing 80 includes an ingesting module 818, a storing module 820, and an adjusting module 822. The inbound DST processing 82 includes a reading module 824.

In an example of ingesting a large data file 826, the ingesting module 818 receives, over time, the large data file 826 for storage in the DSN 812 and determines initial dispersed storage error encoding parameters 828 for storing the large data file 826. The initial dispersed storage error encoding parameters 828 indicate an error coding number and a decode threshold number. The error coding number indicates a number of encoded data slices that results when a data segment of the large data file 826 is encoded using a dispersed storage error encoding function and the decode threshold number indicates a minimum number of the encoded data slices that are needed to recover the data segment. As a specific example, the ingesting module 818 determines the initial dispersed storage error encoding parameters 828 based on obtaining a default error coding number and a default decode threshold number (e.g., retrieved, received). As another specific example, the ingesting module 818 determines the initial dispersed storage error encoding parameters 828 based on a historical record that includes an average error coding number and an average decode threshold number.

In an example of storing the ingested large data file 826, the storing module 820 encodes, using the dispersed storage error encoding function and during a first time interval of receiving the large data file 826, a first plurality of data segments of a first portion of the large data file 826 using the initial dispersed storage error encoding parameters to produce a first plurality of sets of encoded data slices. As a specific example, the storing module 820 segments the large data file 826 as the large data file 826 is received to produce the first plurality of data segments. The story module 820 encodes each data segment using the initial dispersed storage error encoding parameters to produce a corresponding set of encoded data slices. Having encoded the first plurality of data segments, the storing module 820 writes, during the first time interval, the first plurality of sets of encoded data slices to storage units 814 of the DSN 812. For example, the storing module 820, for each group of a plurality of groups of encoded data slices of the first plurality of sets of encoded data slices, generates a set of write requests 830, sends the set of write requests 830 to the storage units 814, and receives write acknowledgements 832 from at least some of the storage units 814. A group of the plurality of groups of encoded data slices includes one or more sets of encoded data slices of the first plurality of sets of encoded data slices.

In an example of adjusting the initial dispersed storage error encoding parameters 828, the adjusting module 822 monitors processing of the writing the first plurality of sets of encoded data slices to produce first write processing performance information. As a specific example, the adjusting module 822 monitors the write acknowledgements 832 to determine one or more of: a number of storage units sending a write acknowledgment, response time for the at last some of the storage units sending the write acknowledgements, resending of a write request to one or more storage units, a write acknowledgement indicating a storage failure, and storage performance information embedded in the write acknowledgement. Next, the adjusting module 822 interprets the monitoring to create the first write processing performance information. Alternatively, or in addition to, the adjusting module 822 may obtain storage performance history data regarding the storage units 814 and include the storage performance history data in the first write processing performance information.

Having produced the first write processing performance information, the adjusting module 822 determines whether the first write processing performance information compares unfavorably to a desired write performance range by one or more of a variety of approaches. For example, when a number of storage units acknowledging storage of encoded data slices of at least some of the first plurality of sets of encoded data slices is at or below a minimum desired storage response number. In another example, when the number of storage units acknowledging storage of encoded data slices of at least some of the first plurality of sets of encoded data slices is at or above a maximum desired storage response number. As another example, when response time for at least some of the storage units acknowledging storage of the at least some of the first plurality of sets of encoded data slices is at or below a minimum desired response time. As yet another example, when the response time for the at least some of the storage units acknowledging storage of the at least some of the first plurality of sets of encoded data slices is at or above a maximum desired response time.

In yet another example of determining whether the first write processing performance information compares unfavorably to the desired write performance range, when at least an acceptable maximum resend tolerance number of resend write requests is received from one or more of the storage units. In yet a still further example, when less than a minimum resend tolerance number of resend write requests is received from the storage units. As yet a further example, when at least an acceptable maximum failure tolerance number of storage failure messages is received from the one or more of the storage units. As yet a still further example, when less than a minimum failure tolerance number of storage failure messages is received from the storage units. Another example includes, when write response messages from the one or more of the storage units includes storage performance information indicative of at least one of declined storage performance and declined storage reliability. Another further example includes, when the write response messages from the one or more of the storage units includes storage performance information indicative of at least one of increased storage performance and increased storage reliability.

When the first write processing performance information compares unfavorably to the desired write performance range, the adjusting module 822 adjusts, for a second time interval of receiving the large data file 826, at least one of the error coding number and the decode threshold number to produce adjusted dispersed storage error encoding parameters 834. For example, the adjusting module 822 increases the error coding number and maintains the decode threshold number when the unfavorable comparison of the first write processing performance information with the desired write performance range indicates a declined storage performance. As another example, the adjusting module 822 decreases the error coding number and maintains the decode threshold number when the unfavorable comparison of the first write processing performance information with the desired write performance range indicates an increased storage performance. As yet another example, the adjusting module 822 increases the error coding number and increases the decode threshold number when the unfavorable comparison of the first write processing performance information with the desired write performance range indicates a declined storage reliability. Alternatively, or in addition to, the adjusting module 822 establishes a beginning of the second time interval to correspond to when the first write processing performance information compares unfavorably to the desired write performance range.

With adjusted dispersed storage error encoding parameters 834, the storing module 820 encodes, using the dispersed storage error encoding function and during the second time interval, a second plurality of data segments of a second portion of the large data file 826 using the adjusted dispersed storage error encoding parameters 834 to produce a second plurality of sets of encoded data slices. The storing module 820 writes, during the second time interval, the second plurality of sets of encoded data slices to the storage units of the DSN (e.g., sending write requests 830 that includes the second plurality of sets of encoded data slices).

With the writing of the second plurality of sets of encoded data slices, the adjusting module 822 monitors processing of the writing the second plurality of sets of encoded data slices to produce second write processing performance information (e.g., by monitoring write acknowledgments 832 associated with the processing of the writing). When the second write processing performance information compares unfavorably to the desired write performance range, the adjusting module 822 adjusts, for a third time interval of receiving the large data file 826, the adjusted dispersed storage error encoding parameters 834 to produce readjusted dispersed storage error encoding parameters.

The storing of the large data file 826 and adjusting of the dispersed storage error encoding parameters continues to process all portions of the large data file 826. When the large data file 826 is stored, the adjusting module 822 determine whether to normalize the first dispersed storage error encoding parameters 828 and the adjusted dispersed storage error encoding parameters 834 (e.g., and perhaps others including the readjusted dispersed storage error encoding parameters). The determining may be based on one or more of a predetermination, a time period since storage has completed, a DSN performance indicator, a data storage reliability indicator, monitoring of reading of the large data file 826, a request, and the first and adjusted dispersed storage error encoding parameters. For example, the adjusting module 822 determines to normalize all dispersed storage error encoding parameters when the large data file 826 has been stored for one week and the data storage reliability indicator indicates that a reliability level is greater than a minimum reliability threshold level.

When the first and adjusted dispersed storage error encoding parameters are to be normalized, the adjusting module 822 normalizes the first and adjusted dispersed storage error encoding parameters to produce normalized dispersed storage error encoding parameters. Having normalized the dispersed storage error encoding parameters, the adjusting module 822 updates dispersed storage error encoding storage of the large data file 826 in accordance with the normalized dispersed storage error encoding parameters. For example, when a data segment was encoded with a decode threshold number that is substantially the same as a decode threshold number of the normalized dispersed storage error encoding parameters and the data segment was also encoded with an error coding number that is greater than an error coding number of the normalized dispersed storage error coding parameters, the adjusting module 822 removes one or more redundancy slices such that a remaining number of encoded data slices of the data segment is substantially the same as the error coding number of the normalized dispersed storage error coding parameters. For instance, the adjusting module 822 issues a store slice request 836 that includes an indicator to delete a redundancy slice to the storage unit 814.

As another example of updating storage of the large data file 826 in accordance with the normalized dispersed storage error encoding parameters, when the data segment was encoded with the decode threshold number that is substantially the same as the decode threshold number of the normalized dispersed storage error encoding parameters and the data segment was also encoded with an error coding number that is less than the error coding number of the normalized dispersed storage error coding parameters, the adjusting module 822 adds one or more redundancy slices such that the remaining number of encoded data slices of the data segment is substantially the same as the error coding number of the normalized dispersed storage error coding parameters. For instance, the adjusting module 822 recovers at least a decode threshold number of slices 836 of the data segment from the storage units 814, decodes the slices 836 to reproduce the data segment, encodes the data segment to produce a redundancy slice, and issues a store slice request 836 that includes the redundancy slice to the storage units 814.

As another example of updating storage of the large data file 826 in accordance with the normalized dispersed storage error encoding parameters, when the data segment was encoded with another decode threshold number that is not the same as the decode threshold number of the normalized dispersed storage error encoding parameters, the adjusting module 822 re-encodes the data segment using the normalized dispersed storage error coding parameters. For instance, the adjusting module 822 recovers at least the decode threshold number of slices 836 of the data segment from the storage units 814, decodes the slices 836 to reproduce the data segment (e.g., using old parameters), encodes the data segment using the normalized dispersed storage error coding parameters to produce a new set of encoded data slices, and issues store slice requests 836 to the set of storage unit 814 that includes the new set of encoded data slices.

In an example of adjusting the dispersed storage error encoding parameters based on read processing performance information, the reading module 824, after the large data file 826 is stored as multiple pluralities of sets of encoded data slices, where at least two of the pluralities of sets of encoded data slices were encoded using different dispersed storage error encoding parameters, reads at least a portion 840 of the large data file from the storage units 814. For example, the reading module 824 issues read requests and receives read responses 838 from the storage units 814, where the read responses 838 includes sets of encoded data slices, and decodes the sets of encoded data slices to produce the at least the portion 840 of the large data file.

While reading, the read module 824 monitors read performance of the reading of at least some of the multiple pluralities of sets of encoded data slices to produce read processing performance information. For example, the read module 824 monitors the read responses 838 to determine one or more of: a number of storage units sending a read response, read response time for the at last some of the storage units sending the read responses, resending of a read request to one or more storage units, a read response indicating a storage failure, and read performance information embedded in the read response. Next, the read module 824 interprets the monitoring to create the read processing performance information.

When the read processing performance information compares unfavorably to a desired read performance range, the read module 824 determines whether to adjust the dispersed storage error encoding parameters for at least one of the multiple pluralities of sets of encoded data slices. When the dispersed storage error encoding parameters for the at least one of the multiple pluralities of sets of encoded data slices are to be adjusted, the reading module 824 adjusts the dispersed storage error encoding parameters for the at least one of the multiple pluralities of sets of encoded data slices to produce read-based adjusted dispersed storage error encoding parameters and updates storage of the at least one of the multiple pluralities of sets of encoded data slices in accordance with the read-based adjusted dispersed storage error encoding parameters.

As an example of updating storage, the reading module 824, when the read-based adjusted dispersed storage error encoding parameters includes a decreased error coding number, deletes one or more redundancy encoded data slices from each set of encoded data slices of the at least one of the multiple pluralities of sets of encoded data slices. For instance, the reading module 824 issues update requests 842 to the storage units 814 to delete the one or more redundancy encoded data slices. As another example of updating storage, the reading module 824, when the read-based adjusted dispersed storage error encoding parameters includes an increased error coding number, creates, in accordance with the dispersed storage error encoding function, one or more new redundancy encoded data slices for each set of encoded data slices of the at least one of the multiple pluralities of sets of encoded data slices. For instance, the reading module 824 recovers a decode threshold number of encoded data slices of the set of encoded data slices, decodes the recovered slices to reproduce a corresponding data segment, encodes the data segment to produce a redundancy encoded data slice, and issues an update request 842 that includes the redundancy encoded data slice. As yet another example of updating storage, the reading module 824, when the read-based adjusted dispersed storage error encoding parameters includes a changed error coding number and a changed decode threshold number, re-encoding a plurality of data segments for each of the at least one of the multiple pluralities of sets of encoded data slices using the dispersed storage error encoding function in accordance with the read-based adjusted dispersed storage error encoding parameters to produce a plurality of sets of re-encoded data slices. For instance, the reading module 824 recovers the decode threshold number of encoded data slices of the set of encoded data slices, decodes the recovered slices to reproduce the corresponding data segment, encodes the data segment to produce a new set of encoded data slices, and issues update requests 842 that includes the new set of encoded data slices.

FIG. 51O is a flowchart illustrating an example of adjusting dispersed storage error encoding parameters. The method begins at step 850 where a processing module receives, over time, a large data file for storage in a dispersed storage network (DSN). The method continues at step 852 where the processing module determines initial dispersed storage error encoding parameters for storing the large data file (e.g., determine, retrieve, receive). The initial dispersed storage error encoding parameters indicate an error coding number and a decode threshold number. The error coding number indicates a number of encoded data slices that results when a data segment of the large data file is encoded using a dispersed storage error encoding function and the decode threshold number indicates a minimum number of the encoded data slices that are needed to recover the data segment. The method continues at step 854 where the processing module encodes, using the dispersed storage error encoding function and during a first time interval of receiving the large data file, a first plurality of data segments of a first portion of the large data file using the initial dispersed storage error encoding parameters to produce a first plurality of sets of encoded data slices.

The method continues at step 856 where the processing module writes, during the first time interval, the first plurality of sets of encoded data slices to storage units of the DSN. For example, the processing module, for each group of a plurality of groups of encoded data slices of the first plurality of sets of encoded data slices generates a set of write requests, sends the set of write requests to the storage units, and receives write acknowledgements from at least some of the storage units. A group of the plurality of groups of encoded data slices includes one or more sets of encoded data slices of the first plurality of sets of encoded data slices.

The method continues at step 858 where the processing module monitors processing of the writing the first plurality of sets of encoded data slices to produce first write processing performance information. For example, the processing module monitors the write acknowledgements to determine one or more of: a number of storage units sending a write acknowledgment, response time for the at last some of the storage units sending the write acknowledgements, resending of a write request to one or more storage units, a write acknowledgement indicating a storage failure, and storage performance information embedded in the write acknowledgement. Next, the processing module interprets the monitoring to create the first write processing performance information. Alternatively, or in addition to, the processing module obtains storage performance history data regarding the storage units and includes the storage performance history data in the first write processing performance information.

The method continues at step 860 where the processing module determines that the first write processing performance information compares unfavorably to the desired write performance range when detecting a condition. Examples of conditions include when a number of storage units acknowledging storage of encoded data slices of at least some of the first plurality of sets of encoded data slices is at or below a minimum desired storage response number; when the number of storage units acknowledging storage of encoded data slices of at least some of the first plurality of sets of encoded data slices is at or above a maximum desired storage response number; and when response time for at least some of the storage units acknowledging storage of the at least some of the first plurality of sets of encoded data slices is at or below a minimum desired response time. More examples of conditions include when the response time for the at least some of the storage units acknowledging storage of the at least some of the first plurality of sets of encoded data slices is at or above a maximum desired response time; when at least an acceptable maximum resend tolerance number of resend write requests is received from one or more of the storage units; and when less than a minimum resend tolerance number of resend write requests is received from the storage units. Still more examples of conditions include when at least an acceptable maximum failure tolerance number of storage failure messages is received from the one or more of the storage units; when less than a minimum failure tolerance number of storage failure messages is received from the storage units; when write response messages from the one or more of the storage units includes storage performance information indicative of at least one of declined storage performance and declined storage reliability; and when the write response messages from the one or more of the storage units includes storage performance information indicative of at least one of increased storage performance and increased storage reliability.

The method continues at step 862 when the first write processing performance information compares unfavorably to a desired write performance range, where the processing module adjusts, for a second time interval of receiving the large data file, at least one of the error coding number and the decode threshold number to produce adjusted dispersed storage error encoding parameters. For example, the processing module increases the error coding number and maintains the decode threshold number when the unfavorable comparison of the first write processing performance information with the desired write performance range indicates a declined storage performance. As another example, the processing module decreases the error coding number and maintains the decode threshold number when the unfavorable comparison of the first write processing performance information with the desired write performance range indicates an increased storage performance. As yet another example, the processing module increases the error coding number and increases the decode threshold number when the unfavorable comparison of the first write processing performance information with the desired write performance range indicates a declined storage reliability. Alternatively, or in addition to, the processing module establishes a beginning of the second time interval to when the first write processing performance information compares unfavorably to the desired write performance range.

The method continues at step 864 where the processing module encodes, using the dispersed storage error encoding function and during the second time interval, a second plurality of data segments of a second portion of the large data file using the adjusted dispersed storage error encoding parameters to produce a second plurality of sets of encoded data slices. The method continues at step 866 where the processing module writes, during the second time interval, the second plurality of sets of encoded data slices to the storage units of the DSN. The method continues at step 868 where the processing module monitors processing of the writing of the second plurality of sets of encoded data slices to produce second write processing performance information. When the second write processing performance information compares unfavorably to the desired write performance range, the method continues at step 870 where the processing module adjusts, for a third time interval of receiving the large data file, the adjusted dispersed storage error encoding parameters to produce readjusted dispersed storage error encoding parameters.

When the large data file is stored, the method continues at step 872 where the processing module determines whether to normalize the first and adjusted dispersed storage error encoding parameters (e.g., a time period since storage has expired, a storage reliability indicator indicates favorable storage, etc.). When the first and adjusted dispersed storage error encoding parameters are to be normalized, the method continues at step 874 where the processing module normalizes the first and adjusted dispersed storage error encoding parameters to produce normalized dispersed storage error encoding parameters (e.g., establishing default parameters). The method continues at step 876 where the processing module updates dispersed storage error encoding storage of the large data file in accordance with the normalized dispersed storage error encoding parameters (e.g., aligning storage of sets of slices for each data segment in line with the normalized dispersed storage error encoding parameters by at least one of no change, adding the slice, deleting a slice, re-encoding the entire set of slices).

After the large data file is stored as multiple pluralities of sets of encoded data slices, wherein at least two of the pluralities of sets of encoded data slices were encoded using different dispersed storage error encoding parameters, the method continues at step 878 where the processing module reads at least a portion of the large data file from the storage units. The method continues at step 880 where the processing module monitors read performance of the reading of at least some of the multiple pluralities of sets of encoded data slices to produce read processing performance information. For example, the processing module monitors read responses to determine one or more of: a number of storage units sending a read response, read response time for the at last some of the storage units sending the read responses, resending of a read request to one or more storage units, a read response indicating a storage failure, and read performance information embedded in the read response. Next, the processing module interprets the monitoring to create the read processing performance information.

When the read processing performance information compares unfavorably to a desired read performance range, the method continues at step 882 where the processing module determines whether to adjust the dispersed storage error encoding parameters for at least one of the multiple pluralities of sets of encoded data slices (e.g., identifying one of the pluralities of sets of encoded data slices associated with the unfavorable comparison and determining whether the comparison is greater than a performance variance threshold). When the dispersed storage error encoding parameters for the at least one of the multiple pluralities of sets of encoded data slices are to be adjusted, the method continues at step 884 where the processing module adjusts the dispersed storage error encoding parameters for the at least one of the multiple pluralities of sets of encoded data slices to produce read-based adjusted dispersed storage error encoding parameters.

The method continues at step 886 where the processing module updates storage of the at least one of the multiple pluralities of sets of encoded data slices in accordance with the read-based adjusted dispersed storage error encoding parameters. For example, when the read-based adjusted dispersed storage error encoding parameters includes a decreased error coding number, the processing module deletes one or more redundancy encoded data slices from each set of encoded data slices of the at least one of the multiple pluralities of sets of encoded data slices. As another example, when the read-based adjusted dispersed storage error encoding parameters include an increased error coding number, the processing module creates, in accordance with the dispersed storage error encoding function, one or more new redundancy encoded data slices for each set of encoded data slices of the at least one of the multiple pluralities of sets of encoded data slices. As yet another example, when the read-based adjusted dispersed storage error encoding parameters include a changed error coding number and a changed decode threshold number, the processing module re-encodes a plurality of data segments for each of the at least one of the multiple pluralities of sets of encoded data slices using the dispersed storage error encoding function in accordance with the read-based adjusted dispersed storage error encoding parameters to produce a plurality of sets of re-encoded data slices.

FIG. 52A is a diagram illustrating an example of an initial storage map structure 890 with regards to mapping distributed storage and task network (DSTN) address ranges to a plurality of distributed storage and task (DST) execution units implemented at a common site. The initial storage map structure 890 includes a site address range field 892 and a plurality of DST execution unit address range 1-3 fields 884, 896, and 898. Each DST execution unit address range field corresponds to a DST execution unit of the plurality of DST execution units. Each DST execution unit address range field includes a DST execution unit address range entry indicating a DSTN address range associated with a corresponding DST execution unit. The site address range field 892 includes a site address range entry indicating an address range mapping for the site. The site address range entry includes a range that encompasses an aggregate of the DST execution unit address range entries for the plurality of DST execution unit address range fields 894-898. For example, a site is mapped to a site address range of 1000-1999 which includes a DST execution unit 1 address range 894 of 1000-1299, a DST execution unit 2 address range 896 of 1300-1599, and a DST execution unit 3 address range 898 of 1600-1999. Address range assignments are contiguous across the plurality of DST execution units 1-3.

From time to time, boundaries of address ranges between two DST execution units of the plurality of DST execution units may be modified. The modifying may be based on one or more of an addition of more storage capacity, removal of storage capacity, and uneven growth of storage capacity utilization. For example, a boundary between DST execution unit 1 and DST execution unit 2 is moved to map more addresses to DST execution unit 1 and fewer addresses to DST execution unit 2 when encoded data slices stored at DST execution unit 2 utilize more storage capacity than encoded data slices stored at DST execution unit 1. Slices may be migrated from DST execution unit 2 to DST execution unit 1 in accordance with moving the boundary. A method to provide a confirmed modification of an address boundary between at least two neighbor DST execution units is discussed in greater detail with reference to FIGS. 52B-C.

FIG. 52B is a diagram illustrating an example of a storage map modification package structure 900 that includes a previous storage map 902 and an updated storage map 904. The storage map modification package 900 is also associated with a first neighbor signature 906 and a second neighbor signature 908. The storage map modification package 900 and signatures 906-908 may be utilized when updating address range boundaries between two DST execution units. A plurality of storage map modification packages and signature combinations may be utilized to document a plurality of address range boundary modifications.

The previous storage map 902 includes the site address range field 892 and the plurality of DST execution unit address range fields 894, 896, and 898 of FIG. 52A. Entries of the previous storage map 902 pertain to an initial state of address range mapping for a site prior to moving an address range boundary between two neighboring DST execution units. For example, the previous storage map 902 includes initial state address range mapping where a site address range entry is 1000-1999, a DST execution unit 1 is mapped to an address range of 1000-1299, a DST execution unit 2 is mapped to an address range of 1300-1599, and a DST execution unit 3 is mapped to an address range of 1600-1999.

The updated storage map 904 includes address range entries corresponding to an address range mapping after an address boundary is modified between the two neighboring DST execution units. The site address range entry of the site address range field 892 of the updated storage map 904 is modified when the boundary change relates to a boundary between a DST execution unit of the associated site and another DST execution unit of another site. The site address range entry of the site address range field 892 of the updated storage map 904 is not modified when the boundary change relates to a boundary between two neighboring DST execution units of the site. For example, the site address range entry of the updated storage map 904 substantially matches the site address range entry of the previous storage map 902 when the boundary change relates to the boundary between two neighboring DST execution units of the site. For instance, a site address range entry of 1000-1999 is maintained from the previous storage map to the updated storage map.

DST execution unit address range entries are modified in the updated storage map 904 from the previous storage map 902 when an address boundary associated with neighboring DST execution units is updated. For example, a previous storage map address range mapping of 1000-1299 for DST execution unit 1 is modified to an address range of 1000-1399 for the updated storage map and a previous storage map address range mapping of 1300-1599 for DST execution unit 2 is modified to an address range of 1400-1599 for the updated storage map when the address range boundary is modified to map more addresses to DST execution unit 1 and fewer addresses to DST execution unit 2.

The first neighbor signature field 906 includes a first neighbor signature entry generated by a first neighboring DST execution unit of a pair of neighboring DST execution units associated with an address boundary modification when the first neighboring DST execution unit approves the address boundary modification and content of the storage map modification package. The second neighbor signature field 908 includes a second neighbor signature entry generated by a second neighboring DST execution unit of the pair of neighboring DST execution units associated with the address boundary modification when the second neighboring DST execution unit approves the address boundary modification and content of the storage map modification package. A signature entry includes a signature generated over the storage map modification package 900. The signature may be generated by any signature generation method including a digital signature algorithm. For example, the first neighboring DST execution unit performs a hashing function on the storage map modification package 900 to produce a hash digest. Next, first neighboring DST execution unit encrypts the hash digest utilizing a private key of a public/private key pair associated with the first neighboring DST execution unit to produce the first neighbor signature 906.

The storage map modification package 900, the first neighbor signature 906, and the second neighbor signature 908 may be utilized by a validating entity to validate the address boundary modification. The validating includes one or more of verifying that the address boundary modification is with regards to a pair of DST execution units associated with the first neighbor signature in the second neighbor signature, validating the first neighbor signature, and validating the second neighbor signature. The signature validation includes validating the signature utilizing a signature validation approach. For example, the validating entity performs a hashing function on the storage map modification package 900 to produce a calculated hash digest. Next, the validating entity decrypts the signature utilizing a public key associated with an entity that produced the signature to produce a decrypted signature. Next, the validating entity indicates that the signature is validated when the decrypted signature compares favorably (e.g., substantially the same) to the calculated hash digest. With the storage map modification package 900, the first neighbor signature 906, and the second neighbor signature 908 validated by the validating entity, subsequent utilization of the storage map modification package is authorized. The utilization of the storage map modification package includes one or more of migrating slices from a first DST execution unit to a second DST execution unit and accessing a DST execution unit in accordance with the updated storage map. A method of generating the storage map modification package 900 is discussed in greater detail with reference to FIG. 52C.

FIG. 52C is a flowchart illustrating an example of migrating slices. The method begins at step 910 where a processing module (e.g., of a distributed storage and task (DST) client module) obtains utilization information of a pair of adjacent DST execution units of the common pillar (e.g., implemented a common site). The utilization information includes one or more of a storage capacity level, a storage utilization level, and available storage level, and an assigned address range. The pair of adjacent DST execution units includes a pair of DST execution units assigned to adjacent address ranges.

The method continues at step 912 where the processing module verifies utilization information of the pair of adjacent DST execution units based on companion utilization information. The verifying includes identifying companion DST execution units associated with the companion utilization information. The identifying includes at least one of retrieving, receiving, initiating a query, and identifying from a distributed storage and task network (DSTN) addressed a physical location table lookup. For example, the processing module identifies a set of DST execution units that includes the pair of adjacent DST execution units. The processing module identifies the companion DST execution units as remaining DST execution units of the set of DST execution units. The verifying further includes comparing storage utilization levels of each DST execution unit of the companion DST execution units to each other DST execution unit of the set of DST execution units. The processing module indicates verified utilization information when the utilization levels are substantially the same. Alternatively, the processing module may skip the preceding step.

When verified, the method continues at step 914 where the processing module selects slices to migrate. The selecting includes selecting a destination DST execution unit based on associated available storage level and determining an amount of slices based on available storage level of another DST execution unit. The processing module may select slices at a high-end of a slice range when the destination unit is assigned higher addresses. The processing module may select slices associated with DSTN addresses at a low-end of the slice range when the destination unit is assigned to lower DSTN addresses. The selection of the amount of slices includes at least one of choosing a predetermined number, selecting the amount based on a performance indicator, and selecting amount to provide an updated level of storage that is less than a high storage level threshold.

The method continues at step 916 where the processing module facilitates migrating the slices to migrate. The facilitating includes at least one of retrieving the slices to migrate, sending the slices to migrate to the destination DST execution unit, and generating a request to migrate slices. The method continues at step 918 where the processing module generates an updated storage map based on the slices to migrate. The generating includes determining slice names corresponding to the slices to migrate which are disassociated with the DST execution unit and which are now associated with the destination DST execution unit. The determining may be based on one or more of a lookup, accessing the DSTN address to physical location table lookup, and a query.

The method continues at step 920 where the processing module generates a storage map modification package that includes a previous storage map and the updated storage map. The generating includes obtaining the previous storage map by retrieving the previous storage map from a memory or receiving the previous storage map. The generating includes appending the previous storage map to the updated storage map to produce the storage map modification package. The method continues at step 922 where the processing module facilitates attaching a signature from each DST execution unit of the pair of adjacent DST execution units to the storage map modification package to produce a fully signed storage map modification package. The facilitating includes obtaining the signature from each DST execution unit of the pair of adjacent DST execution units. The obtaining includes at least one of generating a signature over the storage map modification package, attaching the signature to the storage the modification package, sending a signature request that includes the attached signature and storage map modification package to another DST execution unit of the pair of adjacent DST execution units, and receiving a fully signed storage map modification package.

The method continues at step 924 where the processing module publishes the fully signed storage map modification package. The publishing includes at least one of receiving a fully signed storage map modification package request, outputting the fully signed storage map modification package to the other DST execution unit, outputting the fully signed storage map modification package to one or more DST execution units of the set of DST execution units, and storing the fully signed storage map modification package in a DSTN module.

In addition, subsequent access to a slice may utilize the fully signed storage map modification package. For example, upon a slice access request, obtain an initial storage package, obtain one or more fully signed storage map modification packages, identify a storage location corresponding to the slice based on the initial storage package and the one or more fully signed storage map modification packages, validate the most recent fully signed storage map modification package, and when validated, access the slice utilizing the present storage location.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device in a dispersed storage network (DSN) comprising:
    storing a first plurality of sets of encoded data slices (EDSs) in a first set of storage units of a dispersed storage network (DSN), wherein the first plurality of sets of EDSs are stored in accordance with first dispersed storage error encoding parameters, and wherein the first plurality of sets of encoded data slices are associated with a first portion of a data object;
    storing a second plurality of sets of EDSs in a second set of storage units of a dispersed storage network (DSN), wherein the second plurality of sets of EDSs are stored in accordance with second dispersed storage error encoding parameters, wherein at least one of the second dispersed storage error encoding parameters is different from the first dispersed storage error encoding parameters and wherein the second plurality of sets of encoded data slices are associated with a second portion of a data object;
    determining whether one or more of the first dispersed storage error encoding parameters is to be changed, wherein the determining whether one or more of the first dispersed storage error encoding parameters is to be changed is based on at least one of analyzing a history of read performance, expiration of a time frame since the data object was stored and receiving a request;
    in response to a determination that one or more of the first dispersed storage error encoding parameters is to be changed selecting one or more changes to the first dispersed storage error encoding parameters; and
    applying the one or more changes to the first dispersed storage error encoding parameters.

2. The method of claim 1, wherein the first dispersed storage error encoding parameters include an error coding number and a decode threshold.

3. The method of claim 1, wherein the selecting one or more changes to the first dispersed storage error encoding parameters includes changing the first dispersed storage error encoding parameters to be the same as the second dispersed storage error encoding parameters.

4. The method of claim 3, further comprising:
    determining whether one or more of the second dispersed storage error encoding parameters is to be changed;
    selecting one or more changes to the second dispersed storage error encoding parameters; and
    applying the one or more changes to the second dispersed storage error encoding parameters.

5. The method of claim 1, further comprising monitoring reading of the first plurality of sets of EDSs to produce read processing performance information, wherein the determining whether one or more of the first dispersed storage error encoding parameters is to be changed is based on the read processing performance information.

6. The method of claim 1, wherein the selecting one or more changes to the first dispersed storage error encoding parameters is based on one or more of a lookup, a request, receiving parameters, a history of read performance, read processing performance, data type of the data object an owner of the data object and a data size of the data object.

7. The method of claim 1, wherein the applying the one or more changes to the first dispersed storage error encoding parameters includes adding an additional data slice to the first plurality of sets of encoded data slices.

8. The method of claim 1, wherein the step of applying the one or more changes to the first dispersed storage error encoding parameters includes deleting an encoded data slice from the first plurality of sets of EDSs.

9. The method of claim 1, wherein the applying the one or more changes to the first dispersed storage error encoding parameters includes recovering a data segment from a first set of EDSs of the first plurality of sets of EDSs and encoding the data segment using a modified encoding matrix.

10. A dispersed storage (DS) module comprises:
    a first processing module, when operable within a computing device, causes the computing device to:
        receive a data object for storage;
        store a first plurality of sets of encoded data slices (EDSs) in a first set of storage units of a dispersed storage network (DSN), wherein the first plurality of sets of EDSs are stored in accordance with first dispersed storage error encoding parameters, and wherein the first plurality of sets of encoded data slices are associated with a first portion of the data object;
        store a second plurality of sets of EDSs in a second set of storage units of a dispersed storage network (DSN), wherein the second plurality of sets of EDSs are stored in accordance with second dispersed storage error encoding parameters, wherein at least one of the second dispersed storage error encoding parameters is different from the first dispersed storage error encoding parameters and wherein the second plurality of sets of encoded data slices are associated with a second portion of the data object;
    a second processing module, when operable within a computing device, causes the computing device to:
        determine whether one or more of the first dispersed storage error encoding parameters is to be changed, wherein the determination whether one or more of the first dispersed storage error encoding parameters is to be changed is based on at least one of a history of read performance, a time frame since the data object was stored and a request;
        in response to a determination that one or more of the first dispersed storage error encoding parameters is to be changed, select one or more changes to the first dispersed storage error encoding parameters; and apply the one or more changes to the first dispersed storage error encoding parameters.

11. The DS module of claim 10, wherein the first dispersed storage error encoding parameters include an error coding number and a decode threshold.

12. The DS module of claim 10, wherein the second processing module, when operable within the computing device, further causes the computing device to:
select one or more changes to the first dispersed storage error encoding parameters to change the first dispersed storage error encoding parameters to be the same as the second dispersed storage error encoding parameters.

13. The DS module of claim 12, wherein the second processing module, when operable within the computing device, further causes the computing device to:
determine one or more of the second dispersed storage error encoding parameters is to be changed;
select one or more changes to the second dispersed storage error encoding parameters; and apply the one or more changes to the second dispersed storage error encoding parameters.

14. The DS module of claim 10, further comprising a third processing module, when operable within the computing device, causes the computing device to monitor reading of the first plurality of sets of encoded data slices to produce read processing performance information, and wherein the first processing module, when operable within the computing device, further causes the computing device to determine the one or more of the first dispersed storage error encoding parameters to be changed based on the read processing performance information.

15. The DS module of claim 10, wherein the second processing module, when operable within the computing device, further causes the computing device to select the one or more changes to the first dispersed storage error encoding parameters based on at least one of a lookup, a request, receiving parameters, a history of read performance, read processing performance, data type of the data object an owner of the data object and a data size of the data object.

16. The DS module of claim 10, wherein the second processing module, when operable within the computing device, further causes the computing device to apply the one or more changes to the first dispersed storage error encoding parameters by adding an additional data slice to the first plurality of sets of encoded data slices.

17. The DS module of claim 10, wherein the second processing module, when operable within the computing device, further causes the computing device to apply the one or more changes to the first dispersed storage error encoding parameters by deleting a data slice from the first plurality of sets of encoded data slices.

18. A dispersed storage network (DSN) comprising:
storage units in which a first plurality of sets of encoded data slices relating to a first portion of a data file are stored in accordance with first dispersed storage error encoding parameters, and in which in a second plurality of sets of encoded data slices relating to a second portion of the data file are stored in accordance with second dispersed storage error encoding parameters, wherein at least one of the second dispersed storage error encoding parameters is different from the first dispersed storage error encoding parameters; and
a DS module including a first processing module, when operable within a computing device, causes the computing device to:
determine whether one or more of the first dispersed storage error encoding parameters is to be changed, wherein the determining whether one or more of the first dispersed storage error encoding parameters is to be changed is based on at least one of analyzing a history of read performance, expiration of a time frame since the data object was stored and receiving a request;
in response to a determination that one or more of the first dispersed storage error encoding parameters is to be changed, select one or more changes to the first dispersed storage error encoding parameters; and
apply the one or more changes to the first dispersed storage error encoding parameters.

* * * * *